United States Patent
Guan et al.

(10) Patent No.: US 12,516,425 B2
(45) Date of Patent: Jan. 6, 2026

(54) ELECTRICALLY FUELED ACTIVE SUPRAMOLECULAR MATERIALS, AND APPLICATIONS THEREOF

(71) Applicant: The Regents of the University of California, Oakland, CA (US)

(72) Inventors: Zhibin Guan, Irvine, CA (US); Dipankar Barpuzary, Irvine, CA (US); Serxho Selmani, Irvine, CA (US); Eric Schwartz, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 18/291,180

(22) PCT Filed: Jul. 22, 2022

(86) PCT No.: PCT/US2022/038093
§ 371 (c)(1),
(2) Date: Jan. 22, 2024

(87) PCT Pub. No.: WO2023/004171
PCT Pub. Date: Jan. 26, 2023

(65) Prior Publication Data
US 2025/0066930 A1 Feb. 27, 2025

Related U.S. Application Data

(60) Provisional application No. 63/225,427, filed on Jul. 23, 2021, provisional application No. 63/240,863, filed on Sep. 3, 2021.

(51) Int. Cl.
*C25B 3/23* (2021.01)
*C08G 83/00* (2006.01)
*C25B 3/01* (2021.01)
*C25B 3/25* (2021.01)
*C25B 3/29* (2021.01)
*C25B 11/095* (2021.01)

(52) U.S. Cl.
CPC .............. *C25B 3/29* (2021.01); *C08G 83/008* (2013.01); *C25B 3/01* (2021.01); *C25B 11/095* (2021.01)

(58) Field of Classification Search
CPC ................. C25B 3/23; C25B 3/25; C25B 3/29
USPC ......................................... 205/414
See application file for complete search history.

(56) References Cited

FOREIGN PATENT DOCUMENTS

WO 1996004340 A1 2/1996

OTHER PUBLICATIONS

Pramanik et al., "Self-Assembled Monolayers of Aβ Peptides on Au Electrodes: An Artificial Platform for Probing the Reactivity of Redox Active Metals and Cofactors Relevant to Alzheimer's Disease," Journal of the American Chemical Society (Jul. 25, 2012), vol. 134, No. 29, pp. 12180-12189. (Year: 2012).*

Ellis et al., "Supramolecular Electropolymerization," Angewandte Chemie (Nov. 26, 2018), vol. 130, No. 48, pp. 15975-15979). (Year: 2018).*

(Continued)

*Primary Examiner* — Edna Wong
(74) *Attorney, Agent, or Firm* — Gavrilovich, Dodd & Lindsey, LLP

(57) ABSTRACT

The disclosure provides for methods and systems to create active supramolecular materials by using electrically fueled dissipative assembly, and applications thereof, including in electronic devices.

9 Claims, 24 Drawing Sheets

(56) References Cited

OTHER PUBLICATIONS

Nekrassova et al., "The oxidation of Cysteine by Aqueous Ferricyanide: A kinetic Study Using Boron Doped Diamond Electrode Voltammetry," Electroanalysis: An International Journal Devoted to Fundamental and Practical Aspects of Electroanalysis (Nov. 2002), vol. 14, No. 21, pp. 1464-1469. (Year: 2002).*
Abdul-Hassan et al., "Redox-Triggered Folding of Self-Assembled Coordination Polymers Incorporating Viologen Units," Chemistry—A European Journal (Sep. 3, 2018), vol. 24, No. 49, pp. 12961-12969. (Year: 2018).*
Sakaguchi et al., "Electrochemical Epitaxial Polymerization of Single-Molecular Wires," Nature Materials (Aug. 1, 2004), vol. 3, No. 8, pp. 551-557. (Year: 2004).*
Del Grosso et al., "Transient DNA-Based Nanostructures Controlled by Redox Inputs," Angewandte Chemie International Edition (Aug. 3, 2020), vol. 59, No. 32, pp. 13238-13245. (Year: 2020).*
Qingwen et al., "Studies on Self-Assembly Monolayers of Cysteine on Gold by XPS, QCM, and Electrochemical Techniques," Electroanalysis: An International Journal Devoted to Fundamental and Practical Aspects of Electroanalysis (Nov. 2001), vol. 13, No. 16, pp. 1342-1346. (Year: 2001).*
Ogden et al., "Redox Chemical-Fueled Dissipative Self-Assembly of Active Materials," ChemSystemsChem (Jul. 2020), vol. 2, No. 4, pp. 1-4. (Year: 2020).*
Tahara et al., "Electrochromism of Ferrocene-and Viologen-Based Redox-Active Ionic Liquids Composite," ACS Applied Materials & Interfaces (Dec. 24, 2018), vol. 11, No. 1, pp. 1-6. (Year: 2018).*
Lee, Sun Hwa, International Preliminary Report on Patentability and Written Opinion, PCT/US2022/038093, The International Bureau of WIPO, Feb. 1, 2024.
Bal et al., "Chemically Fueled Dissipative Self-Assembly that Exploits Cooperative Catalysis." Angew. Chem., Int. Ed. 58:244-247 (2019).
Barpuzary et al., "Waste-Free Fully Electrically Fueled Dissipative Self-Assembly System." J. Am. Chem. Soc. 145:3727-3735 (2023).
Benniston et al., "Spring Open Two-Plus-Two Electron Storage in A Disulfide-Strapped Methyl Viologen Derivative." Org. Lett. 2012, 14, 506-509.
Bird et al., "Electrochemistry of the Viologens." Chem. Soc. Rev. 10:49-82 (1981).
Boekhoven et al., "Transient assembly of active materials fueled by a chemical reaction." Science 349:1075-1079 (2015).
Brinke et al., "Dissipative adaptation in driven self-assembly leading to self-dividing fibrils." Nat. Nanotechnol. 13:849-855 (2018).
Burns et al., "Selective reduction of disulfides by tris(2-carboxyethyl)phosphine." J. Org. Chem. 56:2648-2650 (1991).
Chen et al., "Subnanoscale Hydrophobic Modulation of Salt Bridges in Aqueous Media." Science 348:555-559 (2015).
Colomer et al., "A transient self-assembling self-replicator." Nat. Commun. 9:2239 (2018).
Das et al., "Chemically Fueled Self-Assembly in Biology and Chemistry." Angew. Chem., Int. Ed. 60:20120-20143 (2021).
Davidson et al., "Chaotic induced-charge electro-osmosis." Phys. Rev. Lett. 112:128302 (2014).
De et al., "Dissipative Self-Assembly Driven by the Consumption of Chemical Fuels." Adv. Mater. 30:1706750 (2018).
Debnath et al., "Peptide Nanofibers with Dynamic Instability through Nonequilibrium Biocatalytic Assembly." J. Am. Chem. Soc. 135:16789-16792 (2013).
De Jong et al., "Light-driven dynamic pattern formation." Angew. Chem., Int. Ed. 44:2373-2376 (2005).
Del Grosso et al., "Transient DNA-Based Nanostructures Controlled by Redox Inputs." Angew. Chem., Int. Ed. 59:13238-13245 (2020).
Ellis et al., "Supramolecular Electropolymerization." Angew. Chem., Int. Ed. 57:15749-15753 (2018).
Fletcher et al., "Active biological materials." Annu. Rev. Phys. Chem. 60:469-486 (2009).
Gelinas et al., "Air-Stable, Self-Bleaching Electrochromic Device Based on Viologen- and Ferrocene-Containing Triflimide Redox Ionic Liquids." ACS Appl. Mater. Interfaces 9:28726-28736 (2017).
Grötsch et al., "Pathway Dependence in the Fuel-Driven Dissipative Self-Assembly of Nanoparticles." J. Am. Chem. Soc. 141:9872-9878 (2019).
Grzybowski et al., "The Nanotechnology of Life-inspired Systems." Nat. Nanotechnol. 11:585-592 (2016).
Hall et al., "Intramolecular Electron Transfer in Bipyridinium Disulfides." J. Am. Chem. Soc. 136:4012-4018 (2014).
Heinen et al., "Programmable dynamic steady states in ATP-driven nonequilibrium DNA systems." Sci. Adv. 5:eaaw0590 (2019).
Hess et al., "Non-Equilibrium Assembly of Microtubules: From Molecules to Autonomous Chemical Robots." Chem. Soc. Rev. 46:5570-5587 (2017).
Ikegami et al. "Dissipative and Autonomous Square-Wave Self-Oscillation of a Macroscopic Hybrid Self-Assembly under Continuous Light Irradiation." Angew. Chem., Int. Ed. 55:8239-8243 (2016).
Kariyawasam et al., "Dissipative Assembly of Aqueous Carboxylic Acid Anhydrides Fueled by Carbodiimides." J. Am. Chem. Soc. 139:11949-11955 (2017).
Klajn et al., "Light-controlled self-assembly of reversible and irreversible nanoparticle suprastructures." Proc. Natl. Acad. Sci. U.S.A. 104:10305-10309 (2007).
Klajn et al., "Writing Self-Erasing Images using Metastable Nanoparticle "Inks"." Angew. Chem., Int. Ed. 48:7035-7039 (2009).
Krabbenborg et al., "Spatially Controlled Out-of-Equilibrium Host-Guest System under Electrochemical Control." Chem. Eur. J. 21:9638-9644 (2015).
Kubota et al., "Force generation by a propagating wave of supramolecular nanofibers." Nat. Commun. 11:3541 (2020).
Kundu et al., "Controlling the Lifetimes of Dynamic Nanoparticle Aggregates by Spiropyran Functionalization." Nanoscale 8:19280-19286 (2016).
Lee et al., "Light-Powered Dissipative Assembly of Diazocine Coordination Cages." J. Am. Chem. Soc. 144:3099-3105 (2022).
Leira-Iglesias et al., "Oscillations, travelling fronts and patterns in a supramolecular system." Nat. Nanotechnol. 13:1021-1027 (2018).
Liu et al., "Morphing electronics enable neuromodulation in growing tissue." Nat. Biotechnol. 38:1031-1036 (2020).
Llobell et al., "Electron Transfer Between Reduced Methyl Viologen and Oxidized Glutathione: A New Assay of *Saccharomyces cerevisiae* Glutathione Reductase." Arch. Biochem. Biophys. 250:373-381 (1986).
Luo et al., "Unprecedented Capacity and Stability of Ammonium Ferrocyanide Catholyte in pH Neutral Aqueous Redox Flow Batteries." Joule 3:149-163 (2019).
Ma et al., "Inducing propulsion of colloidal dimers by breaking the symmetry in electrohydrodynamic flow." Phys. Rev. Lett. 115:208302 (2015).
Madasamy et al., "Viologen-Based Electrochromic Materials and Devices." J. Mater. Chem. C 2019, 7, 4622-4637.
Maiti et al., "Dissipative self-assembly of vesicular nanoreactors." Nat. Chem. 8:725-731 (2016).
Mattia et al., "Supramolecular systems chemistry." Nat. Nanotechnol. 10:111-119 (2015).
Merindol et al., "Materials Learning from Life: Concepts for Active, Adaptive and Autonomous Molecular Systems." Chem. Soc. Rev. 46:5588-5619 (2017).
Mishra et al., "Biomimetic temporal self-assembly via fuel-driven controlled supramolecular polymerization." Nat. Commun. 9:1295 (2018).
Moon et al., "Solution Processable, Electrochromic Ion Gels for Sub-1 V, Flexible Displays on Plastic." Chem. Mater. 27:1420-1425 (2015).
Murakami et al., "Characterization of the Intramolecular Electron Transfer Pathway from 2-Hydroxyphenazine to the Heterodisulfide Reductase from Methanosarcina thermophila." J. Biol. Chem. 276:2432-2439 (2001).
Nekrassova et al., "The oxidation of cysteine by aqueous ferricyanide: a kinetic study using boron doped diamond electrode voltammetry." Electroanalysis 14:1464-1469 (2002).

(56) References Cited

OTHER PUBLICATIONS

Ogden et al., "Redox Chemical-Fueled Dissipative Self-Assembly of Active Materials." ChemSystemsChem. 2020, 2:e1900030 (2020).
Raeburn et al., "Electrochemically-triggered spatially and temporally resolved multi-component gels." Mater. Horizons 1:241-246 (2014).
Ragazzon et al., "Autonomous Non-Equilibrium Self-Assembly and Molecular Movements Powered by Electrical Energy." Angew. Chem., Int. Ed. 62:e202214265 (2023).
Ries, B. et al., "The Design of Dissipative Molecular Assemblies Driven by Chemical Reaction Cycles." Chem 6:552-578 (2020).
Ristenpart et al., "Electrohydrodynamic Flow and Colloidal Patterning near Inhomogeneities on Electrodes." Langmuir 24:12172-12180 (2008).
Ross et al., "Controlling organization and forces in active matter through optically defined boundaries." Nature 572:224-229 (2019).
Saini et al., "Influence of Electrolyte Concentration on the Aggregation of Colloidal Particles near Electrodes in Oscillatory Fields." Langmuir 32:4210-4216 (2016).
Selmani et al., "Electrically Fueled Active Supramolecular Materials." J. Am. Chem. Soc. 144:7844-7851 (2022).
Sharko et al., "Insights into Chemically Fueled Supramolecular Polymers." Chem. Rev. 122:11759-11777 (2022).
Song et al., "Materials for flexible bioelectronic systems as chronic neural interfaces." Nat. Mater. 19:590-603 (2020).
Sorrenti et al., "Non-equilibrium steady states in supramolecular polymerization." Nat. Commun. 8:15899 (2017).
Striepe et al., "Viologens and Their Application as Functional Materials." Eur. J. Chem. 23:16924-16940 (2017).
Tena-Solsona et al., "Non-equilibrium dissipative supramolecular materials with a tunable lifetime." Nat. Commun. 8:15895 (2017).
Tschirhart et al., "Electronic control of gene expression and cell behaviour in *Escherichia coli* through redox signalling." Nat. Commun. 8:14030 (2017).
Van Esch et al., "Chemical Systems Out of Equilibrium." Chem. Soc. Rev. 46:5474-5475 (2017).
Wang et al., "Image quality assessment: from error visibility to structural similarity." IEEE Trans. Image Process. 13:600-612 (2004).
Weisenfels et al., "Dissipative Self-Assembly: Fueling with Chemicals versus Light." Chem 7:23-37 (2021).
Woltman et al., "Liquid-crystal materials find a new order in biomedical applications." Nat. Mater. 6:929-938 (2007).
Yeh et al., "Assembly of ordered colloidal aggregrates by electric-field-induced fluid flow." Nature 386:57-59 (1997).
AG Scientific. "Dithiothreitol (DTT) Applications You Must Know." Retrieved from the Web Oct. 19, 2022. URL://agscientfic.com/blog/dithiothreitol-dtt-applications.html#:~:text=Dithiothreitol%20(DTT)%20is%20a%20redox,stabilize%20enzymes%20and%20other%20proteins.> p. 1, paragraph 1, May 2019.
Bose et al., "Mechanochemistry of Supramolecules." Journal of Organic Chemistry, 15:881-9000 (2019).
Casado et al., "Redox-active ferrocenyl dendrimers and polymers in solution and immobilized on electrode surfaces." Coordination Chemistry Reviews 185-186:53-80 (1990).
Faramarzi et al., "Light-triggered self-construction of supramolecular organic nanowires as metallic interconnects." Nature Chemistry 4(6):485-490 (2012).
Ge et al., "A Disposable Paper-based Electrocehmical Sensor with Addressable Electrode Array for Cancer Screening." Chemical Communication 48:9397-9399 (2012).
Madasamy et al., "Reversible 2D Supramolecular Organic Frameworks encompassing Viologen Cation Radicals and CB[8]." Scientific Reports 8:1354 (2018).
Mishra et al., "Biomimetic temporal self-assembly via fuel-driven controlled supramolecular polymerization." Nature Communications 9(1):1295 (2018).
Selmani et al., "Electrically Fueled Active Supramolecular Materials." Journal of the American Chemical Society PMID: 35446034 (Apr. 21, 2022).
Sorrenti et al., "Non-equilibrium steady states in supramolecular polymerization." Nature Communications 8:15899 (2017).
Tahara et al., "Electrochromism of Ferrocene- and Viologen-Based Redox-Active Ionic Liquids Composite." ACS Appl. Mater. Interfaces 11(1):1-6 (2018).
Wan et al., "Stimuli-Responsive Supramolecular Interfaces for Controllable Bioelectrocatalysis." ChemElectroChem 1(10):Abstract (2014).
Wang et al., The immobilisation and reactivity of $Fe(CN)_6^{3-/4-}$ in an intrinsically microporous polyamine (PIM-EA-TB). Journal of Solid State Electrochemistry 24:2797-2806 (2020).

\* cited by examiner

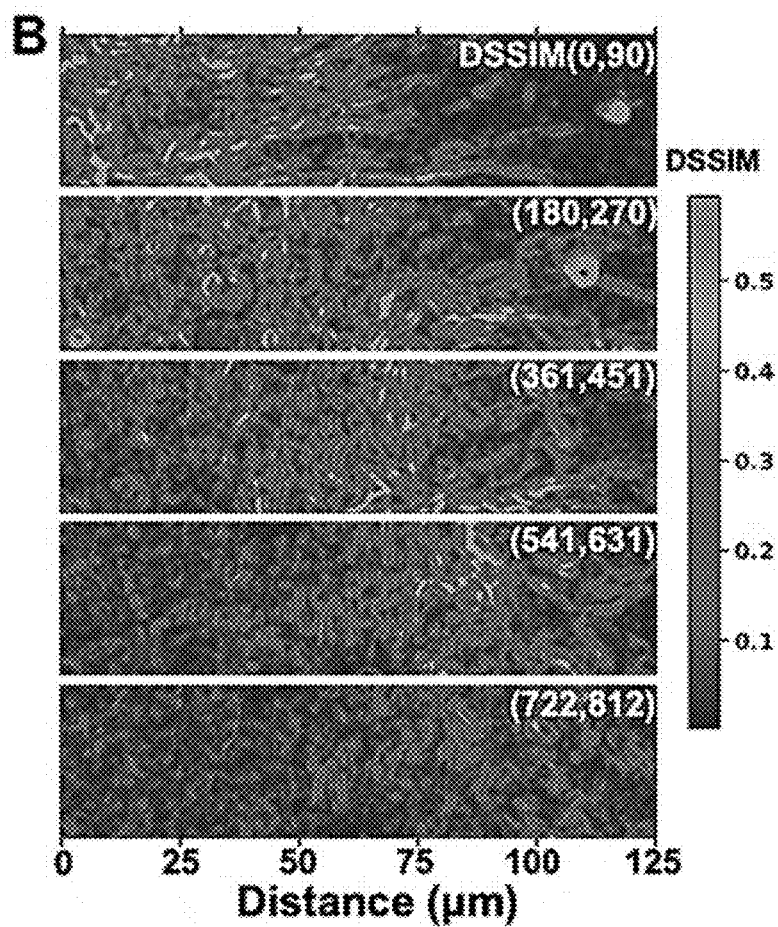
FIG. 7B
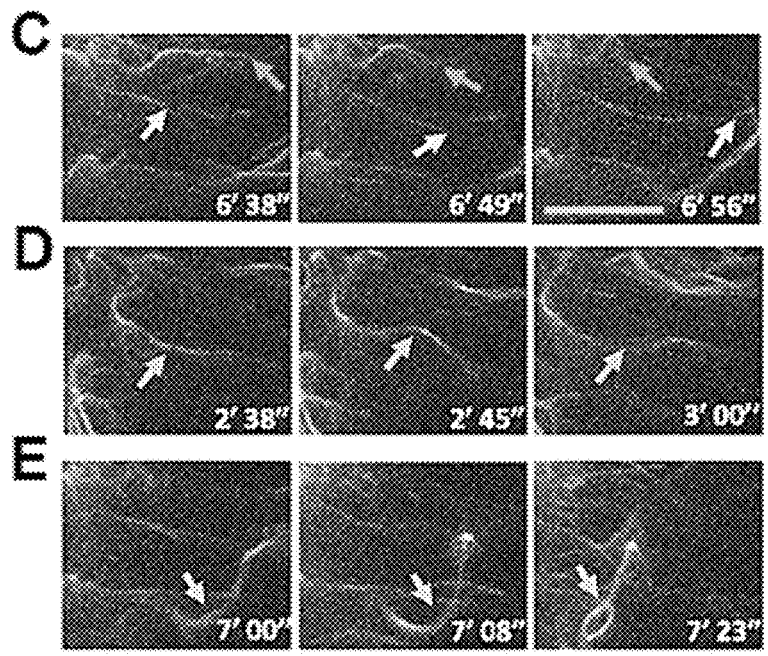
FIG. 7C-E

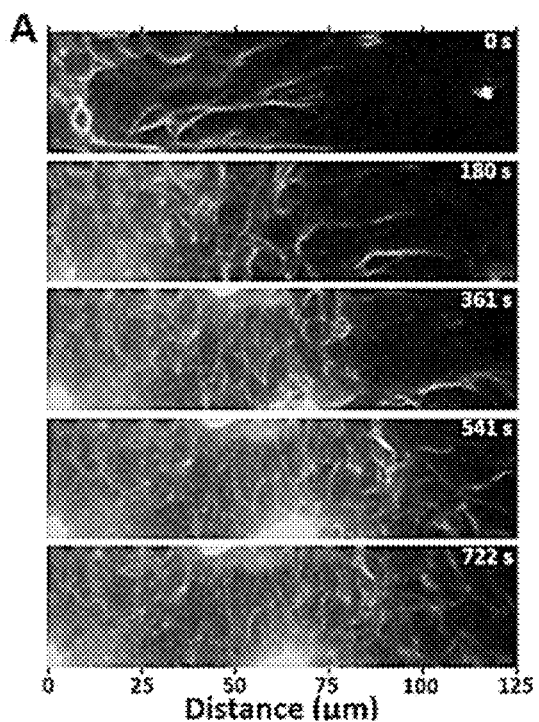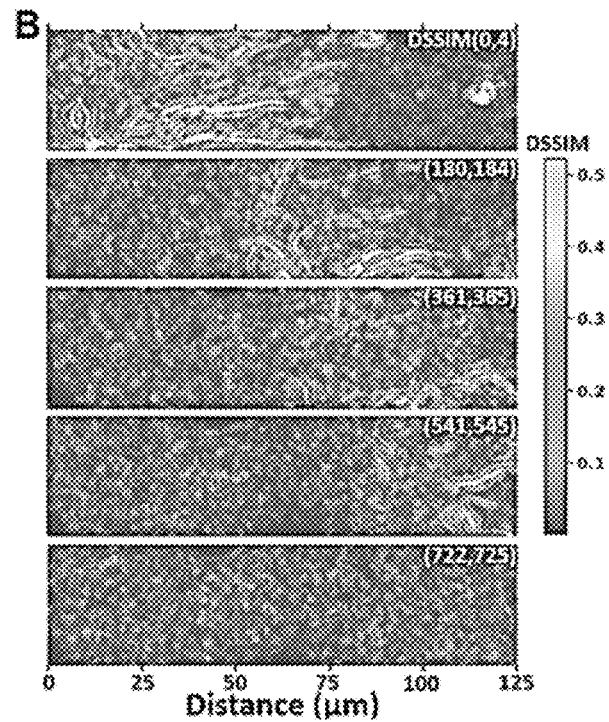
*FIG. 17A*  *FIG. 17B*
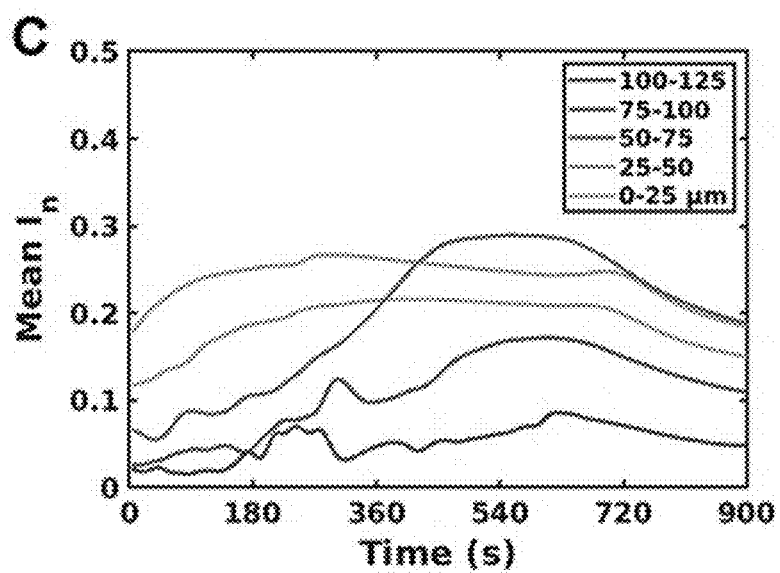
*FIG. 17C*

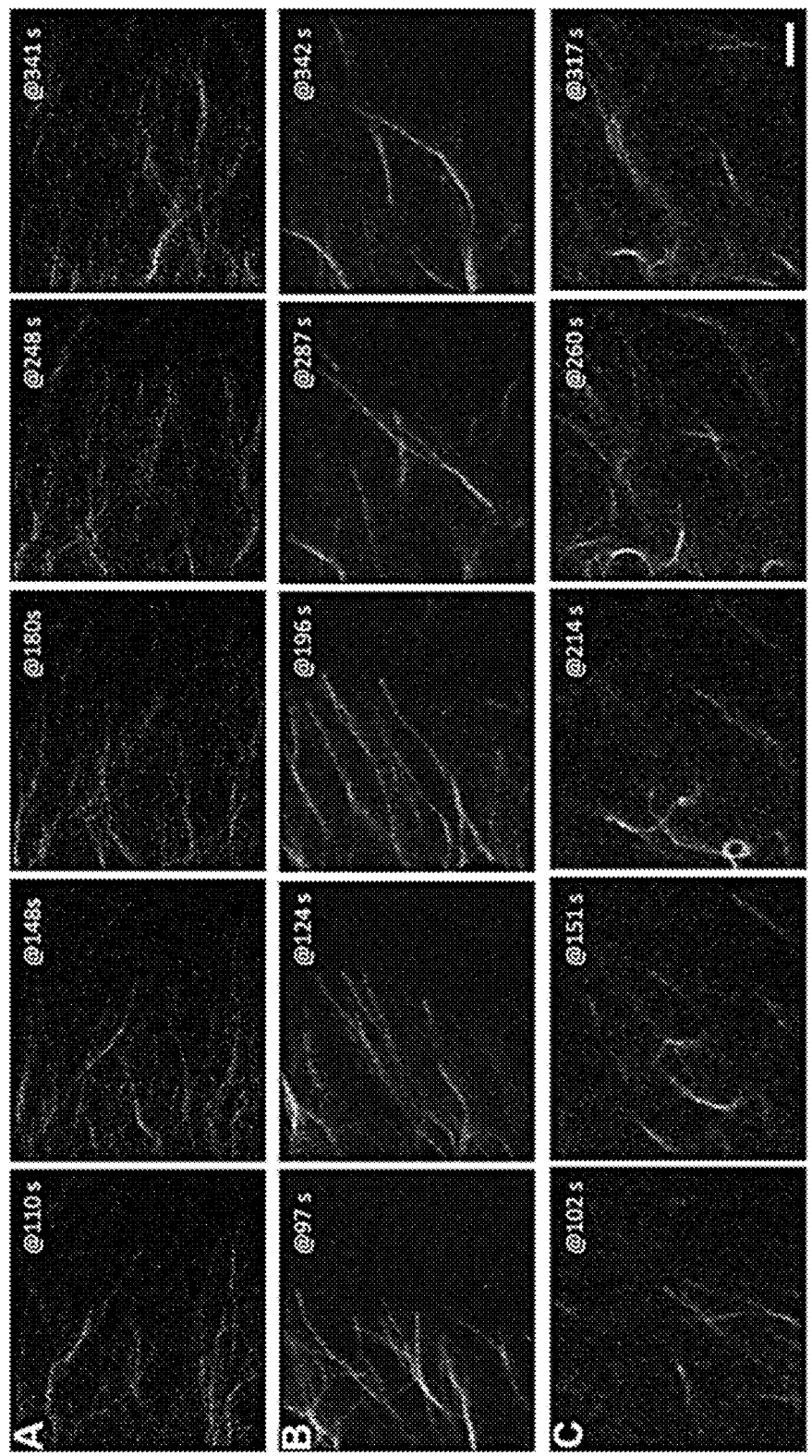
FIG. 24A-C

ELECTRICALLY FUELED ACTIVE SUPRAMOLECULAR MATERIALS, AND APPLICATIONS THEREOF

CROSS REFERENCE TO RELATED APPLICATIONS

This application is a U.S. National Stage Application filed under 35 U.S.C. § 371 and claims priority to International Application No. PCT/US22/038093, filed Jul. 22, 2022, which application claims benefit under 35 U.S.C. § 119 from Provisional Application Ser. No. 63/240,863, filed Sep. 3, 2021 and from Provisional Application Ser. No. 63/225,427, filed Jul. 23, 2021 the disclosures of which are incorporated herein by reference.

STATEMENT OF GOVERNMENT SUPPORT

This invention was made with government support under Grant No. DE-FG02-04ER46162 awarded by the Department of Energy, and Grant No. DMR-2011967 awarded by the National Science Foundation. The government has certain rights in the invention.

TECHNICAL FIELD

The disclosure provides for methods and systems to create active supramolecular materials by using electrically fueled dissipative assembly, and applications thereof, including in electronic devices.

BACKGROUND

Fuel-driven dissipative supramolecular assemblies in biology, such as actin filaments and microtubules contribute to the formation of complex, dynamic structures in living organisms and give rise to emergent functions such as motility, homeostasis, self-healing, and camouflage. Several synthetic dissipative supramolecular materials have been created using chemical or light as fuel, with the goal of furthering the understanding of biological systems and creating synthetic materials that have life-like dynamic properties. However, electrical energy, one of the most common energy sources, has remained unexplored for such purposes.

SUMMARY

The disclosure provides for the use of electrically fueled dissipative assembly as a new platform for creating active supramolecular materials. In the studies presented herein, it was shown that by using an electrochemical redox reaction network operating in mild aqueous buffers, a transient and highly active supramolecular assembly based on a redox-sensitive cysteine derivative is achieved by applying an electric potential. Additionally, it was shown that dissipative self-assembly as well as its emergent properties can be spatiotemporally controlled by modulation of electrical signals on patterned microelectrodes. Using electrical energy as a readily available and clean fuel, dissipative supramolecular materials were created rapidly (in seconds to minutes) and repetitively under mild conditions with directional and spatiotemporal control. As electronic signals are the default information carriers in modern technology, the described approach can be used to integrate active materials into electronic devices for bioelectronics applications.

It was further shown herein by using an electrochemical redox reaction network comprising two electrocatalysts, an anodic electrocatalyst and a cathodic electrocatalyst, a transient and highly active supramolecular assembly based on a redox-sensitive cysteine derivative is achieved by applying an electric potential. In this system, there is no generation of waste products, and no need to add any redox agents, such as reducing agents (e.g., DTT). It was further found herein, that multiple cycles of applying/turning off an electrical potential resulted in no significant decay in the system.

In a particular embodiment, the disclosure provides a method of creating active supramolecular materials, comprising: applying an electric potential using a plurality of electrodes to an electrochemical redox reaction to make a transient and active supramolecular assembly, wherein the electrochemical redox reaction network comprises monomers having redox sensitive motifs, wherein the electrochemical redox reaction network comprises a first electrocatalyst, and a second electrocatalyst, and wherein when the electric potential is applied to the electrochemical redox reaction network, the first electrocatalyst is oxidized, the second electrocatalyst is reduced, and the monomers convert into self-assembling building blocks that self assemble into active supramolecular materials. In another embodiment or further embodiment of a foregoing embodiment, the monomers are selected from small molecule organic compounds, amino acids and their derivatives, peptides and their derivatives, proteins and their derivatives, polymers, and micro-/nano-particles, wherein the monomers comprise one or more redox sensitive motifs. In another embodiment or further embodiment of a foregoing embodiment, the electric potential that is applied is a positive electric potential, a negative electric potential, or alternating positive and negative electric potentials. In another embodiment or further embodiment of a foregoing embodiment, the plurality of electrodes comprises at least one working electrode and at least one counter electrode. In another embodiment or further embodiment of a foregoing embodiment, the at least one working electrode and/or the at least one counter electrode comprises a plurality of electrodes that are individually addressable. In another embodiment or further embodiment of a foregoing embodiment, the plurality of the electrodes comprises a first portion of electrodes that are individually addressable working electrodes, and a second portion of electrodes that are connected as a single counter electrode. In another embodiment or further embodiment of a foregoing embodiment, the plurality of electrodes are micro- or nano-patterned electrodes. In another embodiment or further embodiment of a foregoing embodiment, the plurality of electrodes comprises one or more metals, metal containing compounds, graphite, glassy carbon, alloys, amalgams, or any combination of the foregoing. In another embodiment or further embodiment of a foregoing embodiment, between 1 µV to 220V of an electric potential is applied using the plurality of electrodes. In another embodiment or further embodiment of a foregoing embodiment, from 100 mV to 10 V of an electric potential is applied using the plurality of electrodes. In another embodiment or further embodiment of a foregoing embodiment, alternating current or direct current is used to generate the electrical potential. In another embodiment or further embodiment of a foregoing embodiment, the monomers having redox sensitive motifs comprise motifs that are oxidized and/or reduced when an electric potential is applied. In another embodiment or further embodiment of a foregoing embodiment, the oxidized first electrocatalyst oxidizes the redox sensitive motifs, converting the monomers into self-assembling building blocks that self assemble into active supramolecular materials. In another embodiment or further embodiment of a foregoing embodiment, the reduced second electrocatalyst reduces the active supramolecular materials into monomers and regenerates the first electrocatalyst by homogeneous electron transfer under open circuit conditions. In another embodiment or further embodiment of a foregoing embodiment, the first electrocatalyst comprises ferrocyanide. In another embodiment or further embodiment of a foregoing embodiment, the second electrocatalyst comprises a viologen. In another embodiment or further embodiment of a foregoing embodiment, the electrochemical redox reaction network does not comprise dithiothreitol. 2-mercaptoethanol, or tris(2-carboxyethyl)phosphine. In another embodiment or further embodiment of a foregoing embodiment, there is not significant decay of active supramolecular materials after multiple cycles of an electric potential being applied and turned off. In another embodiment or further embodiment of a foregoing embodiment, the formation of the active supramolecular materials does not generate any electrical waste products. In another embodiment or further embodiment of a foregoing embodiment, the active supramolecular materials have a definable structure or morphology. In another embodiment or further embodiment of a foregoing embodiment, the active supramolecular materials have a 0-, 1-, 2-, or 3-D structure selected from strands, fibers, lattices, sheets, vesicles, micelles, liquid microphases, aggregates, and nano- or micro- or macro-particles. In another embodiment or further embodiment of a foregoing embodiment, the active supramolecular materials have a fiber or strand-like structure. In another embodiment or further embodiment of a foregoing embodiment, the fiber or strand-like structure of the active supramolecular materials have an average diameter from 1 nm to 1 μm and lengths from 10 nm to 10 μm. In another embodiment or further embodiment of a foregoing embodiment, the fiber or strand-like structure of the active supramolecular materials have an average diameter from 5 nm to 100 nm and lengths from 100 nm to 1 μm. In another embodiment or further embodiment of a foregoing embodiment, the method is carried out in a bioelectronic device.

In a certain embodiment, the disclosure also provides a method of creating active supramolecular materials, comprising: applying an electric potential using a plurality of electrodes to an electrochemical redox reaction network to make a transient and active supramolecular assembly, wherein, the electrochemical redox reaction network comprises monomers having redox sensitive motifs, wherein, when the electric potential is applied to the electrochemical redox reaction network, the monomers convert into self-assembling building blocks that self assemble into active supramolecular materials, and wherein, the electrochemical redox reaction network comprises an electrocatalyst and a redox agent. In another embodiment or further embodiment of a foregoing embodiment, the monomers are selected from small molecule organic compounds, amino acids and their derivatives, peptides and their derivatives, proteins and their derivatives, polymers, and micro-/nano-particles, wherein the monomers comprise one or more redox sensitive motifs. In another embodiment or further embodiment of a foregoing embodiment, the electric potential that is applied is a positive electric potential, a negative electric potential, or alternating positive and negative electric potentials. In another embodiment or further embodiment of a foregoing embodiment, the plurality of electrodes comprises at least one working electrode and at least one counter electrode. In another embodiment or further embodiment of a foregoing embodiment, the at least one working electrode and/or the at least one counter electrode comprises a plurality of electrodes that are individually addressable. In another embodiment or further embodiment of a foregoing embodiment, the plurality of the electrodes comprises a first portion of electrodes that are individually addressable working electrodes, and a second portion of electrodes that are connected as a single counter electrode. In another embodiment or further embodiment of a foregoing embodiment, the plurality of electrodes are micro- or nano-patterned electrodes. In another embodiment or further embodiment of a foregoing embodiment, the plurality of electrodes comprises one or more metals, metal containing compounds, graphite, glassy carbon, alloys, amalgams, or any combination of the foregoing. In another embodiment or further embodiment of a foregoing embodiment, between 1 μV to 220V of an electric potential is applied using the plurality of electrodes. In another embodiment or further embodiment of a foregoing embodiment, from 100 mV to 10 V of an electric potential is applied using the plurality of electrodes. In another embodiment or further embodiment of a foregoing embodiment, alternating current or direct current is used to generate the electrical potential. In another embodiment or further embodiment of a foregoing embodiment, the monomers having redox sensitive motifs comprise motifs that are oxidized and/or reduced when an electric potential is applied. In another embodiment or further embodiment of a foregoing embodiment, the redox sensitive motifs are oxidized by electrons generated from the electrocatalyst when an electric potential is applied. In another embodiment or further embodiment of a foregoing embodiment, the electrocatalyst is a homogenous catalyst. In another embodiment or further embodiment of a foregoing embodiment, the electrocatalyst comprises ferrocyanide. In another embodiment or further embodiment of a foregoing embodiment, the redox agent is a reducing agent. In another embodiment or further embodiment of a foregoing embodiment, the redox agent is selected from dithiothreitol. 2-mercaptoethanol, and tris(2-carboxyethyl)phosphine. In another embodiment or further embodiment of a foregoing embodiment, the active supramolecular materials have a definable structure or morphology. In another embodiment or further embodiment of a foregoing embodiment, the active supramolecular materials have a 0-, 1-, 2-, or 3-D structure selected from strands, fibers, lattices, sheets, vesicles, micelles, liquid microphases, aggregates, and nano- or micro- or macro-particles. In another embodiment or further embodiment of a foregoing embodiment, the active supramolecular materials have a fiber or strand-like structure. In another embodiment or further embodiment of a foregoing embodiment, the fiber or strand-like structure of the active supramolecular materials have an average diameter from 1 nm to 1 μm and lengths from 10 nm to 10 μm. In another embodiment or further embodiment of a foregoing embodiment, the fiber or strand-like structure of the active supramolecular materials have an average diameter from 5 nm to 100 nm and lengths from 100 nm to 1 μm. In another embodiment or further embodiment of a foregoing embodiment, the method is carried out in a bioelectronic device.

In a particular embodiment, the disclosure also provides a method of creating active supramolecular materials, comprising: applying an electric potential using a plurality of electrodes to an electrochemical redox reaction network to make a transient and active supramolecular assembly, wherein, the electrochemical redox reaction network comprises monomers having redox sensitive motifs, wherein, when the electric potential is applied to the electrochemical redox reaction network, the monomers convert into self-assembling building blocks that self assemble into active supramolecular materials, and wherein, the electrochemical redox reaction network optionally further comprises electrocatalyst(s) and/or redox agent(s). In another embodiment or further embodiment of a foregoing embodiment, the monomers are selected from small molecule organic compounds, amino acids and their derivatives, peptides and their derivatives, proteins and their derivatives, polymers, and micro-/nano-particles, wherein the monomers comprise one or more redox sensitive motifs. In another embodiment or further embodiment of a foregoing embodiment, the electric potential that is applied is a positive electric potential, a negative electric potential, or alternating positive and negative electric potentials. In another embodiment or further embodiment of a foregoing embodiment, the plurality of electrodes comprises at least one working electrode and at least one counter electrode. In another embodiment or further embodiment of a foregoing embodiment, the at least one working electrode and/or the at least one counter electrode comprises a plurality of electrodes that are individually addressable. In another embodiment or further embodiment of a foregoing embodiment, the plurality of the electrodes comprises a first portion of electrodes that are individually addressable working electrodes, and a second portion of electrodes that are connected as a single counter electrode. In another embodiment or further embodiment of a foregoing embodiment, the plurality of electrodes are micro- or nano-patterned electrodes. In another embodiment or further embodiment of a foregoing embodiment, the plurality of electrodes comprises one or more metals, metal containing compounds, graphite, glassy carbon, alloys, amalgams, or any combination of the foregoing. In another embodiment or further embodiment of a foregoing embodiment, between 1 µV to 220V of an electric potential is applied using the plurality of electrodes. In another embodiment or further embodiment of a foregoing embodiment, from 100 mV to 10 V of an electric potential is applied using the plurality of electrodes. In another embodiment or further embodiment of a foregoing embodiment, alternating current or direct current is used to generate the electrical potential. In another embodiment or further embodiment of a foregoing embodiment, the monomers having redox sensitive motifs comprise motifs that are oxidized and/or reduced when an electric potential is applied. In another embodiment or further embodiment of a foregoing embodiment, the redox sensitive motifs are directly oxidized and/or reduced by the electrodes when an electric potential is applied. In another embodiment or further embodiment of a foregoing embodiment, the active supramolecular materials have a definable structure or morphology. In another embodiment or further embodiment of a foregoing embodiment, the active supramolecular materials have a 0-, 1-, 2-, or 3-D structure selected from strands, fibers, lattices, sheets, vesicles, micelles, liquid microphases, aggregates, and nano- or micro- or macro-particles. In another embodiment or further embodiment of a foregoing embodiment, the active supramolecular materials have a fiber or strand-like structure. In another embodiment or further embodiment of a foregoing embodiment, the fiber or strand-like structure of the active supramolecular materials have an average diameter from 1 nm to 1 µm and lengths from 10 nm to 10 µm. In another embodiment or further embodiment of a foregoing embodiment, the fiber or strand-like structure of the active supramolecular materials have an average diameter from 5 nm to 100 nm and lengths from 100 nm to 1 µm. In another embodiment or further embodiment of a foregoing embodiment, the electrochemical redox reaction network comprises electrocatalyst(s), and wherein the redox sensitive motifs are oxidized and/or reduced by the electrocatalyst(s) when an electric potential is applied. In another embodiment or further embodiment of a foregoing embodiment, the electrocatalyst(s) are homogenous electrocatalyst(s) or heterogenous electrocatalyst(s). In another embodiment or further embodiment of a foregoing embodiment, the electrocatalyst(s) are oxidized and/or reduced when the electric potential is applied. In another embodiment or further embodiment of a foregoing embodiment, the electrochemical redox reaction network further comprises redox agent(s) that are oxidants or reductants. In another embodiment or further embodiment of a foregoing embodiment, addition of the redox agent(s) promotes the disassembly of the active supramolecular materials into monomers. In another embodiment or further embodiment of a foregoing embodiment, the method is carried out in a bioelectronic device.

In a particular embodiment, the disclosure further provides an active supramolecular material made by a method of the disclosure.

In a certain embodiment, the disclosure provides for an article of manufacture that comprises an active supramolecular material disclosed herein. In a further embodiment, the article of manufacture is used in/for bioelectronics, biosensing, soft robotics, prosthetics, and neuromorphic computing.

DESCRIPTION OF DRAWINGS

FIG. 7A-F demonstrates active dynamic self-assembly fueled by electricity. (A) Processed CLSM snapshots highlighting the high dynamics for self-assembly at the gel front. (B) Structural dissimilarity frame series generated by calculating the DSSIM of CLSM frames taken 90 s apart. Bright pixels represent regions of high structural dissimilarity between local areas in frames of comparison, which corresponds to fiber dynamics. (C-E), Snapshots showing different active fiber movements: simultaneous fiber growth and shrinkage (C), white arrow for growing fiber and gray for shrinking), waving (D), and curling/looping (E) (CLSM images rendered with gamma=0.45 and 150% hue saturation for fiber visualization). (F) Mean DSSIM in each region seen in B. (the working electrode for A-E is out of frame on the left).

FIG. 17A-D demonstrates intensity analysis of normalized CLSM images and high temporal resolution DSSIM images. (A) CLSM snapshots highlighting the high dynamics for self-assembly at the fiber front, processed with EQs. 1-4. (B) DSSIM frame series of images takes 4 s apart, which captures fast dynamics. (C) Mean normalized intensity in each region show in A. (D) Mean DSSIM in each region seen in B.

FIG. 24A-C provides images showing the dynamic behavior of fiber growth when different concentrations of [MV]$^{2+}$ are utilized. The dynamic behavior of fiber growth at 2 mM [CSH]:120 mM [Fe(CN)$_6$]$^{4-}$ with (A) 200 mM, (B) 300 mM and (C) 400 mM concentration of [MV]$^{2+}$ with a constant electrode gap of 300 μm showing growth and shrinkage, curling or looping and waving of CSSC fibers.

DETAILED DESCRIPTION

Figure 1:
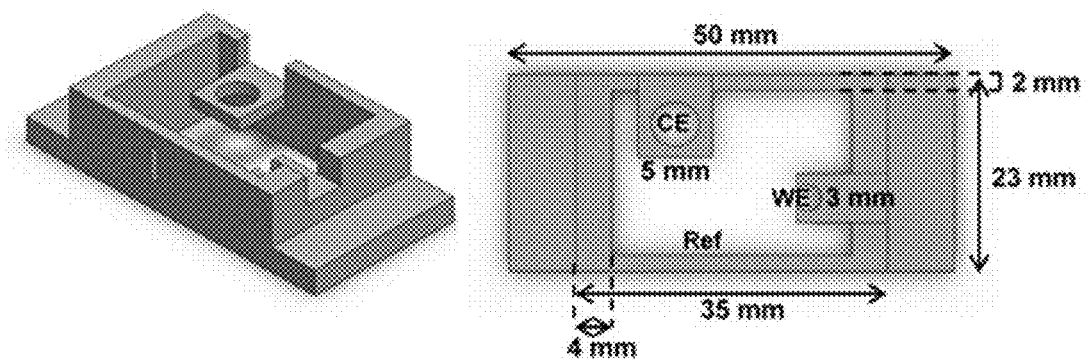
FIG. 1 presents a schematic representation of the 3D printed bulk electrochemical cell. The working electrode (WE) was held by the smaller opening on the right side of the cell. Imaging was through the bottom of the cell on the left edge of the working electrode. The counter electrode (CE) was held by the larger opening on the left side of the cell. The reference electrode (Ref) was fed through a slit and placed in the labeled section of the cell.

As used herein and in the appended claims, the singular forms "a," "an," and "the" include plural referents unless the context clearly dictates otherwise. Thus, for example, reference to "an assembly" includes a plurality of such assemblies and reference to "the electronic device" includes reference to one or more electronic devices and equivalents thereof known to those skilled in the art, and so forth.

Unless defined otherwise, all technical and scientific terms used herein have the same meaning as commonly understood to one of ordinary skill in the art to which this disclosure belongs. Although many methods and reagents are similar or equivalent to those described herein, the exemplary methods and materials are disclosed herein.

All publications mentioned herein are incorporated by reference in full for the purpose of describing and disclosing methodologies that might be used in connection with the description herein. The publications are provided solely for their disclosure prior to the filing date of the present application. Nothing herein is to be construed as an admission that the inventors are not entitled to antedate such disclosure by virtue of prior disclosure. Moreover, with respect to any term that is presented in one or more publications that is similar to, or identical with, a term that has been expressly defined in this disclosure, the definition of the term as expressly provided in this disclosure will control in all respects.

The term "active supramolecular materials" as used herein, refers to supramolecular materials that are formed from self-assembling building blocks when an electrical potential is provided. The supramolecular materials are active or dynamic in that when the conditions are changed, e.g., going from an oxidizing environment to a reducing environment, the supramolecular materials will dissemble or dissipate. Such conditions can be independent of whether the electrical potential is still being applied, or turned off. These growth and dissipating conditions can be tightly controlled based upon the components (e.g., redox agent, electrocatalyst, etc.) provided in the electrochemical redox reaction network.

The term "electrocatalyst" refers to is a catalyst that participates in electrochemical reactions. Electrocatalysts are a specific form of catalyst that functions at electrode surfaces or, most commonly, may be the electrode surface itself. An electrocatalyst can be heterogeneous such as a platinized electrode. Homogeneous electrocatalysts, which are soluble, assist in transferring electrons between the electrode and reactants, and/or facilitate an intermediate chemical transformation described by an overall half reaction. In a particular embodiment, an electrocatalyst disclosed herein is a homogenous electrocatalyst. An electrocatalyst may be oxidized when an electrical potential is applied, or alternatively be reduced. In a particular embodiment, the disclosure provides for the use of a dual, complementary electrocatalysts, where one electrocatalyst is oxidized when an electrical potential is applied while the second electrocatalyst is reduced. An example of the former electrocatalyst, can include ferrocyanide. An example of the latter electrocatalyst, can include a viologen.

The term "electrochemical redox reaction network" as used herein, refers to the all components that are utilized to generate active supramolecular materials from monomers which have redox sensitive motifs using the methods and systems disclosed herein. Specific examples of components making up an electrochemical redox reaction network are described more fully herein. Generally, the electrochemical redox reaction network comprises at least monomers having redox sensitive motifs and various buffers. Additional components of the electrochemical redox reaction network can include electrocatalysts, and redox agents.

The term "redox sensitive motifs" refers to motifs that are capable of either being reduced or oxidized when an electrical potential is applied. Examples of such motifs, include thiols, which can be oxidized to disulfide (S—S), sulfenic acid (S—OH), sulfinic acid ($SO_2H$), sulfonic acid ($SO_3H$), S-nitrosothiol (S—NO) or S-glutathione (S—SG); alkyne-based groups; aliphatic amines; azophenols; anthraquinones; phenothiazine; and tetrathiafulvalene. In a particular embodiment, a redox sensitive motif comprises a thiol group.

The term "self-assembling building blocks", as used herein, refers to monomers which when their redox sensitive motifs are either oxidized or reduced, become "activated" as self-assembling building blocks, such that these building blocks will react with other similar building blocks to self-assemble into supramolecular materials. Once formed the "self-assembling building blocks" typically do not require any additional redox agents or catalysts to self-assemble into supramolecular materials.

Dissipative self-assemblies are very common in biological systems, including for the cellular processes of division, proliferation, motility, self-healing, homeostasis, shape organization, camouflage, etc. These cellular processes persist in highly organized low-entropy nonequilibrium steady states that are fueled by chemical fuels. On a micro scale, innate supramolecular polymers like actin filaments and microtubules, assemble when activated by high-energy molecules such as adenosine triphosphate and guanosine triphosphate. Full consumption of the chemical fuel results in low energy, higher entropy waste products that cannot be used to sustain the biological assemblies, resulting in their dissociation. Accordingly, realizing persistent spatiotemporal control over energy input and fuel-dependent kinetics, needed to drive dissipative self-assemblies, is challenging.

Dissipative self-assemblies exhibit emergent properties far from equilibrium that are controlled spatiotemporally by the kinetics of fuel consumption. Over the past decade, several synthetic dissipative assembly systems have been developed using chemical or light as the major fuel sources. Chemical fuels such as alkylating agents, carbodiimides, ATP/GTP, and oxidants, have been used to drive dissipative assemblies of various building blocks including organic molecules, peptides, DNAs, and nanoparticles. Light has also been used to drive dissipative assembly of small molecules, proteins, and particles. These two main types of fueled active material systems complement each other with their respective advantages and limitations. Chemical fuels are versatile and have relatively high efficiency in generating the activated state, but face the challenge of generating waste in closed systems and are inherently limited in achieving spatiotemporal control of the dynamic assemblies. Light, on the other hand, is a cleaner fuel with no waste generation and can be delivered spatiotemporally to control the assembly process; however, it is limited by its penetration depth and has lower efficiency in generating an activated state. In contrast to aforementioned chemical and light fuel-driven assemblies, the disclosure provides for the use of electrical energy as a driver for active supramolecular assembly.

Electrical energy has remained mostly unexplored for fueling active supramolecular assembly. Electrical energy offers several advantages as a fuel: it is readily available, clean, and can be modulated spatiotemporally. Electrical fields have been used to actuate electroactive polymers and liquid crystalline materials, control particle assembly, and power particle motions through various forms of electrostrictive hydrodynamics. Electric potential has also been shown to polymerize organic monomers and modulate supramolecular interactions. Herein is reported the first electrically fueled (e-fueled) dissipative self-assembly of active supramolecular materials in bulk solution.

The disclosure provides methods and systems to e-fuel dissipative self-assembly of active supramolecular materials in bulk solution. In a particular embodiment, a method or system of the disclosure, utilizes an agent, like a reductant (e.g., DTT) or an oxidant, to promote regeneration of the electrocatalysts to catalyze e-fueling of dissipative self-assembly of active supramolecular materials. In an alternate, embodiment, a method or system of the disclosure, the method or system utilizes dual, complementary electrocatalysts (i.e., a cathodic electrocatalyst and an anodic electrocatalyst) to catalyze e-fueling of dissipative self-assembly of active supramolecular materials. In such a system, there is no need to utilize an agent, like a reductant (e.g., DTT) or an oxidant, to catalyze e-fueling of dissipative self-assembly of active supramolecular materials. Moreover, in such a method or system, there is no generation of electrochemical waste products.

The disclosure provides a versatile new platform for dissipative self-assembly of active materials by using an electric current as the fuel. Electrical inputs are able to rapidly and repetitively fuel the dissipative self-assembly of fibers with directionality, high dynamics, and precise spatiotemporal control. These combined features would be difficult to achieve with either chemical or light fueled dissipative systems. Accordingly, the methods and systems disclosed herein provide for a notable improvement over existing chemical and light fueled systems. Furthermore, the methods and systems of the disclosure operate in mild aqueous buffers, and utilize a range of voltage of electrical energy, including voltages less than 100 V and even less than 10 V, as a clean fuel energy source. These features make the methods and systems of the disclosure ideal for developing sustainable dissipative self-assembly systems as well as applying this design to other redox sensitive assembling building blocks and/or microelectrode arrays. In addition, electronic signals fueling dissipative assembly are promising for interfaces with biological systems at cellular and tissue levels, as exemplified by the classical patch-clamp system and cardiac pacemakers. As electronic signals are at the heart of many modern technologies, the described compositions, methods and systems of the disclosure find applications in sensors, prosthetics, soft robotics, neuromorphic computing and tissue engineering.

In a particular embodiment, the disclosure provides methods of creating supramolecular materials, comprising the step of applying an electric potential using electrode(s) to an electrochemical redox reaction network to make a transient and active supramolecular assembly. Generally, the electrode is used to apply an electric potential to an electrochemical redox reaction network, therefore driving changes in the redox state of one more redox sensitive motifs of the electrochemical redox reaction network. The electrode(s) itself, can be made from any material, as long as the material is a good electrical conductor. For example, the electrode can comprise one or more metals (e.g., silver, gold, copper, platinum), metal containing compounds (e.g., metal oxides, metal nitrides, metal chlorides, etc.), graphite, glassy carbon, alloys, amalgams, or any combination of the foregoing. In a particular embodiment, the electrode(s) comprise glassy carbon. The electrode can be patterned or unpatterned. In a particular embodiment, the electrodes can be micro- or nano-patterned electrodes. In a further embodiment, the electrodes are a micro-patterned array of interdigitated microelectrodes. The electrodes used in the methods and systems presented herein can vary by size and by geometry (e.g., cylindrical, oblong, etc.); can be made from different electrode materials (e.g., glassy carbon, platinum, etc.); and can have varying surface properties (e.g., texturized or smooth, modified with organic molecules, etc.). In another embodiment, the electrodes are used to apply an electric potential with a voltage of 1 µV, 5 µV, 10 µV, 20 µV, 30 µV, 40 µV, 50 µV, 60 µV, 70 µV, 80 µV, 90 µV, 100 µV, 200 µV, 300 µV, 400 µV, 500 µV, 600 µV, 700 µV, 800 µV, 900 µV, 1 mV, 5 mV, 10 mV, 25 mV, 50 mV, 100 mV, 200 mV, 250 mV, 300 mV, 400 mV, 500 mV, 600 mV, 700 mV, 800 mV, 900 mV, 1 V, 2 V, 3 V, 4 V, 5 V, 6 V, 7 V, 8 V, 9 V, 10 V, 15 V, 20 V, 30 V, 40 V, 50 V, 60 V, 70 V, 80 V, 90 V, 100 V, 110 V, 120 V, 130 V, 140 V, 150 V, 160 V, 170 V, 180 V, 190 V, 200 V, 210 V, 220 V, 250 V, 300 V, 350 V, 400 V, 450 V, 500 V, 600 V, 700 V, 800 V, 900 V, 1 kV, or a range that includes or is between any two of the foregoing voltages (e.g., 100 mV to 10 V). The electric potential can be applied using alternating current, or by using direct current. In a further embodiment, the electrodes are individually addressable or group together so as to be addressable as one or more groups of electrodes.

In a certain embodiment, the electrochemical redox reaction network comprises one or more types of monomers which comprises redox sensitive motifs that convert the monomers into self-assembling blocks upon a redox state change. The one or more type of monomers are typically redox sensitive compounds, including, but not limited to, small molecule organic compounds, such as peptides, peptoids, proteins, etc.; polymers, such as random and block copolymers; functional nano- and micro-particles; etc. The one or more type of monomers can have any structure as long as the monomers comprise one or more redox sensitive motif(s) that upon a change of the redox state (i.e., oxidation or reduction) the monomer turns from being a non-assembling monomer into forming self-assembling blocks. The self-assembling blocks can take any form, including but not limited to, strands, fibers, vesicles, micelles, nano- or microparticles, etc. In a particular embodiment, the electric potential that is applied to the electrochemical redox reaction network to make a transient and active supramolecular assembly is positive electric potential, negative electric potential, or alternating positive and negative electric potentials. The choice of electric potential is largely dependent on the identity of the redox sensitive motif of the monomers.

In a certain embodiment, the disclosure provides methods of creating supramolecular materials that comprises the use of one or more electrocatalyst(s) to facilitate active supramolecular assembly. In a further embodiment, the use of an electrocatalyst in the methods of the disclosure is optional, however, and is largely dependent upon the redox sensitive motifs of the monomers. For example, monomers comprising redox sensitive motifs may be directly oxidized, or reduced without the need of any electrocatalyst, and therefore the use of an electrocatalyst is optional. When electrocatalyst(s) are included in the methods of the disclosure the electrocatalyst(s) can be a homogenous or heterogenous catalysts, or some combination thereof. Examples of homogenous catalysts, include, but are not limited to, Bronsted and Lewis acids, transition metals, organometallic complexes (e.g., ferrocyanide), and organocatalysts (e.g., viologens). While ferrocyanide and viologens were used in the studies presented herein, any number of electrocatalysts can be used with the methods of the disclosure, as long as the electrocatalysts has similar functionality. Additionally, as noted above, in certain embodiments the redox sensitive motifs of the monomers can be oxidized and/or reduced directly without the need of an electrocatalyst.

In a particular embodiment, the disclosure also provides methods for creating supramolecular materials that comprises the use of redox agent(s) that facilitates active supramolecular assembly. In a further embodiment, the redox agent is a reductant that reduces redox sensitive motifs of the monomers. In some of the studies presented herein, a reductant (i.e., DTT) was used to reduce the CSSC to CSH, it should be noted that alternative reductants may also be used (e.g., β-mercaptoethanol). In an alternate embodiment, the redox agent is an oxidant that oxidizes redox sensitive motifs of the monomers. It should be noted that the redox agent is optional, especially in the case where the methods or systems of the disclosure utilize dual, complementary electrocatalysts (e.g., a cathodic electrocatalyst and an anodic electrocatalyst). More specifically, in the some of the studies presented herein, use of redox agent is not preferred with dual, complementary electrocatalysts, as such an agent is not needed to make active supramolecular assemblies, and can create waste products.

In a certain embodiment, a method or system of the disclosure provides for use of dual, complementary electrocatalysts that work in a synergistic manner at the cathode and anode to regenerate active electrocatalysts to catalyze e-fueling of dissipative self-assembly of active supramolecular materials without forming waste products. In particular, studies were conducted herein that demonstrated the successful incorporation of a pertinent but dissimilar cathodic e-fueling second catalyst to catalyze the regeneration of the self-assembly of active supramolecular materials without producing any chemical waste, while simultaneously reactivating the first electrocatalyst (into native state) formed in anodic half cycle. Due to its compatibility in many biological systems, viologen-based electrocatalysts were studied as a second electrocatalyst in the method and systems of the disclosure. Viologens, having the general formula of $(C_5H_4NR)_2^{n+}$, possess low cathodic potential with redox stability and electrochemical reversibility. It is expected that viologens can be used in many biological systems, including, but not limited to, enzymatic reduction assays, two-electron reduction pathways, electron-transfer-driven disulfide-to-thiol cleavage, switchable redox indicators, and inducing reduction of non-electroactive compounds. Viologens are small organic molecules that have been used in electrochromic devices and offer reversible functionality, low-voltage oxidation ability, and self-bleaching by electron transfer. It was found in the studies presented herein, that viologens exhibited a favorable potential range along with aqueous compatibility and non-reactivity to key entities (CSH, CSSC and electrocatalyst). By using viologens in a bifold catalyst system, it was found that the system effectively catalyzed the e-fueling of dissipative self-assembly of active supramolecular materials, without generating waste products. In a further embodiment, a method of the disclosure relies on transient formation of supramolecular fibers under electric field and their dissipation by high energy methyl viologen radical cations ($[MV]^{+\bullet}$). It was shown herein, that an anodic electrical input oxidizes the first electrocatalyst which further oxidizes CSH-thiol to CSSC-disulfide inducing fiber assembly. Concurrently at the cathode, the second electrocatalyst gets reduced resulting in reduction of CSSC to CSH and regeneration of first electrocatalyst by homogeneous electron transfer under open circuit conditions. Accordingly, the disclosure provides for a dual electrocatalyst driven fully e-fueled out-of-equilibrium dissipative self-assembly. It is expected that the methods and systems of the disclosure can be applied to different building blocks that fit in the suitable redox potential ranges to stimulate electrostable dissipative self-assemblies leading to other interesting features.

In a certain embodiment, the disclosure provides for use of the methods, and active supramolecular materials made therefrom, in various applications and devices, such as bioelectronics, biosensing, soft robotics, prosthetics, neuromorphic computing, etc.

The disclosure further provides that the methods and compositions described herein can be further defined by the following aspects (aspects 1 to 75):

1. A method of creating active supramolecular materials, comprising:
    applying an electric potential using a plurality of electrodes to an electrochemical redox reaction network to make a transient and active supramolecular assembly,
    wherein, the electrochemical redox reaction network comprises monomers having redox sensitive motifs,
    wherein, when the electric potential is applied to the electrochemical redox reaction network, the monomers convert into self-assembling building blocks that self assemble into active supramolecular materials, and
    wherein, the electrochemical redox reaction network optionally further comprises electrocatalyst(s) and/or redox agent(s).
2. The method of aspect 1, wherein the monomers are selected from small molecule organic compounds, amino acids and their derivatives, peptides and their derivatives, proteins and their derivatives, polymers, and micro-/nano-particles, wherein the monomers comprise one or more redox sensitive motifs.
3. The method of aspect 1 or aspect 2, wherein the electric potential that is applied is a positive electric potential, a negative electric potential, or alternating positive and negative electric potentials.
4. The method of any one of the preceding aspects, wherein the plurality of electrodes comprises at least one working electrode and at least one counter electrode.
5. The method of aspect 4, wherein the at least one working electrode and/or the at least one counter electrode comprises a plurality of electrodes that are individually addressable, preferably wherein the plurality of electrodes comprise 2, 3, 4, 5, 6, 7, 8, 9, 10, 11, 12, 13, 14, 15, 16, 17, 18, 19, 20, 30, 40, 50, 60, 70, 80, 90, or 100 electrodes that are individually addressable.
6. The method of any one of the preceding aspects, wherein the plurality of the electrodes comprises a first portion of electrodes that are individually addressable working electrodes, and a second portion of electrodes that are connected as a single counter electrode.
7. The method of any one of the preceding aspects, wherein the plurality of electrodes are micro- or nano-patterned electrodes.

8. The method of any one of the preceding aspects, wherein the plurality of electrodes comprises one or more metals, metal containing compounds, graphite, glassy carbon, alloys, amalgams, or any combination of the foregoing, preferably wherein the plurality of electrodes comprise glassy carbon.

9. The method of any one of the preceding aspects, wherein between 1 µV to 220V of an electric potential is applied using the plurality of electrodes.

10. The method of aspect 9, wherein from 100 mV to 10 V of an electric potential is applied using the plurality of electrodes.

11. The method of any one of the preceding aspects, wherein alternating current or direct current is used to generate the electrical potential, preferably alternating current is used to generate the electrical potential.

12. The method of any one of the preceding aspects, wherein the monomers having redox sensitive motifs comprise motifs that are oxidized and/or reduced when an electric potential is applied, preferably wherein the monomers comprise thiol groups, more preferably wherein the monomers comprise (R)—N-(1-amino-3-mercapto-1-oxopropan-2-yl)benzamide.

13. The method of aspect 12, wherein the redox sensitive motifs are directly oxidized and/or reduced by the electrodes when an electric potential is applied.

14. The method of any one of the preceding aspects, wherein the active supramolecular materials have a definable structure or morphology.

15. The method of any one of the preceding aspects, wherein the active supramolecular materials have a 0-, 1-, 2-, or 3-D structure selected from strands, fibers, lattices, sheets, vesicles, micelles, liquid microphases, aggregates, and nano- or micro- or macro-particles.

16. The method of any one of the preceding aspects, wherein the active supramolecular materials have a fiber or strand-like structure.

17. The method of aspect 16, wherein the fiber or strand-like structure of the active supramolecular materials have an average diameter from 1 nm to 1 µm and lengths from 10 nm to 10 µm.

18. The method of aspect 17, wherein the fiber or strand-like structure of the active supramolecular materials have an average diameter from 5 nm to 100 nm and lengths from 100 nm to 1 µm.

19. The method of any one of the preceding aspects, wherein the electrochemical redox reaction network comprises electrocatalyst(s), and wherein the redox sensitive motifs are oxidized and/or reduced by the electrocatalyst(s) when an electric potential is applied.

20. The method of aspect 19, wherein the electrocatalyst(s) are homogenous electrocatalyst(s) or heterogenous electrocatalyst(s).

21. The method of aspect 19 or aspect 20, wherein the electrocatalyst(s) are oxidized and/or reduced when the electric potential is applied.

22. The method of any one of the preceding aspects, wherein the electrochemical redox reaction network further comprises redox agent(s) that are oxidants or reductants.

23. The method of aspect 22, wherein addition of the redox agent(s) promotes the disassembly of the active supramolecular materials into monomers.

24. The method of any one of the preceding aspects, wherein the method is carried out in a bioelectronic device.

25. A method of creating active supramolecular materials, comprising:
applying an electric potential using a plurality of electrodes to an electrochemical redox reaction network to make a transient and active supramolecular assembly,
wherein, the electrochemical redox reaction network comprises monomers having redox sensitive motifs,
wherein, when the electric potential is applied to the electrochemical redox reaction network, the monomers convert into self-assembling building blocks that self assemble into active supramolecular materials, and
wherein, the electrochemical redox reaction network comprises an electrocatalyst and a redox agent.

26. The method of aspect 25, wherein the monomers are selected from small molecule organic compounds, amino acids and their derivatives, peptides and their derivatives, proteins and their derivatives, polymers, and micro-/nano-particles, wherein the monomers comprise one or more redox sensitive motifs.

27. The method of aspect 25 or aspect 26, wherein the electric potential that is applied is a positive electric potential, a negative electric potential, or alternating positive and negative electric potentials.

28. The method of any one of aspects 25 to 27, wherein the plurality of electrodes comprises at least one working electrode and at least one counter electrode.

29. The method of aspect 28, wherein the at least one working electrode and/or the at least one counter electrode comprises a plurality of electrodes that are individually addressable.

30. The method of any one of aspects 25 to 29, wherein the plurality of the electrodes comprises a first portion of electrodes that are individually addressable working electrodes, and a second portion of electrodes that are connected as a single counter electrode.

31. The method of any one of aspects 25 to 30, wherein the plurality of electrodes are micro- or nano-patterned electrodes.

32. The method of any one of aspects 25 to 31, wherein the plurality of electrodes comprises one or more metals, metal containing compounds, graphite, glassy carbon, alloys, amalgams, or any combination of the foregoing.

33. The method of any one of aspects 25 to 32, wherein between 1 µV to 220V of an electric potential is applied using the plurality of electrodes.

34. The method of aspect 33, wherein from 100 mV to 10 V of an electric potential is applied using the plurality of electrodes.

35. The method of any one of aspects 25 to 34, wherein alternating current or direct current is used to generate the electrical potential.

36. The method of any one of aspects 25 to 35, wherein the monomers having redox sensitive motifs comprise motifs that are oxidized and/or reduced when an electric potential is applied, preferably wherein the monomers comprise thiol groups, more preferably wherein the monomers comprise (R)—N-(1-amino-3-mercapto-1-oxopropan-2-yl)benzamide.

37. The method of aspect 36, wherein the redox sensitive motifs are oxidized by electrons generated from the electrocatalyst when an electric potential is applied.

38. The method of aspect 37, wherein the electrocatalyst is a homogenous catalyst.

39. The method of aspect 37 or aspect 38, wherein the electrocatalyst comprises ferrocyanide.
40. The method of any one of aspects 25 to 39, wherein the redox agent is a reducing agent.
41. The method of any one of aspects 25 to 40, wherein the redox agent is selected from dithiothreitol, 2-mercaptoethanol, and tris(2-carboxyethyl)phosphine.
42. The method of any one of aspects 25 to 41, wherein the active supramolecular materials have a definable structure or morphology.
43. The method of any one of aspects 25 to 42, wherein the active supramolecular materials have a 0-, 1-, 2-, or 3-D structure selected from strands, fibers, lattices, sheets, vesicles, micelles, liquid microphases, aggregates, and nano- or micro- or macro-particles.
44. The method of aspect 43, wherein the active supramolecular materials have a fiber or strand-like structure.
45. The method of aspect 44, wherein the fiber or strand-like structure of the active supramolecular materials have an average diameter from 1 nm to 1 μm and lengths from 10 nm to 10 μm.
46. The method of aspect 45, wherein the fiber or strand-like structure of the active supramolecular materials have an average diameter from 5 nm to 100 nm and lengths from 100 nm to 1 μm.
47. The method of any one of aspects 25 to 46, wherein the method is carried out in a bioelectronic device.
48. A method of creating active supramolecular materials, comprising:
    applying an electric potential using a plurality of electrodes to an electrochemical redox reaction to make a transient and active supramolecular assembly,
    wherein the electrochemical redox reaction network comprises monomers having redox sensitive motifs,
    wherein the electrochemical redox reaction network comprises a first electrocatalyst, and a second electrocatalyst,
    wherein when the electric potential is applied to the electrochemical redox reaction network, the first electrocatalyst catalyzes the generation of electrons at an anode, the second electrocatalyst catalyzes the adsorption of electrons at a cathode, and the monomers convert into self-assembling building blocks that self assemble into active supramolecular materials.
49. The method of aspect 48, wherein the monomers are selected from small molecule organic compounds, amino acids and their derivatives, peptides and their derivatives, proteins and their derivatives, polymers, and micro-/nano-particles, wherein the monomers comprise one or more redox sensitive motifs.
50. The method of aspect 48 or aspect 49, wherein the electric potential that is applied is a positive electric potential, a negative electric potential, or alternating positive and negative electric potentials.
51. The method of any one of aspect 48 to 50, wherein the plurality of electrodes comprises at least one working electrode and at least one counter electrode.
52. The method of aspect 48, wherein the at least one working electrode and/or the at least one counter electrode comprises a plurality of electrodes that are individually addressable.
53. The method of any one of aspects 48 to 52, wherein the plurality of the electrodes comprises a first portion of electrodes that are individually addressable working electrodes, and a second portion of electrodes that are connected as a single counter electrode.
54. The method of any one of aspects 48 to 53, wherein the plurality of electrodes are micro- or nano-patterned electrodes.
55. The method of any one of aspects 48 to 54, wherein the plurality of electrodes comprises one or more metals, metal containing compounds, graphite, glassy carbon, alloys, amalgams, or any combination of the foregoing.
56. The method of any one of aspects 48 to 55, wherein between 1 μV to 220V of an electric potential is applied using the plurality of electrodes.
57. The method of aspect 56, wherein from 100 mV to 10 V of an electric potential is applied using the plurality of electrodes.
58. The method of any one of aspects 48 to 57, wherein alternating current or direct current is used to generate the electrical potential.
59. The method of any one of aspects 48 to 58, wherein the monomers having redox sensitive motifs comprise motifs that are oxidized and/or reduced when an electric potential is applied, preferably wherein the monomers comprise thiol groups, more preferably wherein the monomers comprise (R)—N-(1-amino-3-mercapto-1-oxopropan-2-yl)benzamide.
60. The method of aspect 59, wherein the oxidized first electrocatalyst oxidizes the redox sensitive motifs, converting the monomers into self-assembling building blocks that self assemble into active supramolecular materials.
61. The method of aspect 60, wherein the reduced second electrocatalyst reduces the active supramolecular materials into monomers and regenerates the first electrocatalyst by homogeneous electron transfer under open circuit conditions.
62. The method of any one of aspects 48 to 61, wherein the first electrocatalyst comprises ferrocyanide.
63. The method of any one of aspects 48 to 62, wherein the second electrocatalyst comprises a viologen.
64. The method of any one of aspects 48 to 63, wherein the electrochemical redox reaction network does not comprise dithiothreitol, 2-mercaptoethanol, or tris(2-carboxyethyl)phosphine.
65. The method of any one of aspects 48 to 64, wherein there is not significant decay of active supramolecular materials after multiple cycles of an electric potential being applied and turned off.
66. The method of any one of aspects 48 to 65, wherein the formation of the active supramolecular materials does not generate any electrical waste products.
67. The method of any one of aspects 48 to 66, wherein the active supramolecular materials have a definable structure or morphology.
68. The method of aspect 67, wherein the active supramolecular materials have a 0-, 1-, 2-, or 3-D structure selected from strands, fibers, lattices, sheets, vesicles, micelles, liquid microphases, aggregates, and nano- or micro- or macro-particles.
69. The method of aspect 68, wherein the active supramolecular materials have a fiber or strand-like structure.
70. The method of aspect 69, wherein the fiber or strand-like structure of the active supramolecular materials have an average diameter from 1 nm to 1 μm and lengths from 10 nm to 10 μm.

71. The method of aspect 70, wherein the fiber or strand-like structure of the active supramolecular materials have an average diameter from 5 nm to 100 nm and lengths from 100 nm to 1 µm.

72. The method of any one of aspects 48 to 71, wherein the method is carried out in a bioelectronic device.

73. An active supramolecular material made by the method of any one of aspects 1 to 72.

74. An article of manufacture that comprises the active supramolecular material of aspect 73.

75. The article of manufacture of aspect 74, wherein the article of manufacture is used in/for bioelectronics, biosensing, soft robotics, prosthetics, and neuromorphic computing.

The following examples are intended to illustrate but not limit the disclosure. While they are typical of those that might be used, other procedures known to those skilled in the art may alternatively be used.

EXAMPLES

Reagents and supplies. All reagents were purchased at the indicated quality and used without further purification. Potassium ferricyanide (98%) and Nile Red (99%) were purchased from Acros Organics. Hydrochloric acid (HCl) (ACS grade), methanol (MeOH) (ACS grade), and acetic acid (ACS grade) were purchased from EMD Millipore Corporation. Potassium ferrocyanide trihydrate (reagent grade), sodium acetate (NaOAc) (ACS grade), sodium chloride (NaCl) (ACS grade), dibasic sodium phosphate heptahydrate ($Na_2HPO_4 \cdot 7H_2O$) (ACS grade), sodium hydroxide (NaOH) (ACS grade), tris(hydroxymethyl)aminomethane ($NH_2C(CH_2OH)_3$) (tris base) (mol. bio. grade), and DL-dithiothreitol (DTT) (98%) were purchased from Fisher Chemical. Tris(hydroxymethyl) aminomethane hydrochloride (tris HCl) (99.3%) was purchased from J.T. Baker. Tris(2-carboxyethyl)phosphine hydrochloride (TCEP) (>98.0%) was purchased from Tokyo Chemical Industry. N-acetylcysteine amide (98%) was purchased from Accel Pharmatech. 30% hydrogen peroxide (ACS Grade) was purchased from Sigma Aldrich. Sulfuric acid (95-98% ACS Grade) was purchased from VWR Chemicals. Shipley 1827 photoresist (now MICROPOSIT™ S1800® G2 Series Photoresist) and Shipley MF319 developer (now MICROPOSIT™ MF®-319) were purchased from MicroChem (now Kayaku Advanced Materials). Monosodium phosphate monohydrate ($NaH_2PO_4 \cdot H_2O$) (ACS grade) was purchased from Mallinckrodt AR. 2-(N-morpholino) ethanesulfonic acid (MES) (98%) was purchased from Alfa Aesar. (R)—N-(1-amino-3-mercapto-1-oxopropan-2-yl)benzamide (CSH) was synthesized based on literature procedure. Glassy carbon electrodes were purchased from SPI Instruments. Standard calomel electrode was purchased from CH Instruments. Quantafoil® R2/2 TEM grids were purchased from Electron Microscopy Sciences.

Instrumentation. All electrochemical and bulk self-assembly studies were conducted in open atmosphere at ambient pressure and temperature, pH was measured with a Fischer Scientific Aaccumet® AB15 pH Meter. Ultra-performance liquid chromatography (UPLC) was performed on a Waters ACUITY UPLC H-Class Plus system with an ACQUITY UPLC BEH C18 1.7 µm column running on Empower 3 software. Rheology measurements were conducted on a TA Instruments Discovery Series HR-2 Hybrid Rheometer using the TRIOS software package. Confocal laser scanning microscopy (CLSM) was performed on a Carl Zeiss 780 Laser Scanning Microscope running on Zen 2012 software. The electrochemical reactions were controlled using a WaveNow$^{XV}$ potentiostat running on AfterMath software. Electrochemical impedance spectroscopy (EIS) and single frequency electrochemical impedance spectroscopy were conducted using a Gamry Ref600 potentiostat running on Gamry v.7 software. For kinetic studies, stopped-flow UV-Vis measurements were taken on an Applied Photophysics SX-18 stopped-flow supported by ProDataSX software. Cryogenic-transmission electron microscopy (cryo-TEM) samples were prepared using an Automatic Plunge Freezer ME GP2 (Leica Microsystems). Cryo-TEM images were obtained using a JEM-2100F TEM supported by DigitalMicrograph software (Gatan) with a Gatan OneView CMOS camera at 4 k×4 k resolution.

Inverted vial gel test. To a 1-dram vial was added 1 mL of 5.0 mM CSH in pH 8 buffer and 0.2 mL of 150 mM ferricyanide. The vial was quickly shaken by hand and allowed to sit for 10 minutes before inversion. To the same vial was added 0.4 mL of 250 mM DTT in pH 8 buffer, and the vial was allowed to stand for one hour before inversion (see FIG. 3D).

Representative preparation of sample solution for dissipative assembly studies. To a 1-dram vial was added CSH in methanol (50 mM, 107 uL). To this vial was added 2.03 mL of a solution of pH 8 buffer with ferrocyanide (150 mM) and DTT (20 mM). The solution was sonicated to aid in the solvation of the CSH and used immediately after preparation. For preparation of samples for CLSM, a 0.5 mM solution of Nile Red in methanol was used in place of methanol in the preparation of the CSH solution, resulting in a final concentration of 25 µM Nile Red.

Cyclic voltammetry. Cyclic voltammetry was conducted in a nitrogen filled glovebox using a Pine Wavedriver 10 potentiostat with AfterMath software. A three-electrode setup was used with glassy carbon working and counter electrodes and a saturated calomel (SCE) reference electrode. Scan speed was 50 mV/s with a scan window of -200 to 1000 mV vs. SCE. Samples contained 1 mM ferrocyanide. 1 mM CSH, or 1 mM of both compounds, in pH 7 phosphate buffer (see FIG. 1C).

Figure 3E:
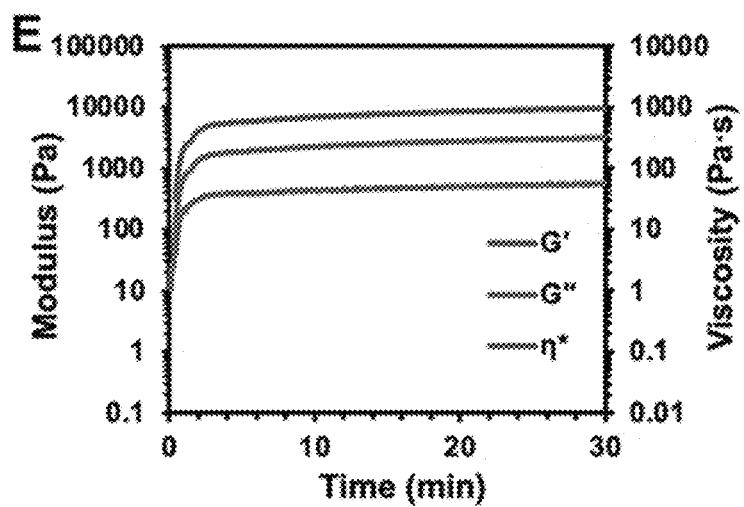
Figure 4:
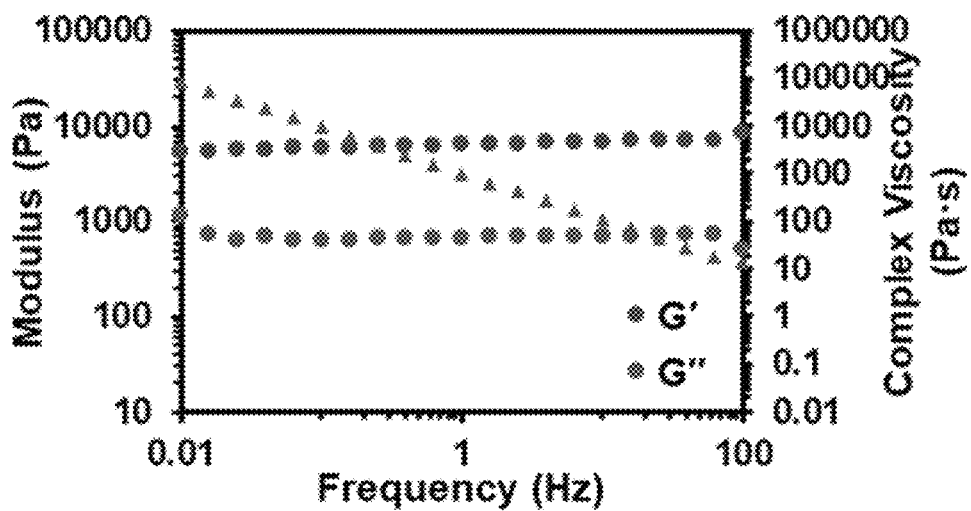
FIG. 4 presents a frequency sweep of the gel showing change in modulus and complex viscosity.
Figure 5:
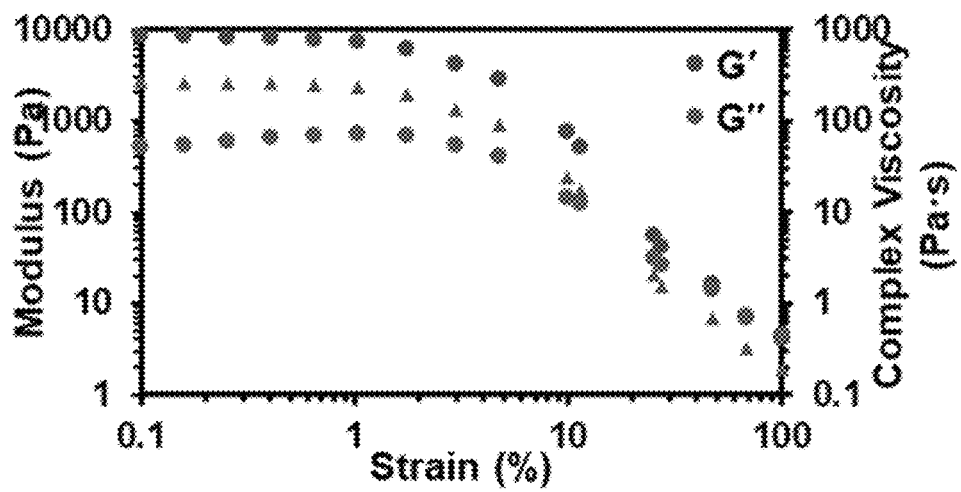
FIG. 5 presents a train sweep of the gel showing change in modulus and complex viscosity.

Rheology. Rheology measurements were carried out on TA Instruments Discovery Series HR-2 Hybrid Rheometer using the standard 40 mm parallel plate geometry. The gap distance of the rheometer geometry was set to 750 µm. The sample stage was heated to 85° C., and 0.9 mL of a solution of 5 mM CSH in pH 8 buffer was added into the gap through the use of a long 22-gauge syringe needle. 0.05 mL of 150 mM ferricyanide solution in pH 8 buffer was added under the geometry in the same manner. Upon addition, the temperature was reduced to 25° C., and hydrogel formed immediately while a time sweep of the gel was measured by subjecting the materials to an oscillatory strain of 0.1% at a frequency of 5 Hz (see FIG. 3E. FIG. 4, and FIG. 5).

Confocal laser scanning microscopy (CLSM). CLSM experiments were conducted on a Zeiss LSM 780 confocal laser scanning microscope with an excitation beam of 561 nm. Fluorescence was collected from 570 to 753 nm. Nile Red was used as an intercalating dye to visualize the formed fibers, as is common practice with similar systems. The footage taken with the Zeiss 63× immersion objective surveyed an area of 134.95 µm×134.95 µm when square and 134.95 µm×32.68 µm when rectangular footage was obtained. Frame times were adjusted based on the experiment, ranging from 3.75 s to 30.98 s. The footage taken with the Zeiss 10× immersion objective surveyed an area of 850.19 µm×850.19 µm. Frame times were 7.75 s long.

Transient fiber growth and dissipation. 1 mL of the sample solution consisting of 2.5 mM CSH. 20 mM DTT. 150 mM ferrocyanide, and 25 μM Nile Red in pH 8 buffer was added to the fabricated bulk electrochemical cell fitted with glassy carbon working and counter electrodes and a silver pseudo-reference electrode (see FIG. 1, and FIG. 3). A potential of 430 mV vs. Ag/Ag$^+$ was applied for 300 s and the fiber growth was captured by CLSM continuously every 7.5 sec. Then the electrical potential was removed and the grown fibers were allowed to dissolve, which was also monitored by CLSM (see FIG. 6A).

Repetitive fiber growth and dissipation. 1 mL of the sample solution consisting of 2.5 mM CSH. 20 mM DTT. 150 mM ferrocyanide, and 25 μM Nile Red in pH 8 buffer was added to the bulk electrochemical cell (see FIG. 1). A cyclic voltammetry experiment was run from −200 mV to 600 mV vs. Ag/Ag$^+$ at a scan rate of 100 mV/s. A 600 mV potential was applied for 16 s then stopped for 24 min. The process was repeated 10 times. The fiber growth and dissolution were monitored by CLSM over time. The average fluorescence intensity of each frame was extracted, and the average fluorescence intensity across all frames was normalized to give a graph of normalized fluorescence intensity over time (see FIG. 6D).

Observing the dynamics of the dissipative self-assembly. 1 mL of the sample solution consisting of 2.5 mM CSH. 20 mM TCEP. 150 mM ferrocyanide, and 25 μM Nile Red in pH 8 buffer was added to a bulk electrochemical cell. Fiber growth was initiated by applying a potential of 2 V vs. Ag/Ag$^+$ for 11 s. The fiber front was followed by moving the stage of the CLSM. The system was subsequently supplied with 10 μA for 5 seconds three times as fiber growth halted. Finally, a potential of 600 mV vs. Ag/Ag$^+$ was applied and the gel dynamics were observed (see FIG. 7A-E).

Figure 2:
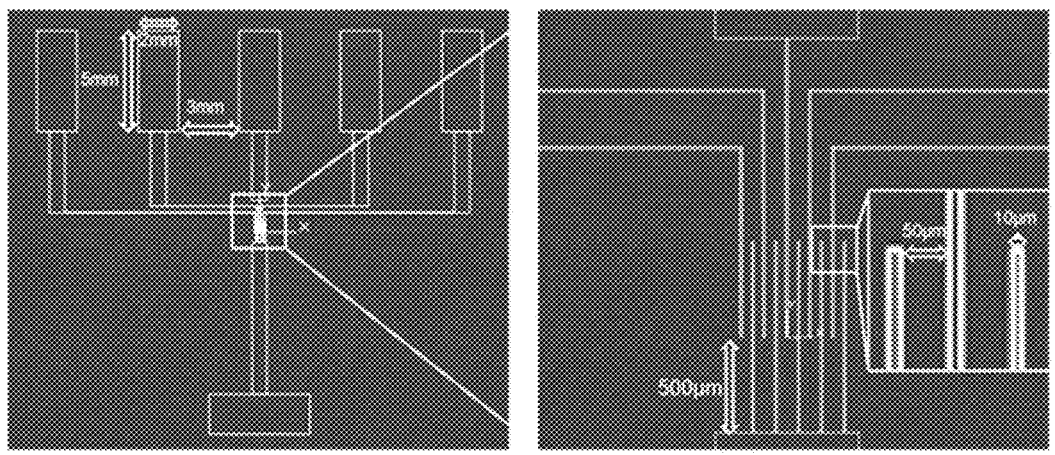
FIG. 2 presents a schematic representation of the fabricated interdigitated microelectrode array depicting five individually addressable working electrodes at the top and one connected counter/reference electrode at the bottom.
Figure 8A:
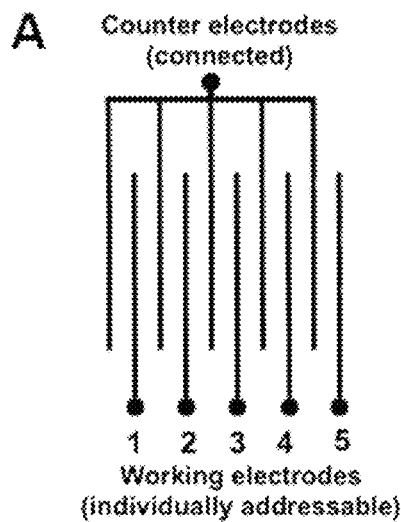
FIG. 8A-D presents spatiotemporal control of e-fueled dissipative assembly. (A) Schematic representation of the individually addressable interdigitated gold microelectrodes. (B) Growth of fibers at each of the working electrodes in A by selectively applying electric potential at different times. (CLSM images rendered at 150% hue saturation) (C) Normalized fluorescence intensity measured around each working electrode to monitor fiber growth pattern after selectively applying electric potential to each electrode at different times for varying durations. Each line corresponds to the working electrode of matching number and colour in B. The bottom trace superimposes 1-5 into one. If placed on a treble staff with the dark gray graph at middle C, the pattern mimics that of the first four measures of Beethoven's "Ode to Joy" (see FIG. 9). (D) Fluorescence and impedance changes in the system upon cycling fiber growth at 2.4 V and fiber dissolution at 0 V over 5 cycles.
Figure 8B:
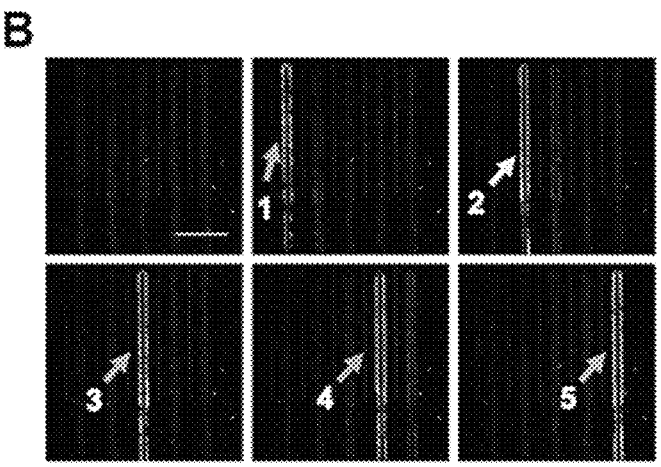
Figure 8C:
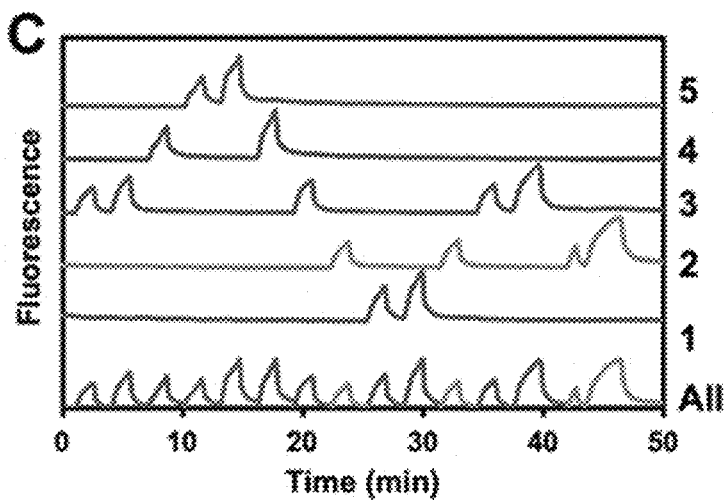
Figure 9:
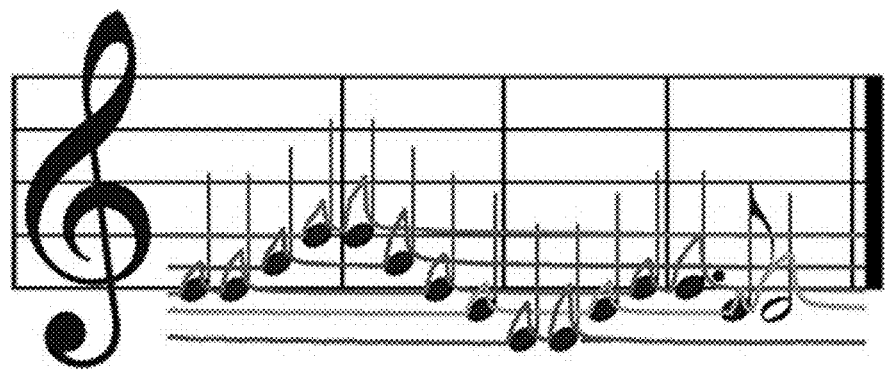
FIG. 9 presents a modified sheet music for the first four measures of Beethoven's "Ode to Joy" superimposed with the fluorescence intensity of the fibers grown on the individually addressable gold microelectrodes through applying electric potential to different microelectrodes at different time points. If placed on a treble staff with the dark gray signal at middle C, the pattern mimics that of the first four measures of Beethoven's "Ode to Joy".

Spatiotemporal control of fiber assembly/disassembly. The fabricated interdigitated gold microelectrodes on a glass substrate (see FIG. 2, and FIG. 8A) were used in these experiments. Each of the working electrodes was individually addressable, while the five counter electrodes were connected. A 2 mm diameter whole was punched into a 10-layer thick sheet of electrical tape. This was placed onto the electrodes to create a small well for the solution at the interdigitated electrode junction. To this well was added 15 μL of filtered (0.45 μm cellulose acetate filter) sample solution containing 2.5 mM CSH. 25 μM Nile Red. 150 mM ferrocyanide, and 60 mM DTT. A cyclic voltammetry experiment was run from −200 mV to 2.6 V vs. ref at a scan rate of 100 mV/s at each electrode before growing fibers. A potential of 2.4 V vs. ref was applied to grow initiate fiber growth at each working electrode for a total of 10 minutes each, which was then allowed to dissolve until the fibers were no longer observable on the CLSM. To demonstrate spatiotemporal control of fiber growth, a potential of 2.4 V vs. ref was applied to specific working electrodes at different time for desired duration. The fiber growth and dissolution were monitored in real time by CLSM. As an example, the fibers were grown and allowed to dissolve in the pattern resembling that of the opening four measures of Beethoven's "Ode to Joy." The "quarter note" fibers were grown for 90 s at 2.4 V vs. ref, followed by 90 s for dissolution with no applied potential bias. The "dotted quarter note" fibers were grown for 135 s at 2.4 V vs. ref, followed by 135 s for dissolution with no applied potential bias. The "eighth note" fibers were grown for 45 s at 2.4 V vs. ref, followed by 45 s for dissolution with no applied potential bias. The "half note" fibers were grown for 180 s at 2.4 V vs. ref, followed by 180 s for dissolution with no applied potential bias (see FIGS. 8B-C and FIG. 9).

Figure 10:
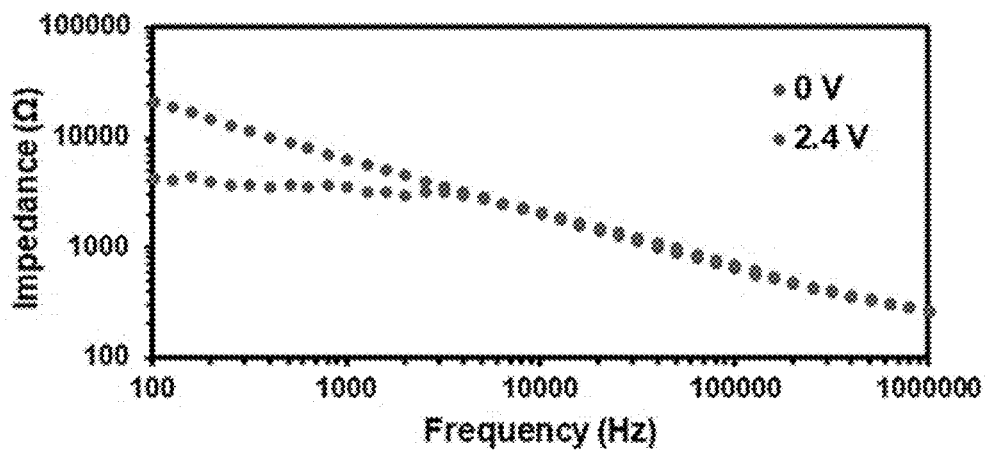
FIG. 10 shows Bode plots of control sample consisting of 150 mM ferrocyanide and 60 mM DTT in a pH 8 buffered solution with 5 vol % methanol at both 0 V and 2.4 V. Crossover point is at 8 KHz.

Electrochemical impedance spectroscopy. Electrochemical impedance spectroscopy experiments were run on a Gamry Ref600 with Gamry v.7 software. A 2 mm diameter hole was punched into a 10-layer thick sheet of electrical tape. This was placed onto carbon-coated interdigitated gold microelectrodes to create a small well for the solution at the interdigitated electrode junction (see FIG. 2). To this well was added 20 μL of filtered (0.45 μm cellulose acetate filter) sample solution containing 25 μM Nile Red. 150 mM ferrocyanide, and 60 mM DTT. The hole was covered with a glass cover slip to prevent evaporation. The five working electrodes were contacted together with copper tape and the counter electrode was also used as a reference in the experiment. Impedance measurements were performed by spanning a frequency range of 100 Hz to 106 Hz with a fixed DC bias of either 0 V or 2.4 V vs. ref and an AC perturbation of #10 mV (see FIG. 10).

Figure 8D:
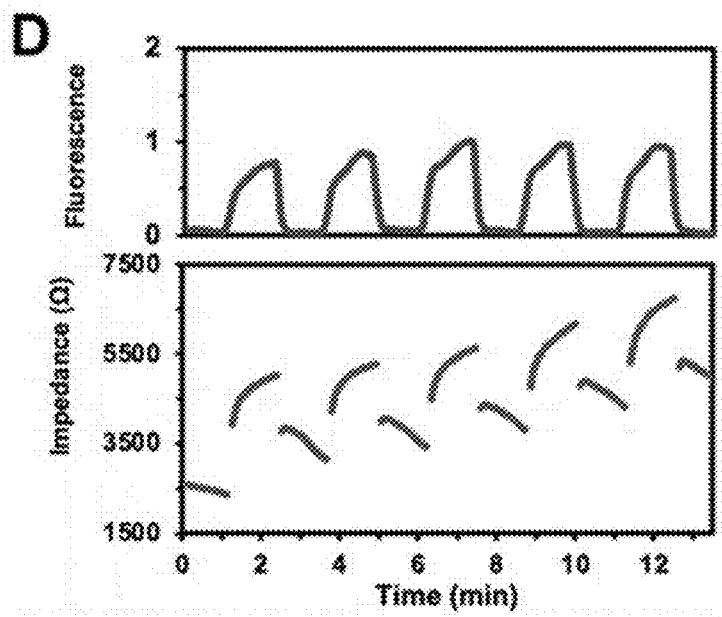

Single-frequency EIS coupled CLSM. A sample consisting of 2.5 mM CSH. 25 μM Nile Red. 150 mM ferrocyanide, and 60 mM DTT in a pH 8 buffer with 5 vol % methanol was used for these measurements. A 2 mm diameter hole was punched into a 10-layer thick sheet of electrical tape. This was placed onto the carbon-coated gold microelectrodes to create a small well for the solution at the interdigitated electrode junction (see FIG. 2). The hole was covered with a glass cover slip to prevent evaporation. The five working electrodes were contacted together with copper tape and the counter electrode was also used as a reference in the experiment. The impedance of the sample was measured at both 0 V±10 mV vs. ref, and 2.4 V±10 mV vs. ref, at a frequency of 8 kHz alternating every minute for each potential bias. Simultaneously, the sample was monitored via CLSM following the protocol described above (see FIG. 8D).

Cryo-transmission electron microscopy. Gel was prepared by following the procedure outlined in "Repetitive fiber growth and dissipation" using a CompactStat potentiostat (Ivium Technologies), standard calomel electrode (CH Instruments) and glassy carbon working and counter electrodes. Cryo-TEM samples were prepared using an Automatic Plunge Freezer ME GP2 (Leica Microsystems) and Quantafoil® R2/2 TEM grids (Electron Microscopy Sciences). 7 μL of the above sample solution was obtained from the surface of the working electrode and quickly deposited on the grid in a controlled environment of 98% relative humidity at 20° C. Immediately after deposition, the grid was blotted for three seconds and plunged into liquid propane at −180° C. Grids were loaded into a Gatan Cryo-TEM holder and imaged using a JEM-2100F TEM operating at 200 keV. Images were recorded using DigitalMicrograph (Gatan) software with a Gatan OneView CMOS camera at 4 k×4 k resolution.

Buffer Preparation. MilliQ water was used for all buffers. 0.2 M pH 7 phosphate buffer was prepared by dissolving Na$_2$HPO$_4$·7H$_2$O and NaH$_2$PO$_4$·H$_2$O in amounts adapted from the Millipore-Sigma Buffer Reference Center in water. 0.2 M pH 8 tris buffer was prepared by dissolving tris HCl and tris base in amounts adapted from the Millipore-Sigma Buffer Reference Center in water. 0.2 M pH 6 2-(N-morpholino) ethanesulfonic acid (MES) buffer was prepared by dissolving 19.5 g of MES in water. The pH of each solution was adjusted to the target value with 1 M NaOH and 1 M HCl while monitoring with a pH probe. NaCl was added to the solution such that the NaCl concentration was 100 mM at a final volume of 500 mL.

Fabrication of Bulk Electrochemical Cell. Electrochemical dissipative assembly experiments were performed with a custom electrochemical microscopy cell. The cell was designed in SolidWorks and fabricated by 3D printing using a Creality Ender5 3D printer. The material used was poly (lactic acid). A schematic of the cell is provided in FIG. 1. This cell was attached to a #1.5 glass cover slip on the bottom of the cell with silicone caulk. Imaging was conducted on the left side of the working electrode (labeled WE). For all bulk CLSM measurements using this cell, the working and counter electrodes were cylindrical glassy carbon, and the reference electrode was a silver wire pseudo-reference Fabrication of Interdigitated Gold Microelectrode: A 170 µm thick VWR glass coverslip was cleaned by immersion in piranha solution ($H_2SO_4$:30% $H_2O_2$=3:1) for 15 min, rinsed with DI water and dried with nitrogen flow. The glass coverslip was then put into the oven to dehydrate at 120° C., for 30 min. The baked coverslip was spin-coated with positive photoresist Shipley 1827 at 3000 rpm for 30 s followed with a 30 min bake at 90° C. The coated coverslip was exposed to UV radiation for 30 s using a Karl Suss MA6 mask aligner. The coverslip was then developed with Shipley MF319 for 35 s, rinsed with DI water, and dried under nitrogen flow. The coverslip was first coated with 30 nm titanium, followed by 300 nm gold by e-beam evaporation using a Temescal CV-8. Lift off was performed by soaking coverslip in acetone overnight, followed by rinsing with DI water, and dried under nitrogen flow: See FIG. 2 for schematic.

Fabrication of Interdigitated Carbon-Coated Microelectrode. A 170 µm thick VWR glass coverslip was cleaned by immersion in piranha solution ($H_2SO_4$:30% $H_2O_2$=3:1) for 15 min, rinsed with DI water and dried with nitrogen flow. The glass coverslip was then put into the oven to dehydrate at 120° C., for 30 min. The baked coverslip was spin-coated with positive photoresist Shipley 1827 at 3000 rpm for 30 s followed with a 30 min bake at 90° C. The coated coverslip was exposed to UV radiation for 30 s using a Karl Suss MA6 mask aligner. The coverslip was then developed with Shipley MF319 for 35 s, rinsed with DI water, and dried under nitrogen flow. The coverslip was first coated with 30 nm of titanium, followed by 100 nm of gold by e-beam evaporation using a Temescal CV-8. Lift off was performed by soaking coverslip in acetone overnight, followed by rinsing with DI water, and dried under nitrogen flow. The surface was sputter coated with 8 nm of carbon using a Leica EM ACE600 High Vacuum sputter coater. See FIG. 2 for schematic.

Figure 11:
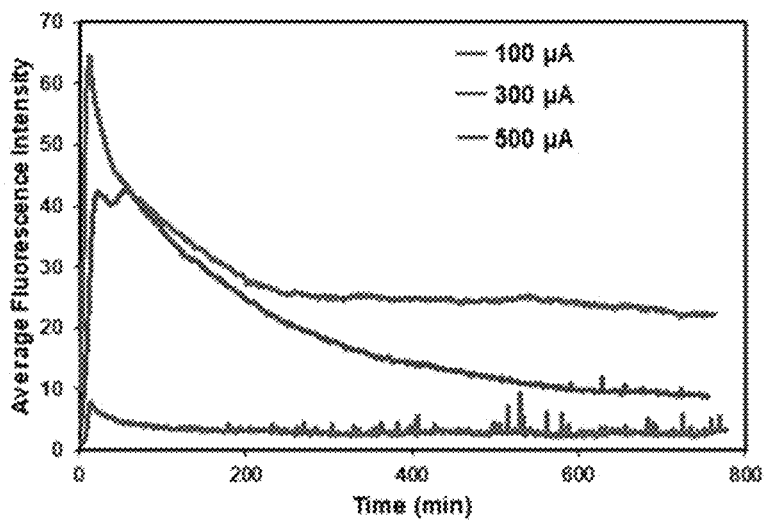
FIG. 11 demonstrates the effects of electrical current on the fiber growth and disassembly of bulk system containing 2.5 mM CSH, 20 mM DTT, and 150 mM ferrocyanide in pH 7 buffer.
Figure 12:
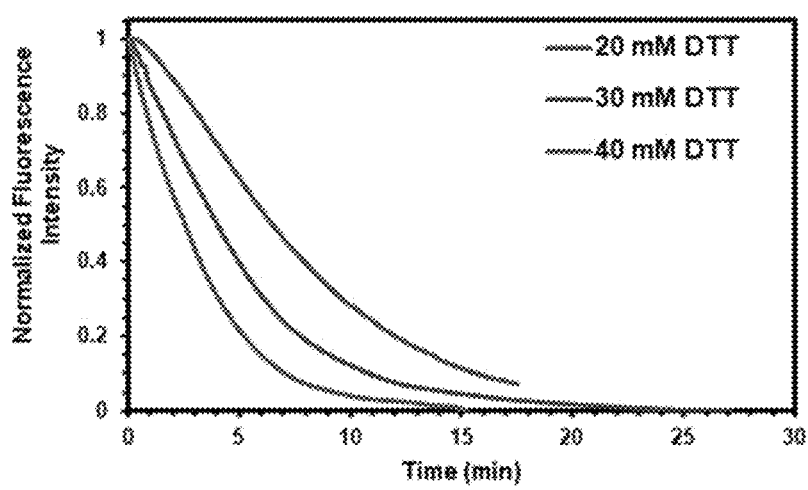
FIG. 12 demonstrates the effects of DTT concentration on the disassembly of fiber for a bulk system containing 2.5 mM CSH and 150 mM ferrocyanide in pH 8 buffer.
Figure 13:
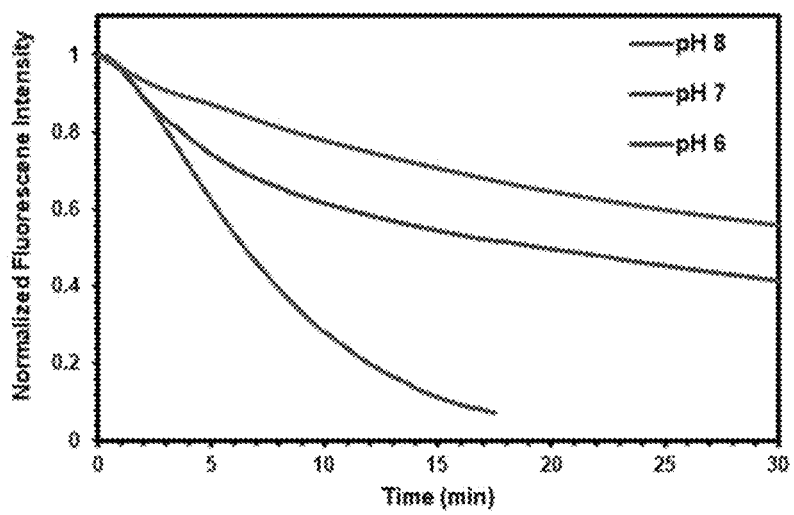
FIG. 13 demonstrates the effects of pH on the on the disassembly of fiber for a bulk system containing 20 mM DTT, 2.5 mM CSH, and 150 mM ferrocyanide in pH 8 buffer.
Figure 14:
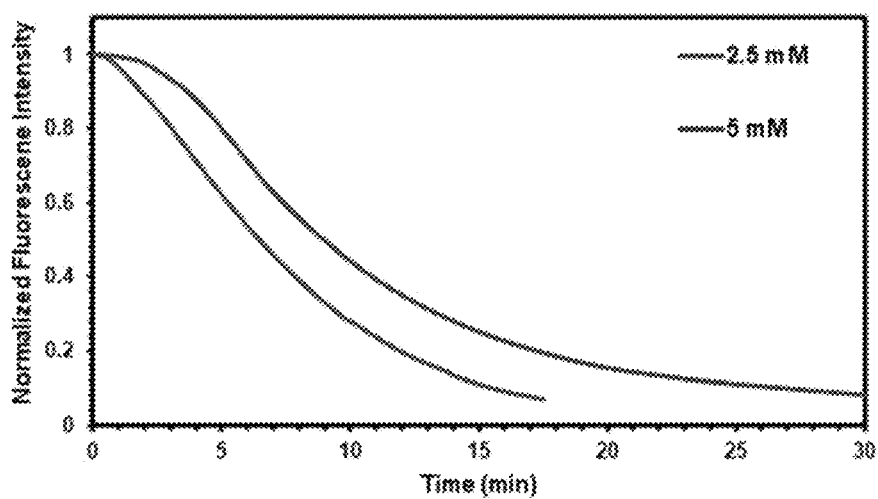
FIG. 14 demonstrates the effects of CSH concentration on the on the disassembly of fiber for a bulk system containing 20 mM DTT and 150 mM ferrocyanide in pH 8 buffer.

Screening experimental parameters for e-fueled dissipative self-assembly. 1 mL of the sample solution consisting of 2.5 mM CSH. 20 mM DTT. 150 mM ferrocyanide, and 25 µM Nile Red in an aqueous buffer was added to the bulk electrochemical cell (see FIG. 1). The working and counter electrodes consisted of glassy carbon, and a silver wire pseudo-reference was used. A cyclic voltammetry experiment was run from −200 mV to 600 mV vs. $Ag/Ag^+$ at a scan rate of 100 mV/s. For screening the effect of current level, different current (100, 300, and 500 µA) was passed to the solution for 10 minutes and then stopped. The fiber growth and dissipation were monitored by CLSM over time. The average fluorescence intensity of the self-assembled fibers was plotted (see FIG. 11). For observing the effects of other parameters (pH, $[DTT]_0$, $[CSH]_0$), a 600 mV potential vs. $Ag/Ag^+$ was applied for 24 s then stopped. The fiber growth and dissipation were monitored by CLSM over time. The average fluorescence intensity of each frame was extracted, and the average fluorescence intensity across all frames was normalized to give a graph of normalized fluorescence intensity over time. This was repeated for DTT concentrations of 30 mM, and 40 mM, a CSH concentration of 5 mM, as well as pH of 6 and 7 (see FIGS. 12-14).

Spatiotemporal control of fiber growth. The fabricated interdigitated gold microelectrodes on a glass substrate (see FIG. 2) were used in these experiments. Each of the working electrodes was individually addressable, while the five counter/reference electrodes were connected. The counter electrode was used as the reference for all measurements. A 2 mm diameter hole was punched into a 10-layer thick sheet of electrical tape. This was placed onto the electrodes to create a small well for the solution at the interdigitated electrode junction. To this well was added 15 µL of filtered (0.45 µm cellulose acetate filter) sample solution containing 2.5 mM CSH. 25 µM Nile Red. 150 mM ferrocyanide, and 60 mM DTT. A cyclic voltammetry experiment was run from −200 mV to 2.6 V vs. ref at a scan rate of 100 mV/s at each electrode before growing fibers. A 2.4 V vs. ref potential was applied to initiate fiber growth at each working electrode for a total of 10 minutes each, which was then allowed to dissolve until the fibers were no longer observable on the CLSM. To demonstrate spatiotemporal control of fiber growth. 2.4 V vs. ref potential was applied to specific working electrodes at different times for desired durations. The fiber growth and dissolution were monitored in real time by CLSM. To demonstrate precise spatiotemporal control, the fibers were grown and allowed to disassemble in a pattern resembling that of the opening four measures of Beethoven's "Ode to Joy." The "quarter note" fibers were grown for 90 s at 2.4 V vs. ref, followed by 90 s for dissolution with no applied potential bias. The "dotted quarter note" fibers were grown for 135 s at 2.4 V vs. ref, followed by 135 s for dissolution with no applied potential bias. The "eighth note" fibers were grown for 45 s at 2.4 V vs. ref, followed by 45 s for dissolution with no applied potential bias. The "half note" fibers were grown for 180 s at 2.4 V vs. ref, followed by 180 s for dissolution with no applied potential bias. See FIGS. 8B-C and FIG. 9.

Quantitative CLSM Image Analysis. Data analysis was completed using in-house MATLAB scripts. The analysis can be divided into the following steps: (1) image filtering and normalization, (2) structural dissimilarity (DSSIM) analysis, and (3) DSSIM region analysis.

Image Filtering and Normalization. Images were collected, as described above, as 12-bit images. Each image was 1024×248 pixels, with a pixel size of 0.13 µm, and an exposure time of 3.759 seconds per frame. This value was used for all calculations and quantitative analysis. However, for discussion the value is rounded to 4 seconds for simplicity, and the time labels in figures are rounded to the nearest second. Additionally. 962×248 pixels of the original images are used in the analysis, resulting in an image which is 125.0 µm×32.2 µm. Time=0 is defined as the end of the collection of the first image.

Figure 15:
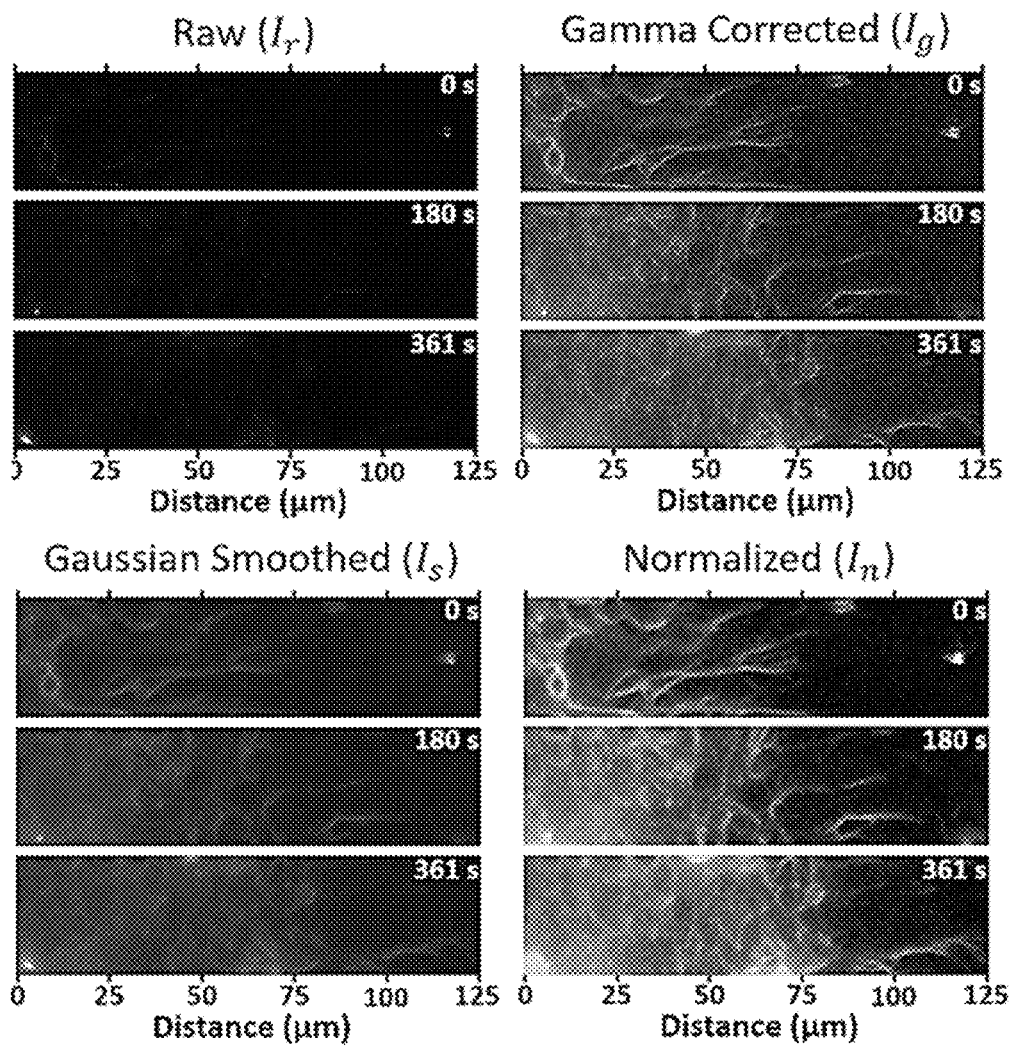
FIG. 15 shows image filtering and normalization steps of select images, calculated from EQs. 1-4.
Figure 16:
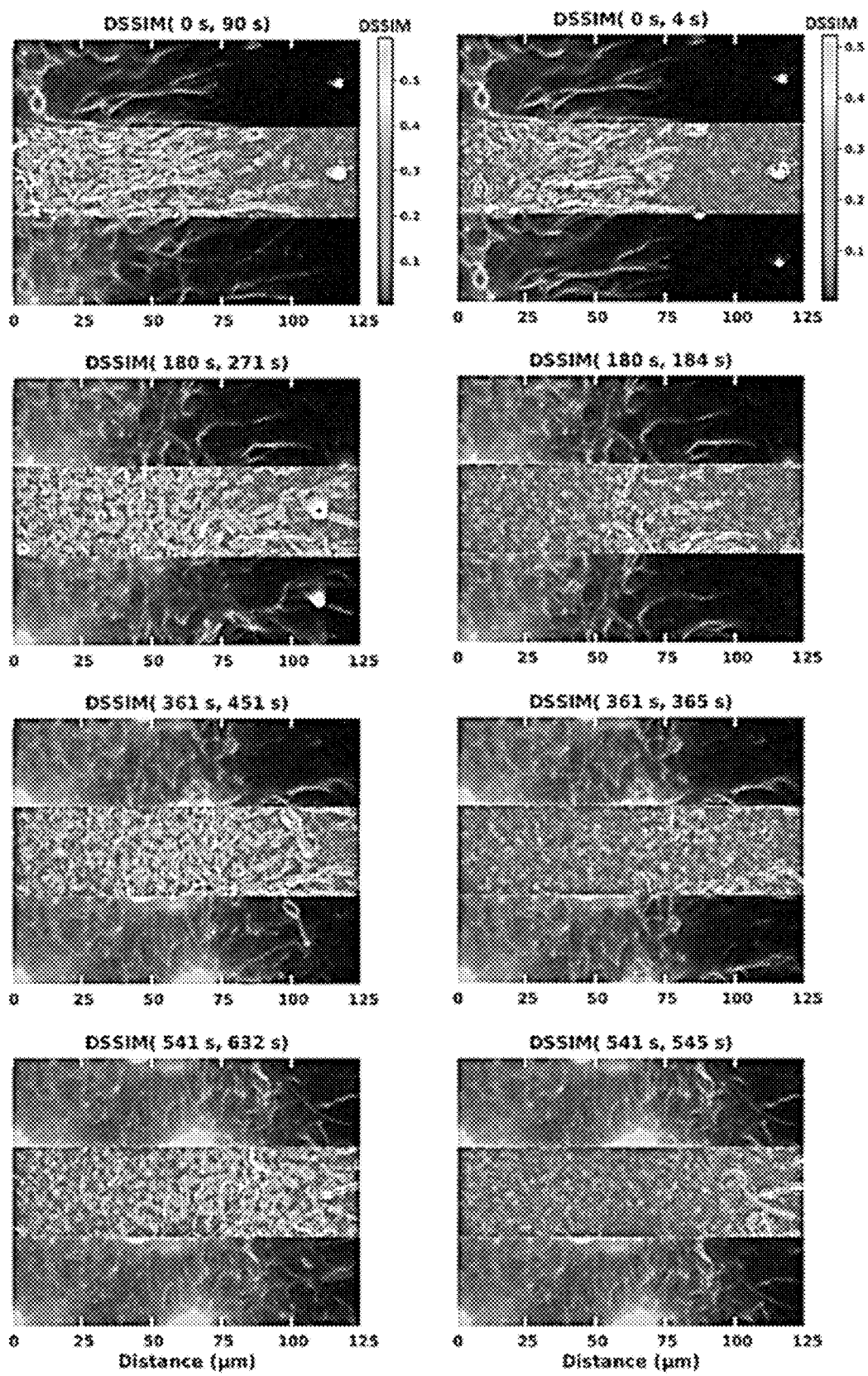
FIG. 16 provides a comparison of the two temporally offset CLSM images and calculated DSSIM image. Each panel shows CLSM image (t) on the top and (t+Δt) on the bottom, with resulting DSSIM (t, t+Δt) image between. Left column, 90 s temporal offset. Right column, 4 s offset.

Several standard image processing techniques were applied to the images before analysis. First, a gamma correction with an exponent of 0.45 was applied (EQ. 1). This was done to better represent the small fibers which have poor brightness when viewed on a linear scale. Next, a Gaussian blur was applied with first standard deviation of 3 pixels which resulted in a kernel size of 13×13 pixels (1.69 µm×1.69 µm) (EQ. 2). Gaussian kernels were normalized such that the sum of all values is equal to 1. This standard deviation was chosen to remove Gaussian noise without substantially altering the fiber features in the image. Next, outliers were removed to improve contrast in the images for qualitative assessment. The images were combined into a single volume, with frame time as the third dimension, then the top 1 percentile ($i_{.01}$) and the 99 percentile ($i_{.99}$) values were calculated. Every value below $i_{.01}$ was replaced with $i_{.01}$, and every value above $i_{.99}$ was replaced with $i_{.99}$ (EQ. 3). These outlier percentiles were chosen to provide adequate contrast for viewing the data. The resulting contrast corrected volume was converted to a grayscale volume with normalized intensities between 0 and 1 (EQ. 4) and then displayed as a cyan shaded image. Note, contrast was assigned for the entire volume, not per individual image. A visual summary of the processing pipeline can be seen in FIG. 15. The resulting normalized CLSM images are used in FIG. 7A, FIG. 15, FIG. 16 and FIG. 17A for clear visualization and qualitative assessment. The same pipeline was used to prepare the CLSM images for qualitative analysis. However, outlier percentile values 0.1 and 99.9 were chosen in EQ. 3 to minimize unnecessary processing of the data. Normalized CLSM images from this pipeline were then used to calculate all DSSIM images (discussed below) and quantitative analysis in FIG. 7F, FIG. 17C-D.

$$I_g = I_r^\gamma \quad \text{(EQ. 1)}$$

$I_g$ : Gamma corrected image $I_r$ : Raw image $\gamma$ : Gamma correction exponent $$I_s = \text{matrix convolution}(I_g, k_{gauss}) \quad \text{(EQ. 2)}$$

$I_s$ : Gaussian smoothed image $k_{gauss}$ : 2D normalized Gaussian kernel $$I_c(x, y) = \begin{cases} i_{.99}, & I_s(x.y) > i_{.99} \\ I_s(x, y), & i_{.99} \geq I_s(x.y) \geq i_{.01} \\ i_{.01}, & I_s(x, y) < i_{.01} \end{cases} \quad \text{(EQ. 3)}$$

$I_c$ : Contrast corrected image $i_{.99}$ : 99 percentile intensity value of $I_b$ movie volume $i_{.01}$ : 1 percentile intensity value of $I_b$ movie volume $x, y$ : pixel position in image $$I_n(x, y) = \frac{I_c(x, y) - \min(V_c)}{\max(V_c - \min(V_c))} \quad \text{(EQ. 4)}$$

$I_n$ : Normalized image $V_c$ : volume of all contrast corrected images $x, y$ : pixel position in image min() : minimum value max() : maximum value Structural Dissimilarity Analysis. The goal of the analysis was to quantify fiber dynamics during dissipative self-assembly. Specifically, to quantify the fast dynamics occurring at the fiber-solution interfaces, and the slow dynamics occurring in the bulk of the fiber gel.

Structural similarity analysis (SSIM) has been widely adopted by the machine learning community as a metric to evaluate the performance of denoising and super-resolution models for microscopy datasets. SSIM has also been used in biological studies to identifying rapid neurochemical events from fast-scan cyclic voltammetry, and to identify microcalcification from mammography. In materials science, SSIM analysis has been applied to ceramic composites to assess material deformation and detect cracks in x-ray computed tomography datasets. In this study, SSIM is applied to temporarily offset pairs of CLSM images to quantify local variation in structure caused by fiber dynamics. Herein is reported the structural dissimilarity (DSSIM), defined as (1-SSIM)/2, where high DSSIM values correspond to high dynamics. DSSIM is applied to compare images which are separated by a temporal offset, $\Delta t$ (EQ. 4). This is done incrementally for every image as a sliding-window calculation.

SSIM is a local calculation that compares intensity values in the same neighborhood of two images, which is Gaussian weighted to avoid blocking artifacts. The calculation is divided into 3 components: mean (luminance), variance (contrast), and cross-correlation (structure). For every pixel location, the resulting value from each component is then weighted by exponents for the final value (EQ. 5). Here, [a,b,c]=[0,1,1] was applied. This was done to avoid artifacts in the dark regions of the image which were unstable and susceptible to noise. [$c_1$, $c_2$, $c_3$]=[0.0001, 0.0009, 0.00045] which are MATLAB default values for grayscale images. The Gaussian-weighted neighborhood was formed with a standard deviation of 3 pixels, which resulted in a 19×19 pixels (2.47×2.47 μm) neighborhood.

$$SSIM(t, t + \Delta t) \equiv SSIM(x, y) = l(x, y)^a * c(x, y)^b * s(x, y)^c \quad \text{(EQ. 5)}$$

$$l(x, y) = \frac{2\mu_x\mu_y + c_1}{\mu_x^2 + \mu_y^2 + c_1}$$

$$c(x, y) = \frac{2\sigma_x\sigma_y + c_2}{\sigma_x^2 + \sigma_y^2 + c_2}$$

$$s(x, y) = \frac{\sigma_{xy} + c_3}{\sigma_x\sigma_y + c_3}$$

$SSIM(x, y)$ : Structural Similarity image $t$ : Normalized Fluorescent image at time $t$ $\Delta t$ : Temportal offset between frames $a, b, c$ : SSIM weighting exponents $\mu_x, \mu_y$ : mean of $x$ and $y$ $\sigma_x, \sigma_y$ : Standard devation of $x$ and $y$ -continued $l(x, y)$ : Luminance $f$(mean)

$\sigma_{xy}$ : Covariance of $x$ and $y$ $c(x, y)$ : Contrast(standard devation)

$c_1, c_2, c_3$ : constants $s(x, y)$ : Structure(cross correlation)

The SSIM will return a value between 1 and −1, where 1 represents perfect similarity between local regions of the image, and −1 represents perfect dissimilarity. In this study, quantifying regions of high dissimilarity were focused on. Thus, DSSIM is calculated by subtracting 1 from each value in the image SSIM (t, t+Δt), and then dividing the resulting values by 2 (EQ. 6). The new DSSIM image contains values between 1 and 0, where 1 now represents a perfect dissimilarity and 0 is now perfect similarity: the higher the DSSIM value, the more dissimilar the local neighborhoods of the images are, which represents regions of high dynamics. Comparison of the two temporally offset CLSM images and calculated DSSIM image (see FIG. 16) show that regions of high fiber intensity in the CLSM image do not necessarily correspond to regions of high dynamics and that the fibers are most dynamic at the fiber-water interface.

$$DSSIM(t, t + \Delta t) = \frac{SSIM(t, t + \Delta t) - 1}{2}$$

Figure 7A:
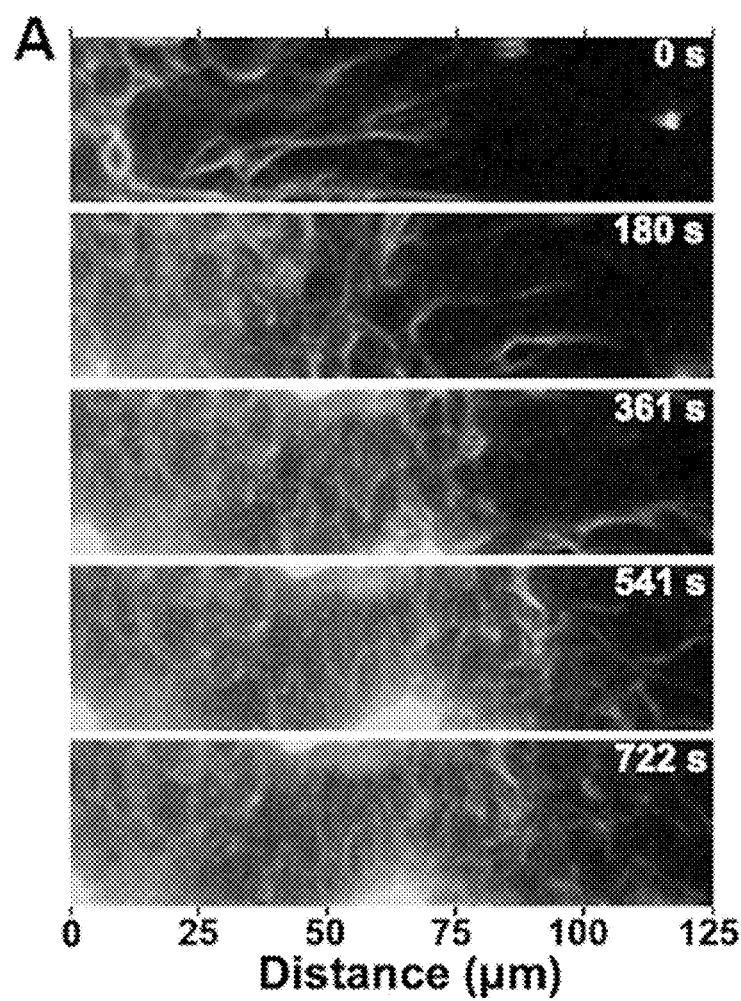
Figure 7F:
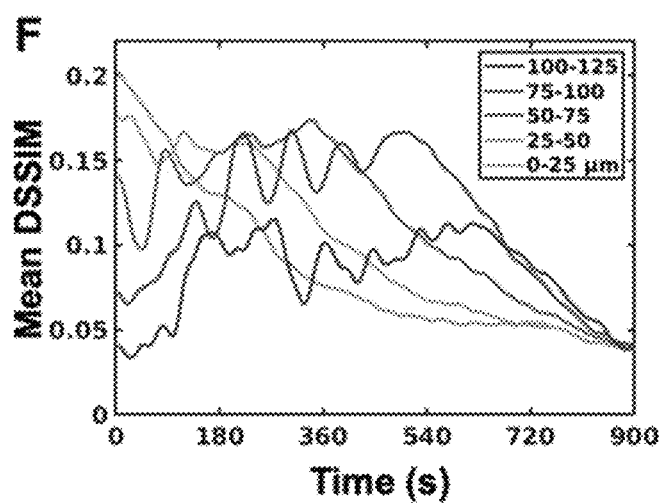

$SSIM$ : Structual Similarity image $DSSIM$ : Structural Dissimilarity image $t$ : Normalized Fluorescent image at time $t$ $\Delta t$ : Temportal offset between frames DSSIM Region Analysis. Each DSSIM image was divided into 5 equal sections at 25 μm intervals from the left edge of the image. The mean DSSIM of each region was calculated for each set of images (t, t+Δt). This makes it possible to track the dynamic motion as a function of distance from the electrode surface. Note from EQ. 5 that each image and therefore each feature is present in two calculations: first as (t+Δt), and then again Δt later as (t). This can result in periodic oscillation in the DSSIM average plot, as a bright, fast-moving object passes through a region at (t+Δt), and then again at (t) as seen in FIG. 7F region 75-100 μm. This is most significant at high temporal offsets and fast-moving objects. Additionally, if there is a bright, fast-moving object it will be counted "twice". Here, the same CLSM feature produces two bright feature DSSIM image. However, this still signifies high dynamics in the region which is the intended outcome of this analysis.

Figure 17D:
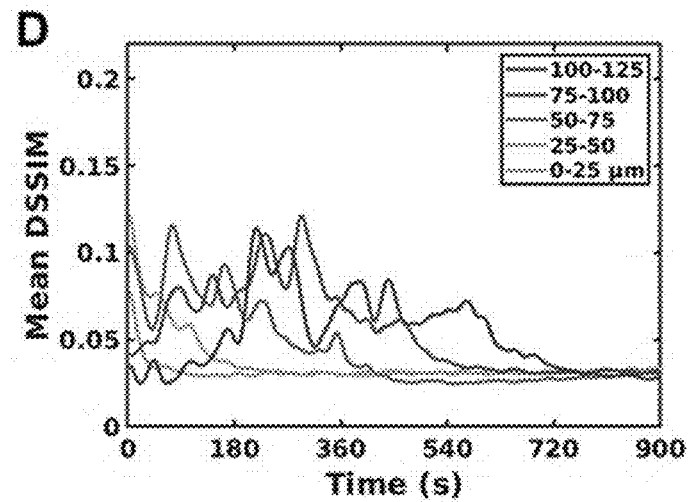

The normalized CLSM images processed with EQs. 1-4 were also divided into 5 sections, and the mean normalized intensity of each section was plotted (see FIG. 7F, FIG. 17A and FIG. 17C). This analysis shows a temporal offset in the intensity increase of each region as the fiber forms, which is as expected. However, intensity analysis alone is highly susceptible to bright objects, seen in region 50-75 μm of FIG. 17A, and is unable to accurately quantify the dynamics occurring in regions that are dim relative to other regions (100-125 μm). FIG. 17 also shows that fiber dynamics do not necessarily correspond with an increase in intensity. In FIG. 17C, region 50-75 μm increases in average intensity between 360 s and 540 s, while the DSSIM analysis in both FIG. 7F and FIG. 17D show a decrease in dynamics in this region during the same timeframe. DSSIM analysis can be tuned to analyze both fast and slow dynamics by adjusting the temporal offset, Δt, in the calculation. FIG. 7B and FIG. 7F were produced with a 90 s offset and capture both the fast dynamics at the water-fiber interface as well as the slower dynamics occurring inside the gel. In contrast, FIG. 17B and FIG. 17D have a 4 s offset and focus on the fast dynamics at the water-fiber interface. These examples highlight the strength of the multicomponent DSSIM analysis for quantifying complex dynamics.

Figure 18:
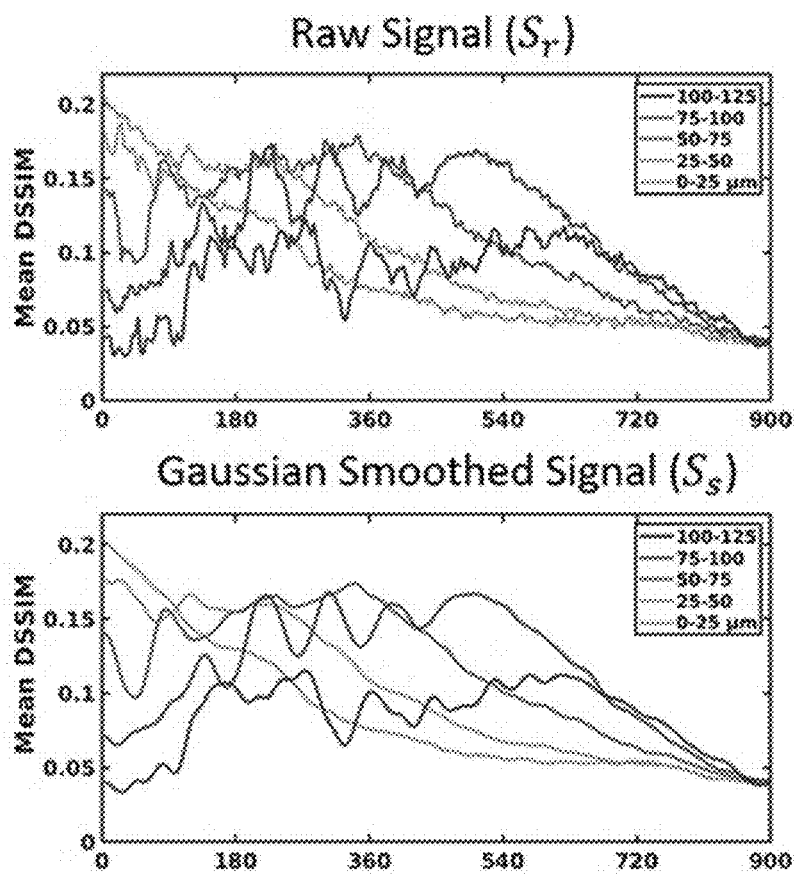
FIG. 18 provides a comparison of raw signal to filtered signal used in FIG. 7 and FIG. 10D. Filtering was applied to smooth the signal via convolution of a normalized Gaussian EQ. 7.
Figure 18:
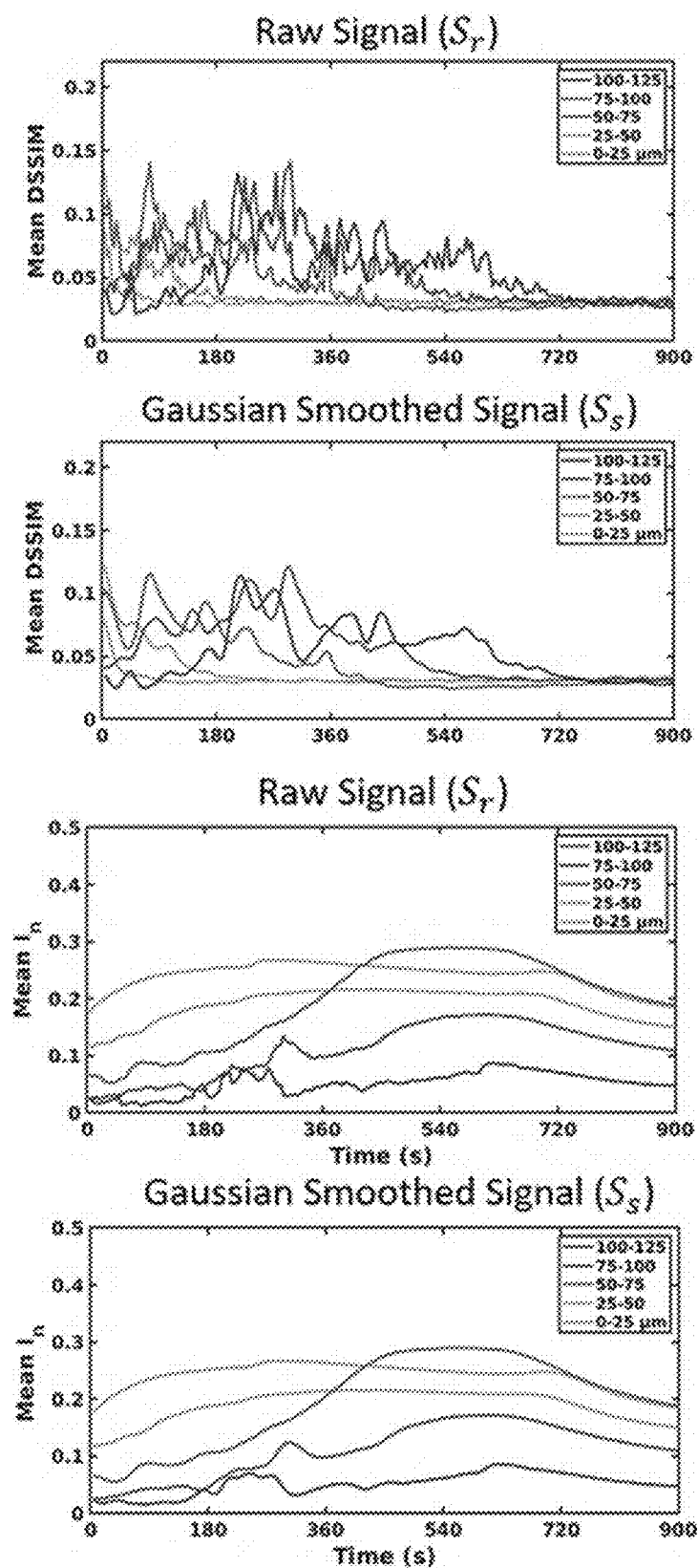

A sliding-window Gaussian weighted mean was applied to the each DSSIM region-mean signal to smooth the data. A standard deviation of 3 data points was used to smooth each signal. Instantaneous peaks or valleys can be caused by one feature moving very rapidly. Ultimately, the same trends can be seen in both the raw and smoothed data, shown in FIG. 18.

$$S_s = \text{signal convolution}(S_r, k_{gauss}) \quad \text{(EQ. 7)}$$

Figure 19:
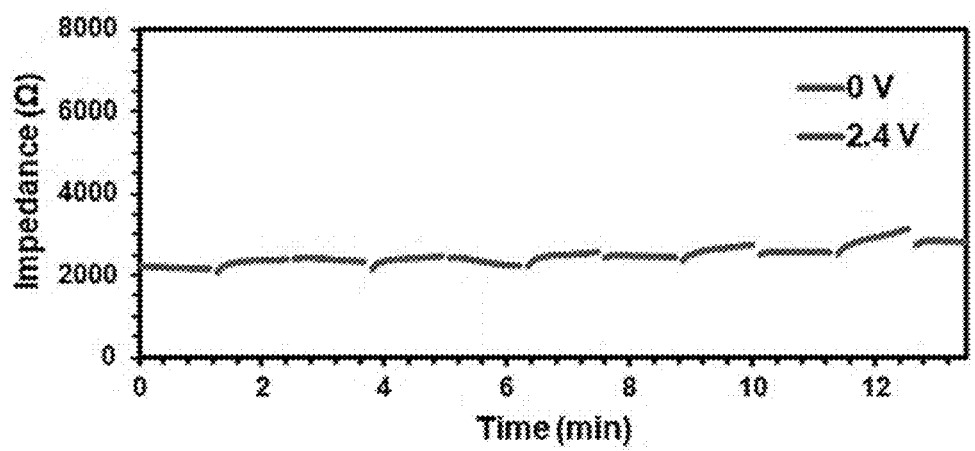
FIG. 19 shows SFEIS measurements at 8 kHz of control sample consisting of 150 mM ferrocyanide and 60 mM DTT (without CSH) in a pH 8 buffered solution with 5 vol % methanol at alternating 0 V±10 mV (red) and 2.4 V±10 mV (green) vs. ref over time.

$S_s$ : Gaussian smoothed mean signal $S_r$ : Raw mean signal $k_{gauss}$ : $1D$ normalized Gaussian kernel Electrochemical Impedance Spectroscopy (EIS). For all EIS measurements, one set of carbon-coated gold microelectrodes were connected and used as the working electrode, and the complimentary set were used as counter/reference electrodes (see FIG. 2). The impedance of a control sample consisting of 150 mM ferrocyanide and 60 mM DTT (without CSH) in pH 8 buffered solution with 5 vol % methanol on interdigitated carbon-coated gold microelectrodes was measured by applying an alternating current at both 0±10 mV vs. ref and 2.4 V±10 mV vs. ref in the frequency range of 100 Hz to 106 Hz (see FIG. 10). The frequency at the intersection points of the 0 V and 2.4 V lines in the Bode plots, 8 kHz, was used as the frequency for the single-frequency EIS (SFEIS) experiment of both the control and assembling system in order to minimize contributions from background reactions. An SFEIS measurement was conducted on the same control sample at 8 kHz alternating every minute between 0 V±10 mV vs. ref and 2.4 V±10 mV vs. ref to obtain a baseline impedance measurement for the system (see FIG. 19).

Kinetics Experiments. N-acetylcysteine amide: Since CSH forms a gelating dimer (CSSC) upon oxidation, using it for kinetics studies causes complications. To avoid this issue, a close analogue of CSH, N-acetylcysteine amide (NACA) was used as a model compound in kinetic studies. Given the structural similarity of the two molecules, it is reasonable to assume that they have similar redox reactivity (Scheme 1).

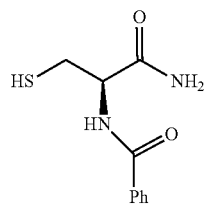

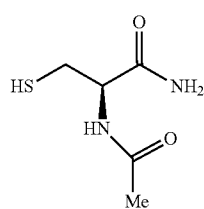

Scheme 1. Structure of CSH and NACA.

Stopped-flow experiments. Kinetic measurements of oxidation of NACA and DTT by ferricyanide were conducted with a stopped-flow apparatus equipped with a photodiode array detector. The absorbance at 420 nm was monitored for the disappearance of ferricyanide and converted to concentration of ferricyanide using its molar extinction coefficient. The initial rate at the beginning of the reaction was determined from the slope of the linear region of the plot of ferricyanide concentration over time. This was used in conjunction with the differential rate law and the starting concentrations of both species to arrive at a second order rate constant for the reaction. The experiments were repeated in triplicate and averaged with final concentrations of 1.25 mM ferricyanide and 2.5 mM DTT or 2.5 mM NACA. The measurements were conducted at pH 6, 7, and 8. The second order rate constants of the reactions are summarized in Table 1.

UPLC Kinetics. The reduction of oxidized NACA (NACAox) with DTT was measured using reverse-phase UPLC. A solution of 2 mM NACAox and 2 mM DTT was injected at 10 μL of volume, running at a flow rate of 0.600 mL/min in a solvent system of 95% water to 5% acetonitrile with a run time of 1 minute. The absorbance was collected at 225 nm and was compared to a standard curve of NACA, NACAOx, and DTT to determine the rate of disappearance of reactants and rate of appearance of products. The concentration of NACA, NACAOx, and DTT were individually plotted over time. The instantaneous rate at the start of the reaction was determined from the slope of these plots to determine the rate of the disappearance of starting materials/appearance of product. This was used in conjunction with the differential rate law and the starting concentrations of both species to arrive at a second order rate constant for the reaction. The rates of disappearance/appearance were averaged, run in triplicate, and then averaged once more at pH 6, 7, and 8. The second order rate constants of the reactions are summarized in Table 1.

TABLE 1

Kinetic rate constants for the oxidation of DTT and NACA with ferricyanide, and the reduction of NACAox with DTT. Rates for exchange between CSSC and CSH were based on reported values for the reduction of glutathione by 2-mercaptoethanol at pH 7 and was extrapolated to pH 6 and 8.

| Reaction | k at pH 6 ($M^{-1} s^{-1}$) | k at pH 7 ($M^{-1} s^{-1}$) | k at pH 8 ($M^{-1} s^{-1}$) |
| --- | --- | --- | --- |
| Ferricyanide + DTT | 33.3 ± 0.9 | 725 ± 26 | 996 ± 31 |
| Ferricyanide + NACA | 4.92 ± 0.06 | 171 ± 4 | 397 ± 14 |
| NACAOx + DTT | 0.053 ± 0.01 | 0.31 ± 0.01 | 1.96 ± 0.33 |
| CSSC + CSH | 0.015 | 0.15 | 1.32 |

Rheology. Rheology measurements were carried out on TA Instruments Discovery Series HR-2 Hybrid Rheometer using the standard 40 mm parallel plate geometry. The gap distance of the rheometer geometry was set to 750 μm. The sample stage was heated to 85° C., initially and 0.9 mL of a solution of 5 mM CSH in pH 8 buffer was added into the gap using a long 22-gauge syringe needle. 0.05 mL of 150 mM ferricyanide solution was added under the geometry in the same manner. Upon addition, the temperature was then reduced to 25° C., and hydrogel formed immediately while a time sweep of the gel was measured by subjecting the materials to an oscillatory strain of 0.1% at a frequency of 5 Hz (See FIG. 3E).

Frequency Sweep. The temperature of the plates was controlled to 25° C. during the measurements. Using the same sample (See Methods: Rheology), the modulus of the material at 1% strain was measured for frequencies between 0.1 and 100 Hz (see FIG. 4).

Figure 20:
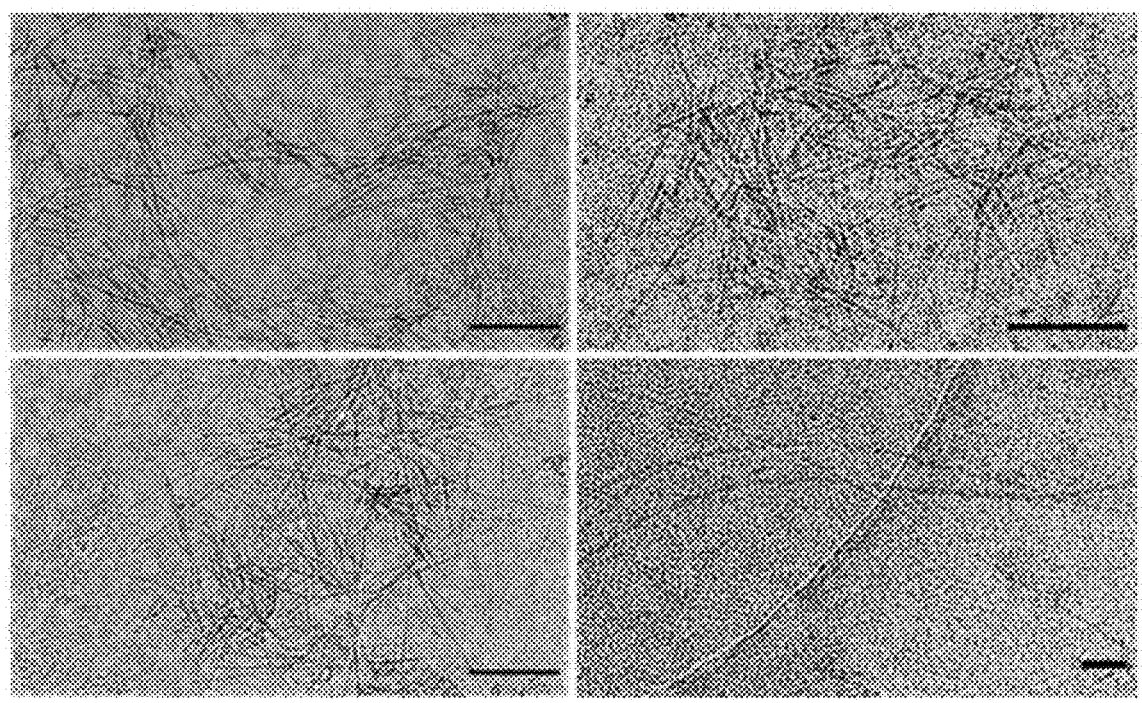
FIG. 20 presents cryo-TEM images of fibers generated by e-fueled self-assembly of CSH. Scale bars indicate 200 nm. Images show a general sampling of the fibers produced.

Cryogenic Transmission Electron (cryo-TEM) Microscopy. Image-J software was utilized for image processing. The built-in contrast enhancement function, background removal utilizing a rolling ball radius of 40 pixels, and manual brightness adjustment were employed. A representative sample of cryo-TEM images can be seen in FIG. 20.

Figure 21A:
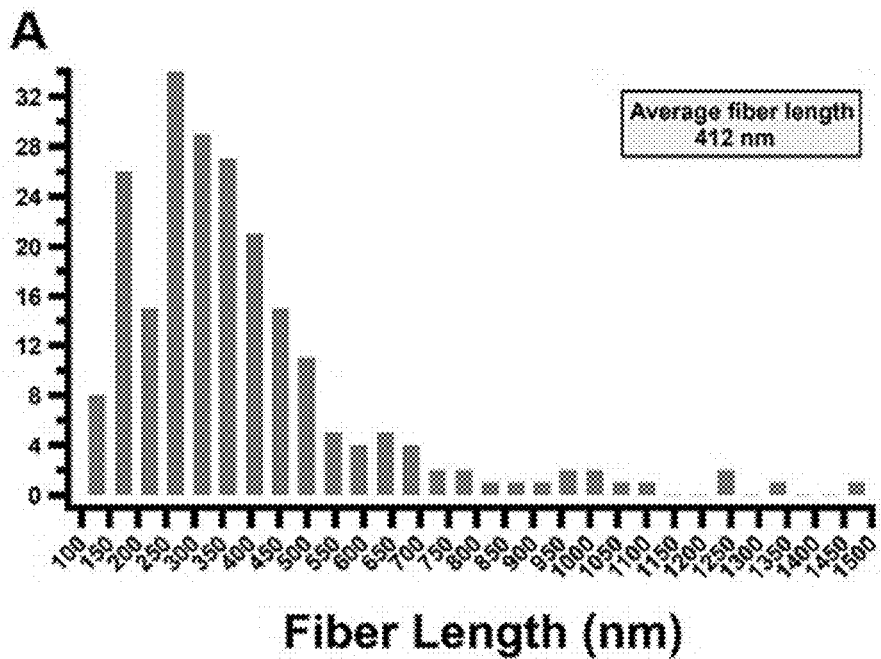
FIG. 21A-B provides histograms showing fiber length (A) and width (B) distributions.

Measurement of fiber length. The free hand tool in Image-J was used to draw a line from end to end of any fiber that could be reasonably decerned. The lines length, measured in pixels, was converted into nm for proper scaling yielding an average length of 412 nm. Measurements were plotted in a histogram showing a distribution similar to a lognormal distribution (see FIG. 21A).

Figure 21B:
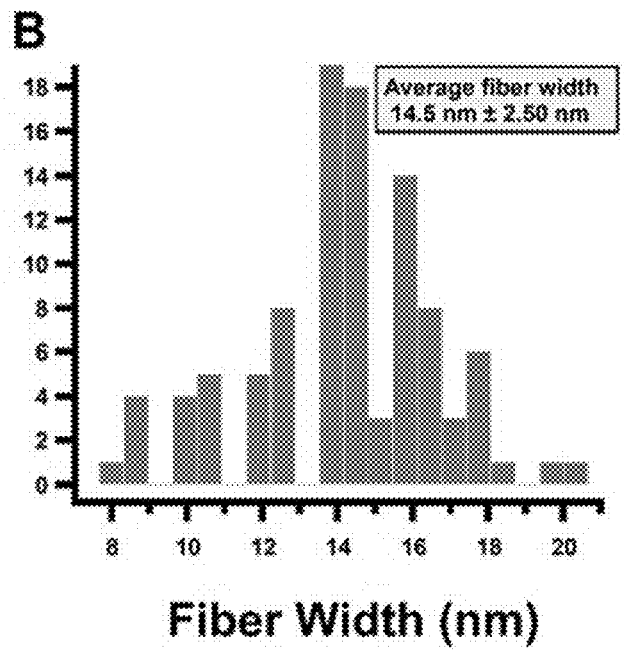

Measurement of fiber width. Non-processed images were imported into DigitalMicrograph™ (Gatan, Inc). Fiber widths were manually measured using the built-in measurement tool, utilizing line profiles with integrations of 30 pixels to increase accuracy. Out of 102 measurements, an average fiber width of 14.5 nm±2.50 nm was obtained (see FIG. 21B).

Designing e-fueled dissipative assembly system. To achieve the e-fueled dissipative self-assembly system, an electrochemical redox reaction network was designed that converts a cysteine derivative (CSH) into its disulfide dimer (CSSC), which self-assembles into fibers (see FIG. 3A). Ferrocyanide ($Fcn^{4-}$), a safe and biologically tolerated reagent, was used as a homogeneous electrocatalyst because it could be easily oxidized electrochemically to ferricyanide ($Fcn^{3-}$), which could further oxidize cysteine to the disulfide. The disassembly half of the redox reaction network was accomplished by using chemical reductant dithiothreitol (DTT). When a positive electric potential is applied to the working electrode. $Fcn^{4-}$ near the electrode surface is oxidized to $Fcn^{3-}$ via electron transfer to the electrode, which subsequently oxidizes CSH into CSSC initiating fiber growth from the surface (see FIG. 3B). As the potential is removed. DTT present in solution reduces CSSC back to CSH, resulting in the spontaneous dissolution of the fibers.

Figure 3A:
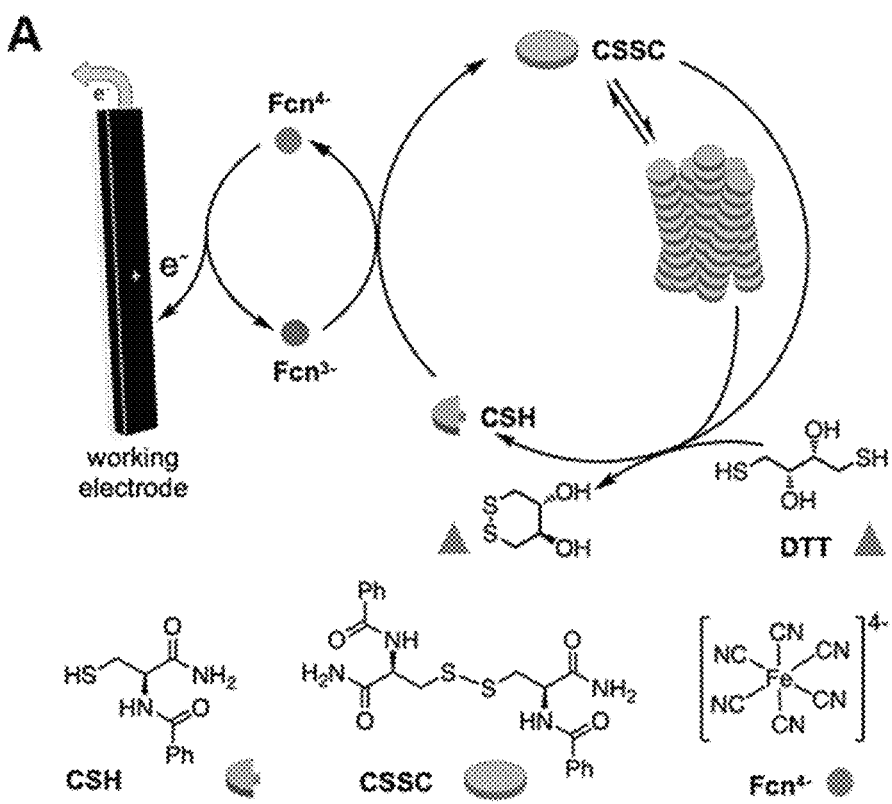
FIG. 3A-E presents a design of electrically fueled active materials. (A) Schematic representation of the dissipative self-assembly process fueled by electricity. (B) Side and top view of the electrochemical cell used in the study (CE=glassy carbon counter electrode, WE=glassy carbon working electrode, Ref=silver wire pseudo-reference electrode), and schematic representation of species distribution in the cell when current is turned on and off. (C) Cyclic voltammogram showing electrocatalytic oxidation of CSH by ferricyanide ($Fcn^{3-}$) generated in situ. (D) Images showing the reversible fiber assembly and dissolution upon addition of $Fcn^{3-}$ or DTT to the solution ($[CSH]_0$=5.0 mM, pH=8). (E) Rheology measurements showing the formation of hydrogel upon addition of $Fcn^{3-}$ to CSH solution (same condition as D).
Figure 3B:
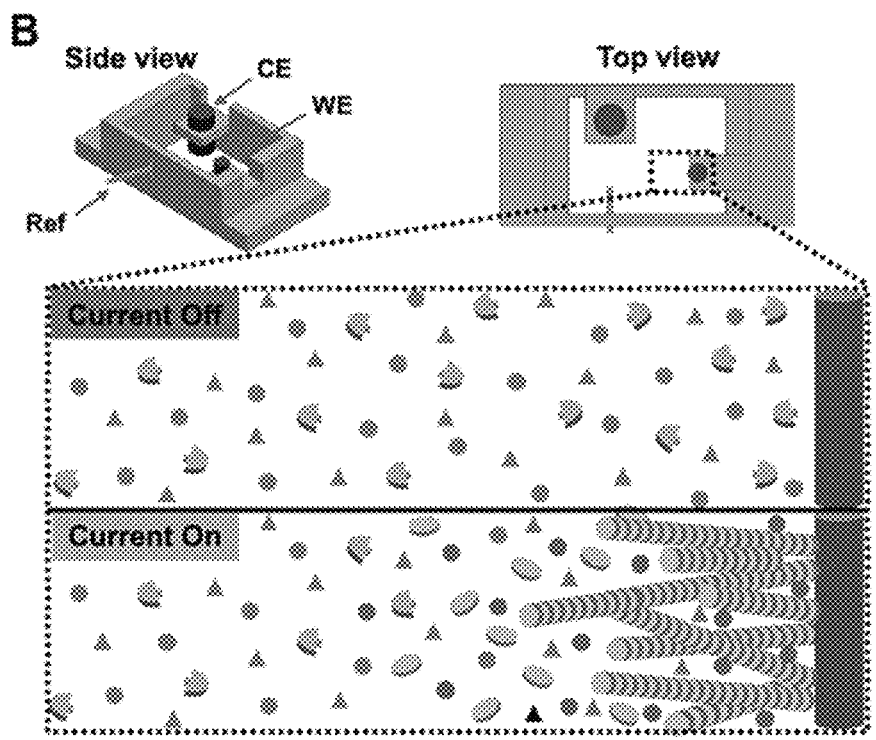
Figure 3C:
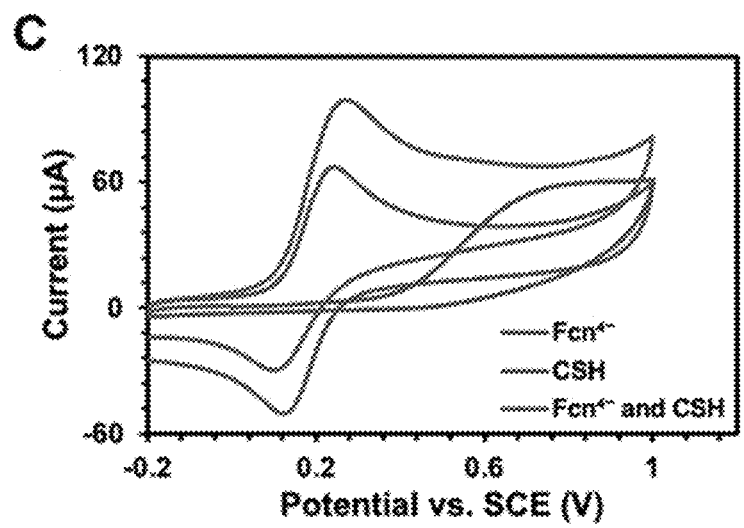
Figure 3D:
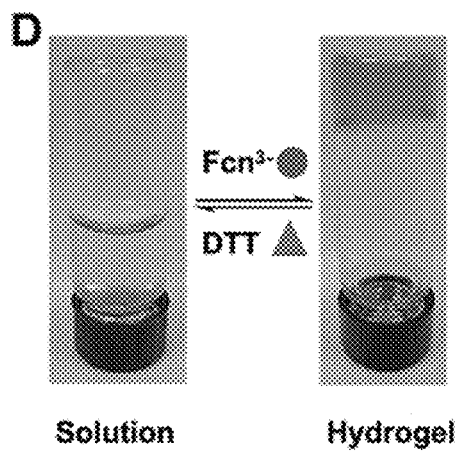

To test the feasibility of the design. $Fcn^{4-}$ was confirmed as acting as a homogeneous electrocatalyst for CSH oxidation. Cyclic voltammograms (CV) of $Fcn^{4-}$ and CSH in aqueous buffer (see FIG. 3C) shows that the former was easily and reversibly oxidized with a $E_{1/2}$=200 mV vs. $Ag/Ag^+$, whereas CSH was oxidized at 600 mV vs. $Ag/Ag^+$ irreversibly. When $Fcn^{4-}$ was added to CSH solution, the CV became electrochemically irreversible as shown by the cathodic current being significantly smaller in magnitude than the anodic current, indicating that $Fcn^{4-}$ was participating in the electrocatalytic oxidation of CSH. The kinetics for the redox reactions involved in the system were quantified through a combination of stopped flow UV-Vis spectroscopy and ultra-performance liquid chromatography (UPLC) (see SI for details). Based on the kinetics, it was demonstrated that $Fcn^{3-}$ could oxidize CSH to form CSSC gel, which could be dissolved by DTT, as was visualized by vial inversion (see FIG. 3D) and confirmed by rheology (see FIG. 3E. FIG. 4, and FIG. 5).

e-Fueled transient and directional assembly. To demonstrate e-fueled dissipative self-assembly, a custom glass-bottom, three-electrode bulk electrochemical cell was fabricated (see FIG. 1. FIG. 3B) in which e-fueled dissipative assembly could be monitored in situ using confocal laser scanning microscopy (CLSM). Experimental parameters were screened to determine conditions for fast fiber growth and dissolution. The minimal $[CSH]_0$ and maximal $[DTT]_0$ were identified that allowed for fiber formation at relatively low potential (<1 V vs $Ag/Ag^+$). Then, several experimental parameters were iteratively varied, including pH, $[CSH]_0$, $[DTT]_0$, and electrical current. As expected, increasing the current led to faster and more vigorous fiber growth (see FIG. 11) while increasing $[DTT]_0$ accelerated the dissolution (see FIG. 12). The kinetics of fiber dissolution were pH dependent, with higher pH resulting in faster dissolution (see FIG. 13). The concentration of CSH within the range of 2 to 5 mM did not significantly impact growth and dissolution kinetics (see FIG. 14). On the basis of these observations, the dissipative self-assembly was conducted in a pH 8 buffer with 2.5 mM CSH. 20 mM DTT. 150 mM ferrocyanide, and 25 µM Nile red (as an intercalation dye for CLSM) by applying a potential of 430 mV between the glassy carbon working electrode and silver wire pseudo reference electrode (see FIG. 3B).

Figure 6A:
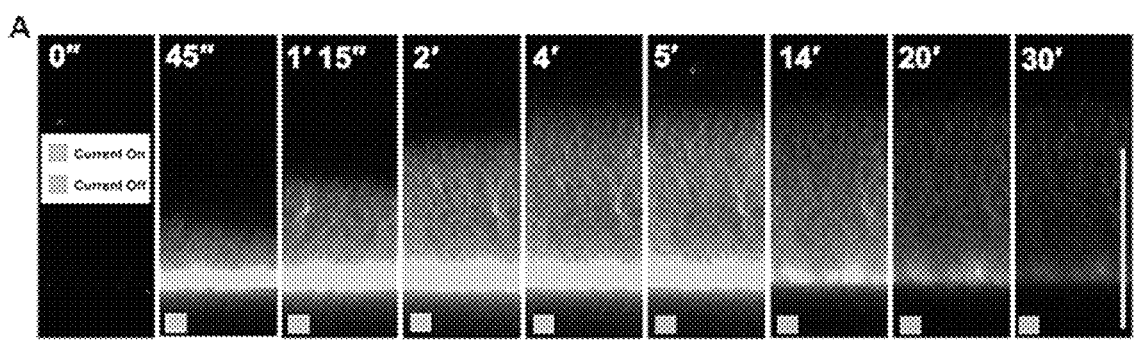
FIG. 6A-E demonstrates e-Fueled transient supramolecular assembly. (A) CLSM snapshots showing directional fiber growth when current was applied (darker gray square), and dissolution when current was turned off (lighter gray square) (pH 8, $[CSH]_0$=2.5 mM, $[DTT]_0$=20 mM, $[Fcn^{4-}]_0$=150 mM, Scale bar=50 µm, 175% hue saturation, electrode at bottom). (B-C) Fluorescence intensity at varying distances from the electrode surface observed over time during fiber growth with current on (B) and dissolution with current off (C). (D) Ten cycles of fiber growth and dissipation by repetitively switching current on and off (600 mV vs Ag/Ag$^+$ for 16 sec followed by 24 min current off, under same condition as A). (E) A cryo-TEM micrograph of self-assembled fibers formed by e-fueled assembly (Scale bar=200 nm).
Figure 6B:
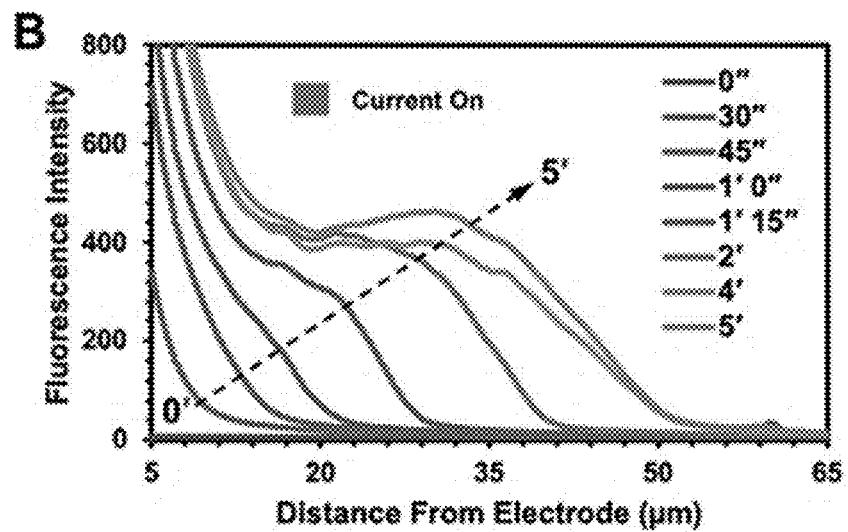
Figure 6C:
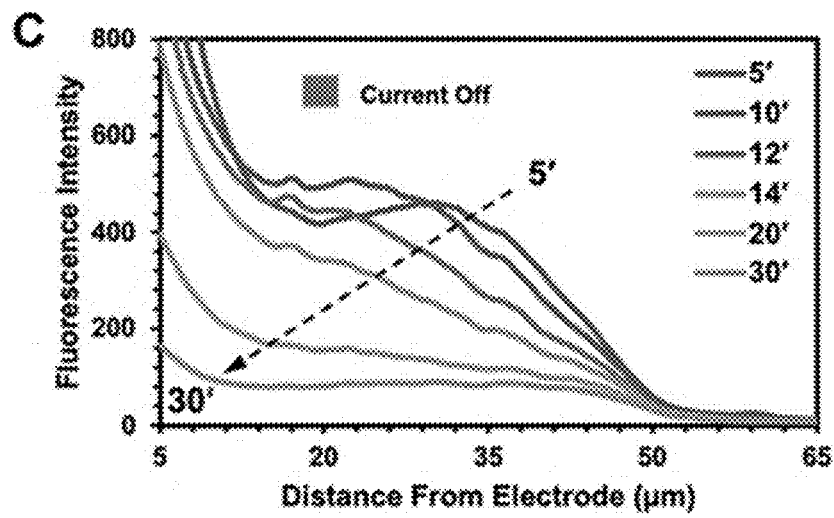
Figure 6D:
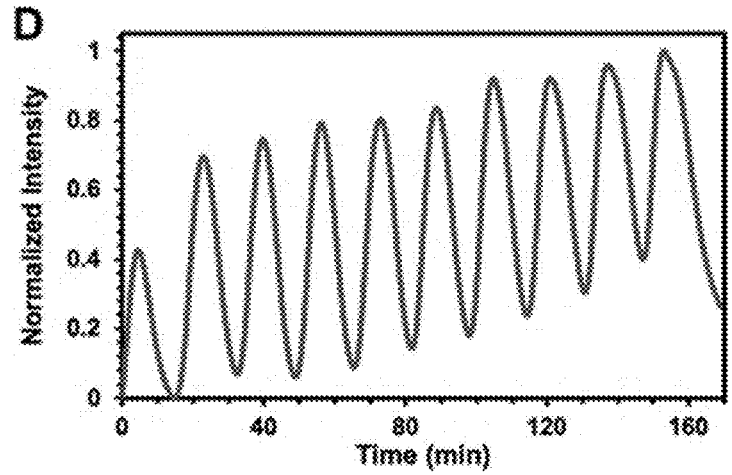
Figure 6E:
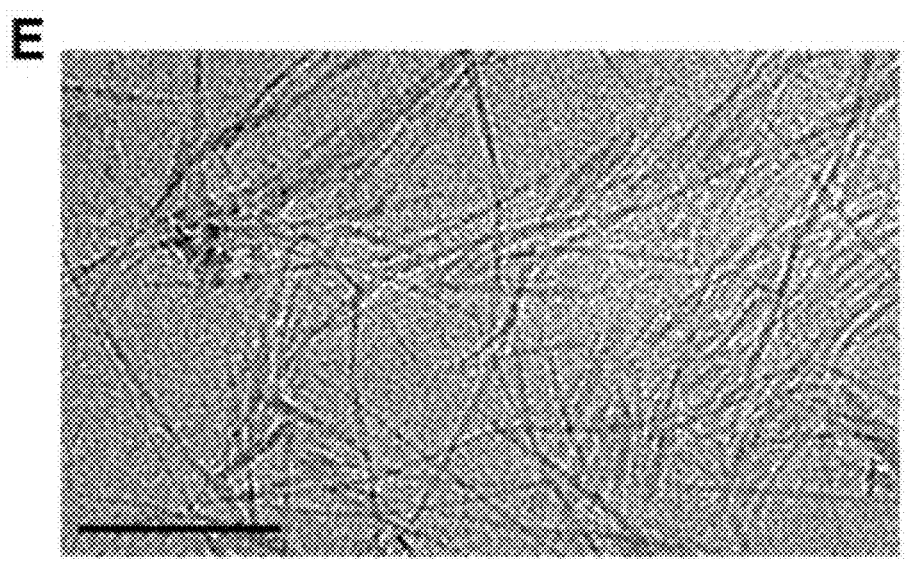

Shortly after applying the potential, fibers began to grow directionally perpendicular to the surface of the working electrode which continued to grow outwards when the potential was maintained (see FIG. 6A). When the current was turned off at 5 minutes, the fibers began to disassemble and eventually disappear. The fiber morphology of the e-fueled assembly was confirmed by cryo-TEM imaging, showing fibers with average diameters ~12 nm and average length ~412 nm (see FIG. 6E, and FIG. 21). The fibers were observed to stack and coil together creating larger micron sized assemblies (see FIG. 20). The fluorescence histograms of the image reveal that during the fiber growth with the current on, they grew outwards as a front while steadily increasing in fluorescence intensity throughout the body of the gel (see FIG. 6B). Conversely, when the fibers began to disassemble with the current off, the fiber front gradually receded toward the electrode while the fluorescence intensity dropped across the gel as a whole (see FIG. 6C). This is consistent with the fact that as the ferricyanide ($Fcn^{3-}$) is generated at the electrode, it transports away from the electrode and oxidizes CSH into CSSC at the fiber front, enabling fibers to grow outwards (see FIG. 3B). Upon depletion of the ferricyanide when current is turned off, the DTT in the bulk solution will diffuse back into the gel, initially reducing fibers at the front but then the body of the gel. Furthermore, the transient fibers could be grown and dissolved repetitively by turning the current on and off (see FIG. 6D). These experiments clearly demonstrate the transient nature, directional growth, and precise temporal control of the e-fueled dissipative self-assembly.

Active and dynamic self-assembly. Next was investigated active, dynamic self-assembly for the CSH/CSSC system fueled by electricity. To observe the dynamics on a shorter time scale. DTT was replaced with a more efficient reductant. (tris(2-carboxyethyl)phosphine) (TCEP). The e-fueled system provides a convenient way to tune the kinetics of the reaction in real time by modulating the potential applied to the system. After applying an initial potential of 2 V vs. $Ag/Ag^+$ for 11 second to grow a layer of fibers from the electrode surface, the potential was reduced to 600 mV to slow down the fiber growth for observing dynamics at the fiber front. The CLSM video shows highly complex active, dynamic processes for the system, especially at the fiber-water interface (see FIG. 7A-B). The selected snapshots highlight different modes of activity for the self-assembly of fibers, including simultaneously growing and shrinking (see FIG. 7C), waving (see FIG. 7D), and curling and looping (see FIG. 7E). Another observation is that as new fibers form at the front they collapse onto the body of the fibers already formed. The complexity of the observed active behavior could be attributed to multiple processes potentially ongoing in the system. In addition to the anticipated dissipative assembly/disassembly, several physicochemical processes may influence the active behavior. The electrochemical reaction should create concentration gradients for both the redox-sensitive species and electrolytes near the working electrode surface (see FIG. 3B), which may cause liquid-liquid phase separation of the growing fibers into a gel phase. In addition, various electrostrictive hydrodynamics, such as electrohydrodynamics and/or electro-osmosis, may also contribute to the complex dynamic behavior.

The self-assembly dynamics observed in CLSM were quantified using the structural dissimilarity index measurement (DSSIM) (see FIG. 7B, and FIG. 7F). DSSIM is a standard measure of the difference between two images, which compares variation in the mean, variance, and cross-correlation between local regions of two images (see SI for details). DSSIM images were obtained by comparing two frames taken 90 seconds (see FIG. 7B, and FIG. 16) or 4 seconds (see FIGS. 16-17) apart in a sliding-window calculation. The 90 second sliding-window calculation quantifies dynamics occurring over a large time window while the 4 seconds sliding-window calculation captures the high temporal resolution dynamics. Each of the 240 DSSIM images were divided into five equally spaced regions with increasing distance from the working electrode, and the average DSSIM in each region is plotted for every frame (see FIG. 7F, and FIG. 17D).

The results show that the dissipative self-assembly system is highly dynamic with the most dynamic changes at the fiber-water interface which is seen for both the 90 seconds and 4 seconds intervals. The dynamics decrease with distance from the fiber front, as can be seen with the time-delayed decline in DSSIM values starting with the 0-25 µm region which is then echoed in the 25-50 and 50-75 µm regions. The 75-100 and 100-125 µm regions start with low DSSIM values which steadily increase as the fiber-water interface progresses further from the electrode until a peak is reached, and then gradually decline. The data also shows that the dynamics at the fiber-water interface are highest in the early stages and gradually decrease over time.

Spatiotemporal control of active assembly. Spatiotemporal control is a hallmark of biological dissipative self-assembly systems which is critical for their emergent functions. To demonstrate spatiotemporal control of the e-fueled active material system, an array of interdigitated gold microelectrodes was designed for use in a two-electrode configuration (see FIG. 8A and FIG. 2). Each of the five bottom electrodes are individually addressable working electrodes, whereas the top five are connected as a single counter/reference electrode. By placing the sample solution (2.5 mM CSH, 150 mM ferrocyanide, 60 mM DTT, pH 8 buffer) on the interdigitated microelectrodes and applying 2.4 V vs. ref for 90 seconds, fibers were grown at each individually addressed electrode (see FIG. 8B). When the current was turned off, it took roughly 90 seconds to fully dissolve the fibers and return to baseline fluorescence. By selectively applying electric potential to different working electrodes over time, while also varying the duration for current on and off, the first four measures of Beethoven's "Ode to Joy" were "played" on the microelectrode array (see FIG. 8C, and FIG. 9). This experiment clearly demonstrates precise spatiotemporal control and fast assembly/disassembly kinetics for the e-fueled dissipative system.

Also demonstrated herein, the e-fueled dissipative self-assemblies could dynamically transduce electronic inputs related to sensing, actuation, and computation. Single-frequency electrochemical impedance spectroscopy (SFEIS) was used to probe the impedance changes of the e-fueled dissipative assembly system on carbon-coated interdigitated gold microelectrodes (see FIG. 2) at 8 kHz. The impedance of the system increased sharply upon application of 2.4 V±10 mV vs. ref for one minute, resulting from the growth of fiber networks between electrodes, and dropped after the potential was returned to 0 V±10 mV vs. ref (see FIG. 8D). The fiber growth was concurrently monitored using CLSM during SFEIS measurements, confirming that the impedance changes correlate with fiber assembly and disassembly as indicated by changes in fluorescence intensity (see FIG. 8D). In contrast, the control system without CSH in the solution only showed minimal changes of impedance under identical conditions (see FIG. 19). The increase in impedance is attributed to the inhibition of ionic currents between electrodes due to diminished ionic transport through the self-assembled fiber network.

Figure 22A:
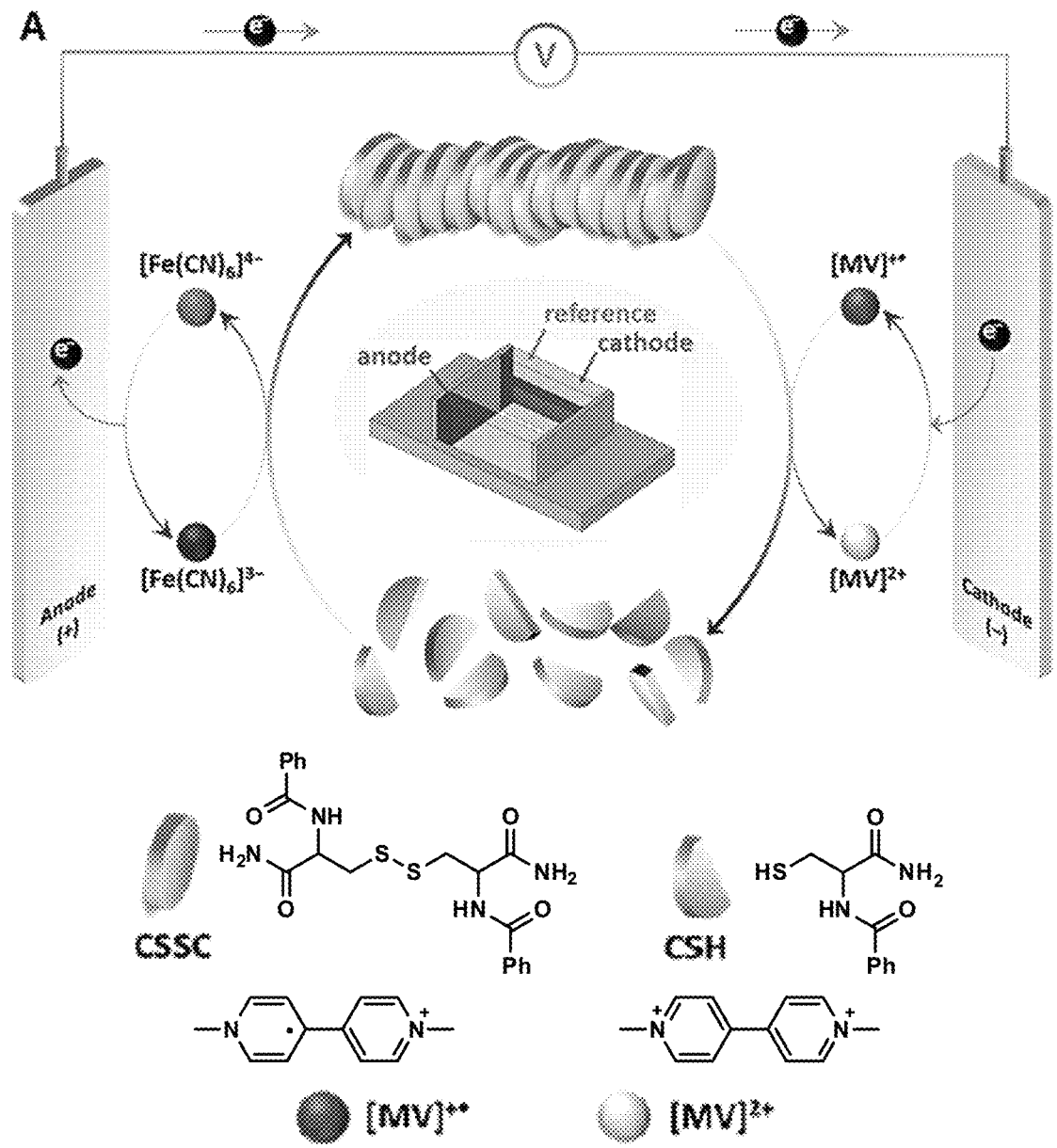
FIG. 22A-D provides a schematic and assessment of a fully e-fueled dissipative self-assembly of the disclosure. (A) Schematic of fully e-fueled dissipative self-assembly of CSH↔CSSC system having dual electrocatalysts, and specifically designed 3-electrode electrochemical setup to in situ monitor CSSC fiber growth and disassembly by confocal microscopy. (B) Illustration showing growth of CSSC fibers under voltage on and dissipation under voltage off conditions. (C) Three-electrode cell containing CSH, [Fe(CN)$_6$]$^{4-}$ and [MV]$^{2+}$ in phosphate buffer showing purple coloration by the formation of [MV]$^{+\bullet}$ upon applying voltage followed by de-coloration by self-bleaching of [MV]$^{+\bullet}$ via electron transfer to CSSC and [Fe(CN)$_6$]$^{3-}$ when voltage turned off. (D) CV plot of [Fe(CN)$_6$]$^{4-}$ and [MV]$^{2+}$ in presence of CSH showing full reversibility of CSH↔CSSC system.
Figure 22B:
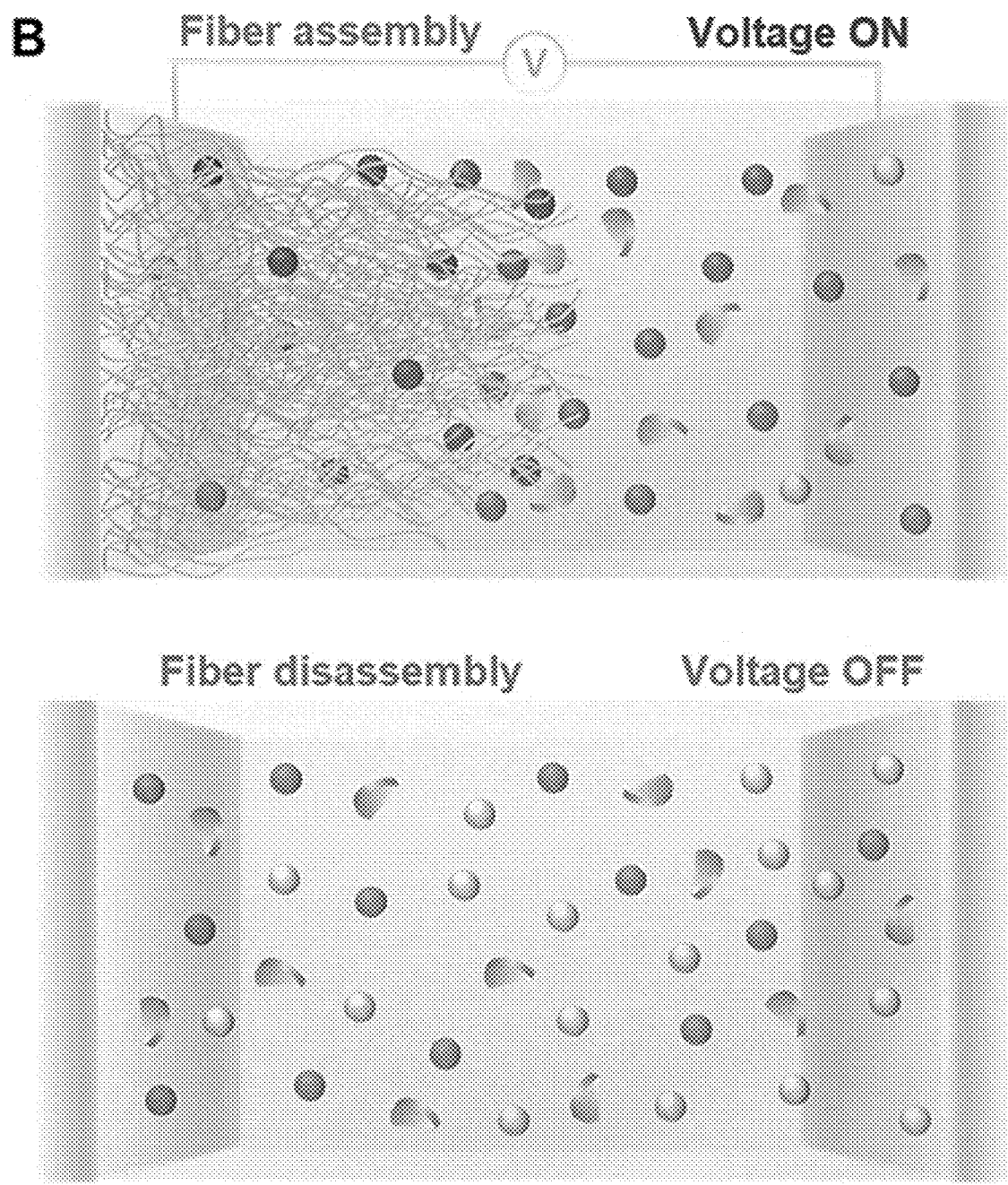
Figure 22C:
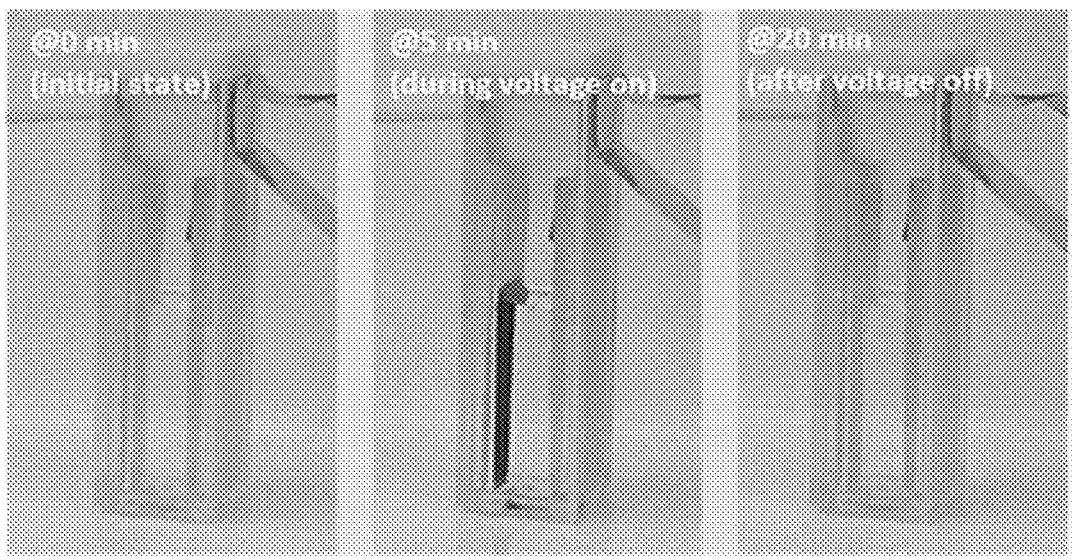

Design of fully e-fueled dissipative self-assembly. To assess fully e-fueled dissipative self-assembly, a customized electrochemical cell was developed (see FIG. 22) where a ferrocyanide ($[Fe(CN)_6]^{4-}$) electrocatalyst is oxidized to ferricyanide ($[Fe(CN)_6]^{3-}$) under an applied bias of 0.7 V, thereby promoting oxidation of CSH to corresponding disulfide CSSC fibers (causing assembly) and electrons are transferred to the anode. Owing to bifold electrocatalyst design, a commensurate half cycle reduced the subsequent electrocatalyst 1,1'-dimethyl-4,4'-bipyridinium dichloride (methyl viologen: $[MV]^{2+}$) at the cathode creating excess local concentration of $[MV]^{+\bullet}$. It is also evident from the colorless (initially at 0 V) to purple (finally at 0.7 V) transition of control device in phosphate buffer shown in FIG. 22C. These high energy $[MV]^{+\bullet}$ radical cations not only provides decent electrochemical stability via delocalization but also regenerate $[Fe(CN)_6]^{4-}$ and disassemble CSSC fibers to CSH by diffusion-induced electron transfer process, self-oxidizing back to $[MV]^{2+}$. The control device spontaneously changes back from purple to colorless upon setting at open circuit conditions (no external voltage. FIG. 22C). This phenomenon, commonly called as self-bleaching in electrochromic cells, occurs only when both anodic and cathodic species are present in the circuit. Their coexistence often complements the electrochromic configurations to set up maximum voltage at the anode and to resist any electrochemical decay of electrolytes. A similar type of dual electrocatalyst is capable of discretely operating at either electrode in the system in converting CSH back from CSSC, which was observed when CSH and $[Fe(CN)_6]^{4-}$ without $[MV]^{2+}$ were employed in an electrochemical cell. The requirement of an oxygen-free environment for full functioning of $[MV]^{+\bullet}$ is shown by non-dissipation of CSSC fibers when mixed with $[MV]^{+\bullet}$ under ambient conditions. For the quantitative analysis using ultra-performance liquid chromatography (UPLC). N-acetylcysteine amide (NACA) was used as a phenyl-free methylated analogue of CSH (to avoid complicacies in quantification arising from CSSC gelation) to confirm the retention of disulfide dimer as controls in presence of (i) only $[Fe(CN)_6]^{4-}$ in an electrochemical cell and (ii) only $[MV]^{+\bullet}$ in a vial without having any electrode and circuits.

Figure 22D:
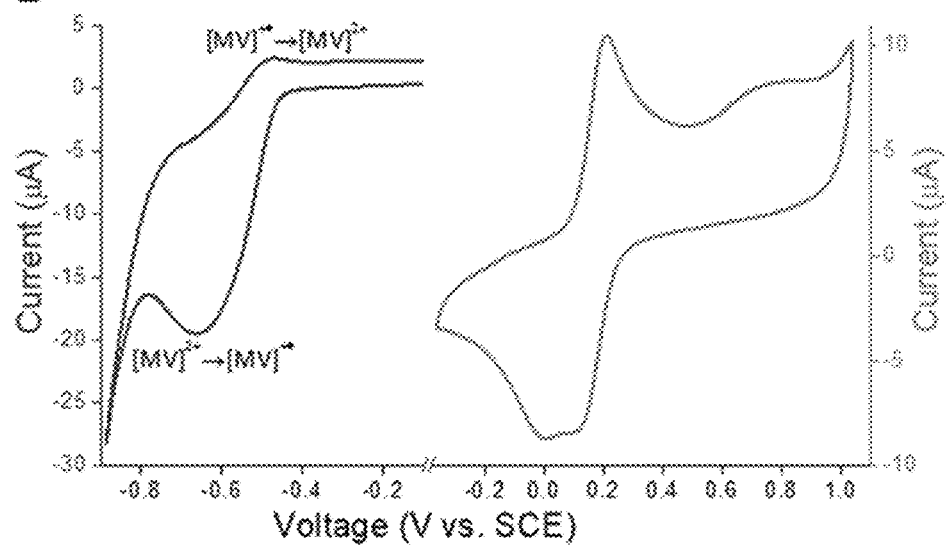

To further justify the viability of the approach, electrochemical oxidation of CSH and reduction of CSSC by $[Fe(CN)_6]^{4-}$ and $[MV]^{2+}$ in phosphate buffer solution (pH 7) were performed using a standard 3-electrode setup. The solutions were purged with $N_2$ for 15 min to discard oxygen from the system prior to cyclic voltammetry (CV) analysis and flow of $N_2$ was continued through headspace over the buffer surface during measurement. The CV curve in FIG. 22D depicts a low magnitude of cathodic current (higher for anodic) indicating $[Fe(CN)_6]^{4-}$ taking part in oxidation of CSH. On the other hand. $[MV]^{2+}$ shows significantly enhanced cathodic current (low anodic current), which can be attributed to the reduction of CSSC and $[Fe(CN)_6]^{3-}$. FIG. 22D also shows a reversible single electron transfer peak for $[MV]^{2+}$ forming $[MV]^{+\bullet}$ at −0.66 V vs. the saturated calomel electrode (SCE), while the peaks for the oxidation of $[Fe(CN)_6]^{4-}$ and CSH are recorded earlier as 0.21 V and 0.7 V, respectively. The difference from midpoint potentials of $[MV]^{2+}$ to $[Fe(CN)_6]^{4-}$ and CSH are thus found to be 0.87 V and 1.26 V, respectively, sufficient for self-bleaching of $[MV]^{+\bullet}$ and electrochemical reversibility of CSH↔CSSC without producing any chemical waste.

Figure 23A:
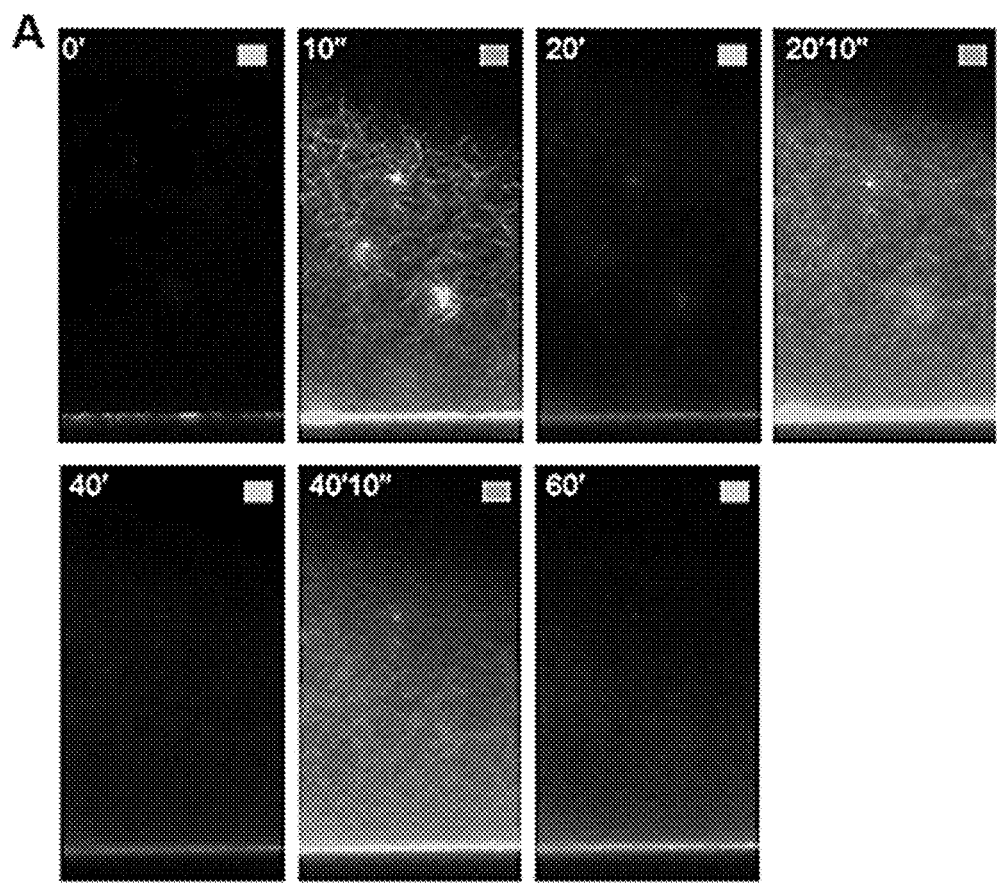
FIG. 23A-D demonstrates the growth and dissipation of fibers when a voltage is applied to an e-fueled self-assembly system. (A) Fully e-fueled dissipative self-assembly showing growth of CSSC disulfide fibers from 2 mM CSH thiol in presence of 120 mM [Fe(CN)$_6$]$^{4-}$ and 160 mM [MV]$^{2+}$ in 20 mM phosphate buffer (pH 7) when voltage is on (darker gray) for 10 s followed by their disassembly to CSH thiol when voltage is turned off (lighter gray) and circuit left open for 20 min. Scale bar 20 μm. (B) Cryo-TEM image of CSSC fibers formed during e-fueled assembly on applying voltage for 30 s. (C) Change in impedance of the system upon e-fueling for 5 min to grow CSSC fibers and fiber dissolution at 0 V over 6 cycles. (D) Recyclability test for thiol↔disulfide conversions for 2 mM NACA in presence of 120 mM [Fe(CN)$_6$]$^{4-}$ and 160 mM [MV]$^{2+}$ without any chemical waste formation under voltage on and off conditions, respectively.
Figure 23B:
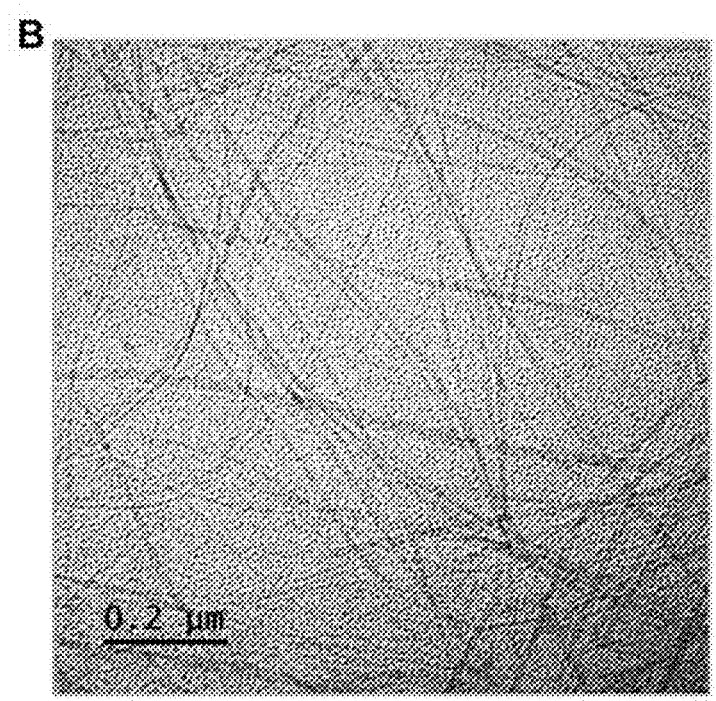

Fully e-fueled waste-free dissipative self-assembly. To reveal fully e-fueled dissipative self-assembly, a 3D printable electrochemical cell was designed and built by parallelly placing two ITO substrates such that the working electrode reside on one side while the counter and reference electrodes (both fabricated onto one ITO substrate by chemically etching in the middle) on its opposite as shown in FIG. 22A. The bottom edges of ITO slides are adhered to a glass cover slip to enable in situ monitoring of fiber assembly-disassembly under confocal laser scanning microscope (CLSM). The top side of the cell is sealed with another glass cover slip by making electrical connections of all electrodes to a potentiostat by conductive copper tape before analysis. For optimal detection of fibers by CLSM, the concentrations of CSH and electrocatalysts, voltage, and gap between working and counter electrodes were primarily screened. A deoxygenated phosphate buffer solution (pH 7, 0.6 mL) containing cysteine building block CSH. $[Fe(CN)_6]^{4-}$, $[MV]^{2+}$ and Nile red (intercalating dye for CLSM analysis) dye was injected into the electrochemical cell. The concentration ratio of $[CSH]:[Fe(CN)_6]^{4-}:[MV]^{2+}$ for the final solution was kept as 2 mM:120 mM:160 mM. Once external bias of 0.7 V (e-fuel) is applied between anode and cathode (parallelly placed at vertical gap of 500 μm). CSSC fibers started growing from the working electrode surface in its perpendicular direction and continued with e-fueling (see FIG. 23A). These fibers started disassembling and finally disappeared when voltage was stopped and circuit left at open circuit conditions in ~20 min. Cryo-transmission electron microscopy (cryo-TEM; FIG. 23B) confirmed an average diameter of ~18 nm for the fibers collected in situ during e-fueled assembly. These fibers also stack and entangled among themselves to form somewhat larger sized assemblies. The fluorescence signals obtained from confocal images displayed steady increase and then slow decrease during growth and dissipation of fibers under voltage on and off conditions, respectively. The results correlate with a rapid oxidation of CSH to CSSC fibers (sol to gel in ~5 min) facilitated by $[Fe(CN)_6]^{3-}$ at anode sites under applied bias, which when turned off, $[MV]^{+\bullet}$ generated from cathode sites slowly diffuses toward the anode to regenerate CSH (from CSSC gel to CSH sol in ~20 min) and $[Fe(CN)_6]^{4-}$. None of the e-fuel is converted to chemical waste in any of the foregoing processes. The reformation of CSH from the CSSC fiber started from the free end and continued toward the anode end in a direction opposite to initial growth of the fibers. On the contrary, this matches well with the electrochemical reversibility obtained from CV curve, signifying a waste-free fully e-fueled dissipative self-assembly approach to feature transient behavior, directional growth and spatiotemporal control.

Figure 23C:
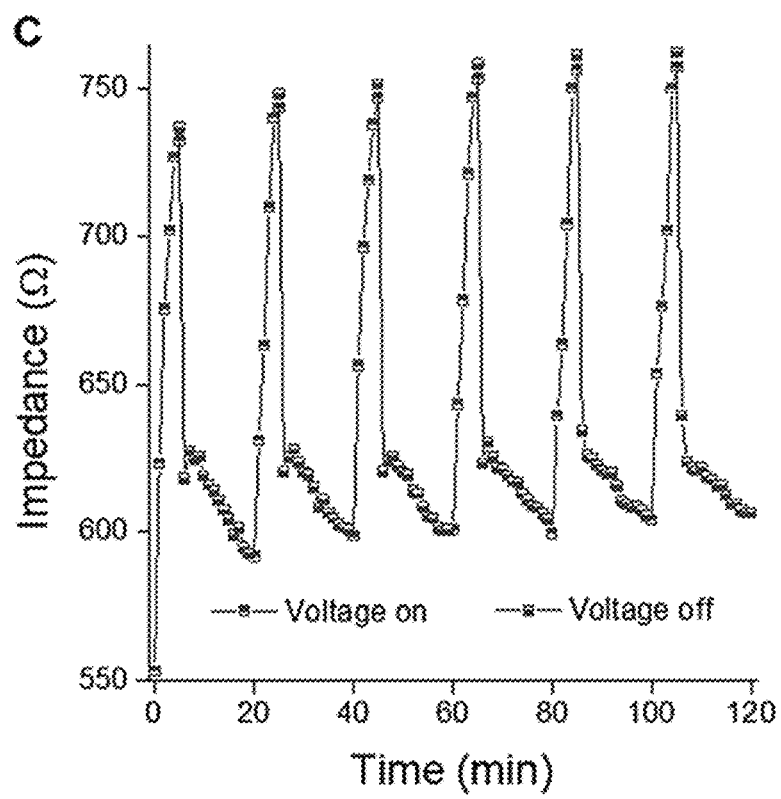

To validate the waste-free conversion of CSH into CSSC fibers and vice versa, the impedance of the full system (CSH, $[Fe(CN)_6]^{4-}$ and $[MV]^{2+}$ in a three-ITO-electrode cell) was probed under e-fueled conditions by performing electrochemical impedance spectroscopy (EIS) analysis at a single frequency of $10^4$ Hz to account for charge transfer at the electrode/electrolyte interface. The growth and dissipation of fibers were also in-situ monitored by CLSM with EIS measurements to correlate fiber dynamics with the change in impedance. As anticipated, on applying external voltage of 0.7 V for 5 min the impedance abruptly increased, coinciding with enhanced resistivity in charge transport within the system due to non-conductivity of CSSC fibers. The impedance was later reduced on turning off the voltage, indicating fiber disassembly. Interestingly, the trend of impedance revealed full reversibility without any significant decay even with repeatable number of 6 cycles were performed as shown in FIG. 23C.

Figure 23D:
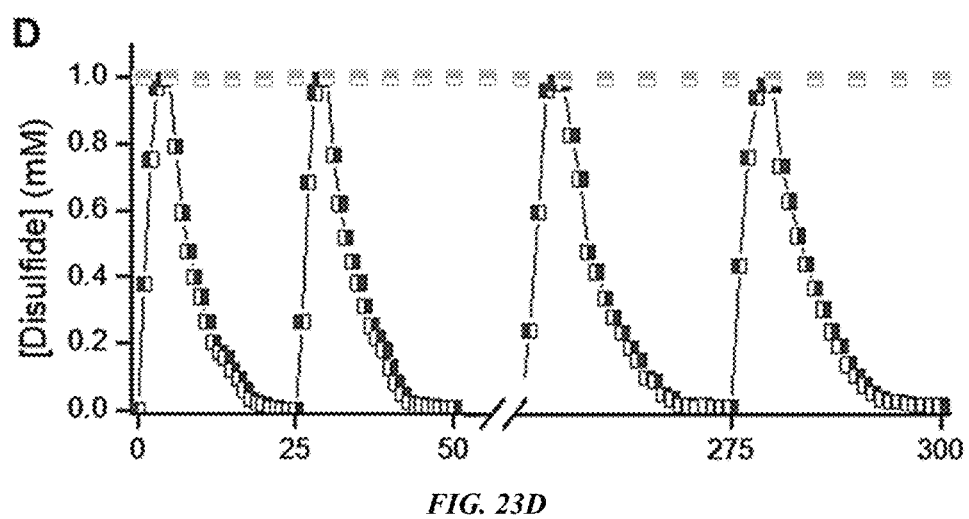

To gain further insight into recyclable CSH thiol ↔CSSC disulfide dimer interconversion, UV-vis spectroscopy and UPLC were utilized to in situ monitor the conversion of NACA thiol monomers to NACA disulfide dimers and vice versa, and $[MV]^{+\bullet}$ radical cation formation during e-fueled assembly. As can be seen from FIG. 23D, NACA disulfide dimers were readily formed from NACA thiol monomers upon e-fueling for 2~5 min and then reverted to thiol in ~20 min after voltage turned off. The concentration of dimers as a function of time and voltage was monitored in situ by inserting a customized electrochemical cell having two ITO substrates (one as counter and reference electrodes separated by chemical etching in the middle and another as working electrode) inside a UPLC sample holder, and then connecting the sample holder to an external potentiostat using conductive copper tape. Similarly, the signature absorbance of $[MV]^{+\bullet}$ at 604 nm (molar extinction coefficient, ε=13,900 $M^{-1}$ $cm^{-1}$) was recorded by inserting a three-electrode setup in a customized UV cuvette, confirming gradual formation of $[MV]^{+\bullet}$ when external e-fueling was kept on in presence of NACA and $[Fe(CN)_6]^{4-}$ and then self-bleaching into $[MV]^{2+}$ under open circuit potential after e-fueling turned off. Notably, 96% of $[MV]^{2+}$ converted into $[MV]^{+\bullet}$ under e-fueling for 5 min in presence of CSH and $[Fe(CN)_6]^{4-}$ in a deoxygenated phosphate buffer, compared with ~99.8% of the bare $[MV]^{2+}$ control. In addition, any $([MV]^{+\bullet})_2$ dimeric species were not formed at deoxygenated conditions during fiber growth as evident from UV-vis spectra without any characteristic absorbance beyond 800 nm and cryo-TEM images of control sample after 3 min of e-fueling. It is reported that $[MV]^{+\bullet}$ once formed can oxidize back to $[MV]^{2+}$ or convert into a $([MV]^{+\bullet})_2$ dimer or a $[MV]^{+\bullet}$ $[MV]^{2+}$, complex when water and oxygen are present in the system. These are apparent as rod- and sheet-like shapes distinct from CSSC fibers in cryo-TEM of control samples.

E-fueled active and dynamic self-assembly. To demonstrate time-dependent macroscopic behavior relying on e-fueled activation and deactivation, the fiber dynamics of active CSH↔CSSC system were explored by modulating local concentrations and path length for diffusion of $[MV]^{2+}$. It was found that a concentration ratio of 2 mM:120 mM:200 mM for [CSH]:$[Fe(CN)_6]^{4-}$:$[MV]^{2+}$ and a gap of 300 μm between anode and cathode was optimal in preliminary screens. Upon e-fueling dual electrocatalysts exert oxidizing and reducing species at positive and negative electrodes concomitantly and enumerate $[Fe(CN)_6]^{3-}$ rich (near anode, favor assembly) and $[MV]^{+\bullet}$ rich (near cathode, favor disassembly) regions thereby ensuing an intermediate region favoring both. The fibers grew rapidly and reached certain dynamic maximums at this intermediate region, where, when the fibers fronts came into contact with $[MV]^{+\bullet}$ they would dissipate without any fracturing. This active and dynamic nature of CSH↔CSSC at the fiber fronts, monitored by locating CLSM objective slightly toward cathode from the mid of electrochemical cell, is shown in FIG. 22. It should be mentioned that on applying e-fuel, there is a short lag period in perceiving fiber disassembly than assembly, correlating to gelation of CSSC fibers for all sets of measurements. In addition, instead of gradual shrinking of all assembled fibers at once, they stochastically shrank lengthwise at their fronts, while, simultaneously, new fibers were randomly formed. The results indicate nonlinear fiber growth and dissolution in the milieu of $[Fe(CN)_6]^{3-}$ and $[MV]^{+\bullet}$ at the dynamic interface located at the solution (beyond fiber front) and gel (where fibers form under e-fueling) phases. Since dissolution of CSSC fibers into CSH by $[MV]^{+\bullet}$ is diffusion (from sol to gel) controlled, the diffusion path was shortened by trimming the electrode gap to 200 μm. The dynamics, however, did not improve, likely due to trade-off between attenuated formation of $[Fe(CN)_6]^{3-}$ at the anode (quick regeneration to $[Fe(CN)_6]^{4-}$ by $[MV]^{+\bullet}$ with a calculated rate constant of 7.6×10$^8$ $M^{-1}$ $s^{-1}$ in phosphate buffer pH 7) and the bulk current density of the system in the electrochemical cell. Instead, when $[MV]^{2+}$ content was increased (keeping electrode gap unaltered as 300 μm), the system displayed faster dissipation of fibers revealing more complex features, including concurrent growth and shrinkage, curling or looping, and waving (see FIG. 24A-C), correlating with increased concentration of $[MV]^{+\bullet}$ by e-fuel. The control experiment with CSH and $[Fe(CN)_6]^{4-}$ without $[MV]^{2+}$ only formed static fibers, indicating the significance of dual electrocatalysts for exhibiting complex dynamic behavior. Other factors, such as concentration gradients of electrocatalysts upon e-fueling; liquid-liquid phase separation of CSH sol to CSSC gel conversion, and vice-versa; electrostrictive hydrodynamics, etc, could also potentially contribute to the complex equilibrium nature of the system. Overall, these observations of active self-assembly by CSH↔CSSC resemble out-of-equilibrium self-organization of microtubules in terms of dynamic variability and nonlinearity of fibers.

Figure 25A:
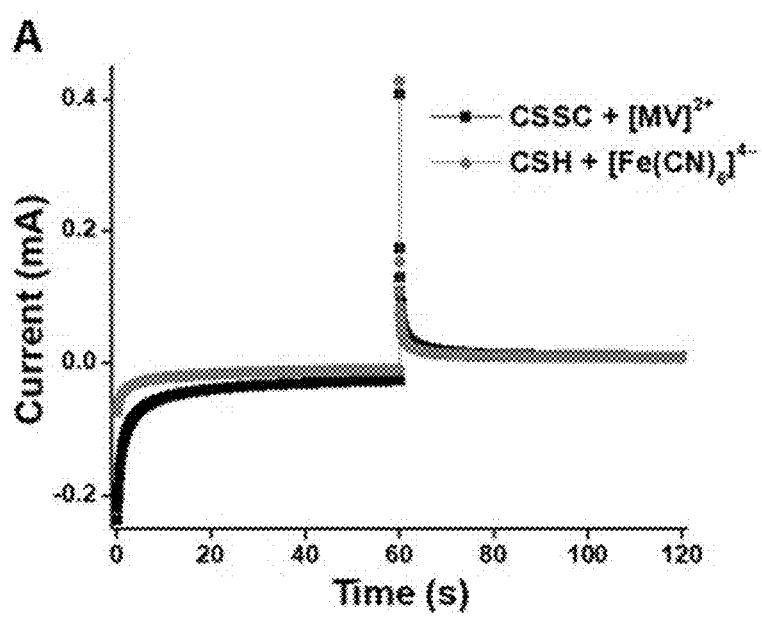
FIG. 25A-B presents (A) DPSC curves and (B) corresponding current density versus $t^{-1/2}$ plots showing faster diffusion for $[Fe(CN)_6]^{4-}$ during CSH sol to CSSC gel conversion and for $[MV]^{2+}$ during CSSC to CSH conversion in deoxygenated phosphate buffer at pH 7.
Figure 25B:
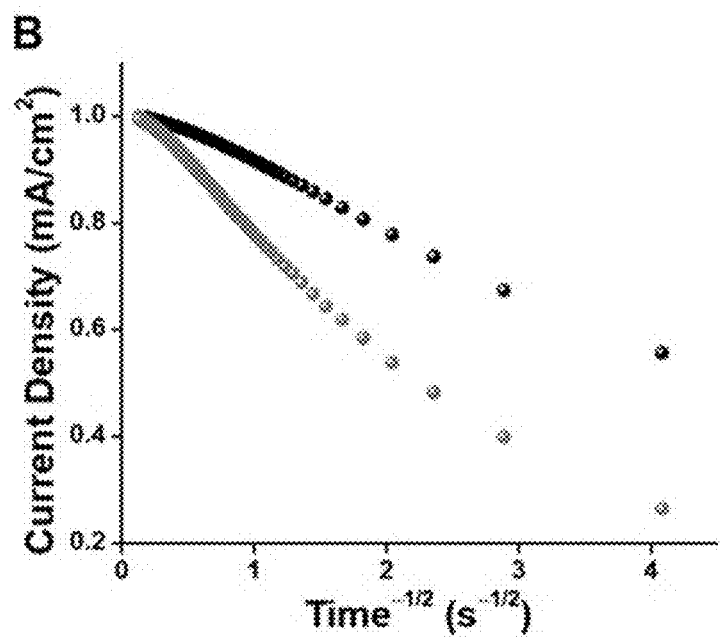

Diffusion controlled dynamics at microelectrode arrays. The aforementioned results manifest faster response for CSH oxidation (2~5 min) over CSSC reduction (15~20 min). This strongly correlates to discrepancies in electrocatalyst diffusion during e-fueled CSH sol↔CSSC gel transformations and relative mass-transport, electrochemical properties of the full system. For better clarity, the diffusion parameters of $[Fe(CN)_6]^{3-}$ and $[MV]^{+\bullet}$ were estimated separately for CSH sol→CSSC gel and CSSC gel→CSH sol, respectively, using double potential step chronoamperometry (DPSC) as shown in FIG. 24. A three-electrode cell (same as used for CLSM) having specific surface area of 0.021 cm² for ITO working electrode was used. For DPSC analysis, two solutions (i) CSH and $[Fe(CN)_6]^{4-}$ and (ii) CSSC (adding 1 eq $H_2O_2$ to 2 eq CSH) and $[MV]^{2+}$ in deoxygenated phosphate buffer pH 7 were individually injected into the cell. Step potentials were applied with a higher value over midpoint potential for oxidation and lower for reduction. The current decay profiles were monitored for 5 s at 10 ms intervals and time-dependent current response for forward step was analyzed by nonlinear curve fitting. While diffusion coefficients of $[Fe(CN)_6]^{4-}$ (6.54×10⁻⁶ cm² s⁻¹) and $[MV]^{2+}$ (6.58×10⁻⁶ cm² s⁻¹) are nearly similar, their time dependent Faradaic current [I(1)] profiles are monitored near the electrode using DPSC (see FIG. 25A) and expressed by Cottrell equation of EQ. 8:

$$I(t) = nFSc_i \sqrt{(D_i/\pi t)} \qquad (EQ. 8)$$

where n is the number of electrons, F is the Faraday constant, S is the surface area of electrode, c, is the initial concentration and $D_i$ is the diffusion coefficient of species i. Since $I(t) \propto t^{-1/2}$ and the injected charge (Q) is related to I(t) as $$\frac{dQ}{dt} = I(t),$$

the plot of current density versus $t^{1/2}$ indicates faster diffusion for $[Fe(CN)_6]^{4-}$ (from CSH sol to CSSC gel) over $[MV]^{2+}$ (from CSSC to CSH) as shown in FIG. 25B.

A number of embodiments have been described herein. Nevertheless, it will be understood that various modifications may be made without departing from the spirit and scope of this disclosure. Accordingly, other embodiments are within the scope of the following claims.

What is claimed is:

1. A method of creating transient, active supramolecular materials, comprising:
applying an electric potential using a plurality of electrodes to an electrochemical redox reaction network to make active supramolecular materials,
wherein the electrochemical redox reaction network comprises monomers having redox sensitive motifs, a first electrocatalyst comprising ferrocyanide, and a second electrocatalyst comprising a viologen, wherein the first electrocatalyst catalyzes the oxidation of the redox sensitive motifs which converts the monomers into self-assembling building blocks that self-assemble into active supramolecular materials, and
turning off the electric potential to the electrochemical redox reaction network to create an open circuit condition, wherein the second electrocatalyst catalyzes the reduction of the redox sensitive motifs causing the active supramolecular materials to dissemble into monomers,
wherein creating the transient, active supramolecular materials does not generate any electrical waste products.

2. The method of claim 1, wherein the monomers are selected from small molecule organic compounds, amino acids and their derivatives, peptides and their derivatives, proteins and their derivatives, polymers, and micro-/nanoparticles, wherein the monomers comprise one or more redox sensitive motifs.

3. The method of claim 1, wherein the second electrocatalyst regenerates the first electrocatalyst by homogeneous electron transfer under the open circuit condition.

4. The method of claim 1, wherein there is not significant decay of active supramolecular materials after multiple cycles of an electric potential being applied and turned off.

5. The method of claim 1, wherein the active supramolecular materials have a 0-, 1-, 2-, or 3-D structure selected from strands, fibers, lattices, sheets, vesicles, micelles, liquid microphases, aggregates, and nano- or micro- or macroparticles.

6. The method of claim 1, wherein the method is carried out in a bioelectronic device.

7. The method of claim 1, wherein the redox sensitive motifs of the monomers comprise a thiol group.

8. The method of claim 7, wherein the monomers have the structure of:

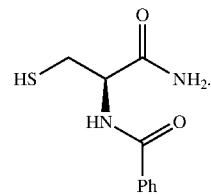

9. The method of claim 1, wherein from 100 mV to 10 V of the electric potential is applied using the plurality of the electrodes.

* * * * *